US010545264B1

(12) United States Patent
Haaland

(10) Patent No.: US 10,545,264 B1
(45) Date of Patent: Jan. 28, 2020

(54) METHODS AND DEVICES FOR REDUCING ACTUAL AND PERCEIVED GLARE

(71) Applicant: High Performance Optics, Inc., Roanoke, VA (US)

(72) Inventor: Peter Haaland, Belmont, MA (US)

(73) Assignee: High Performance Optics, Inc., Roanoke, VA (US)

( * ) Notice: Subject to any disclaimer, the term of this patent is extended or adjusted under 35 U.S.C. 154(b) by 0 days.

(21) Appl. No.: 16/293,458

(22) Filed: Mar. 5, 2019

(51) Int. Cl.
| *B60J 3/00* | (2006.01) |
| *G02B 1/111* | (2015.01) |
| *C08L 29/14* | (2006.01) |
| *G03C 1/825* | (2006.01) |
| *G02C 7/10* | (2006.01) |

(52) U.S. Cl.
CPC ............... *G02B 1/111* (2013.01); *B60J 3/007* (2013.01); *C08L 29/14* (2013.01); *G02C 7/10* (2013.01); *G03C 1/825* (2013.01)

(58) Field of Classification Search
USPC ....... 359/600, 601, 602, 603, 604, 605, 606, 359/607, 608, 609, 610, 614; 351/44
See application file for complete search history.

(56) References Cited

U.S. PATENT DOCUMENTS

| 9,575,335 B1* | 2/2017 | McCabe | G02C 7/104 |
| 2007/0042194 A1* | 2/2007 | Hayashi | B32B 17/10 |
| | | | 428/426 |
| 2017/0235160 A1* | 8/2017 | Larson | G02C 7/104 |
| | | | 351/45 |

OTHER PUBLICATIONS

[No Author Listed], American National Standard for Safety Glazing Materials for Glazing Motor Vehicles and Motor Vehicle Equipment Operating on Land Highways—Safety Standard ANSI/SAE Z 26.1-2007. 2007. 32 pages. ISBN 978-0-7680-1973-5. [Draft].
[No Author Listed], Calculations UGR Concepts. Lighting Analysts, Inc. 2 pages. https://docs.agi32.com/AGi32/Content/adding_calculation_points/Calculations_UGR_Concepts.htm [last accessed Jun. 12, 2018].
[No Author Listed], Chapter 4: Lighting and energy standards and codes. IEA International Energy Agency. Annex 45 Energy Efficient Electric Lighting for Buildings. Annex 45 Guidebook on Energy Efficient Electric Lighting for Buildings. 2010. 34 pages.
[No Author Listed], CIE. International Commission on Illumination. http://www.cie.co.at/ last accessed Mar. 26, 2019. 4 pages.
[No Author Listed], Color difference. Wikipedia https://en.wikipedia.org/wiki/Color_difference. 6 pages. [last accessed Jun. 10, 2018].
[No Author Listed], Munsell Color. https://munsell.com/ last accessed Mar. 26, 2019. 3 pages.

(Continued)

*Primary Examiner* — William R Alexander
*Assistant Examiner* — Henry A Duong
(74) *Attorney, Agent, or Firm* — Wolf, Greenfield & Sacks, P.C.

(57) ABSTRACT

Partially transparent devices and methods that reduce actual and/or perceived glare by incorporating absorbing materials are described. Actual and/or perceived glare can be reduced by multi-path absorption in the device. Perceived glare is further reduced by accounting for the psychophysics of human visual perception as a function of wavelength, orientation, and field illuminance.

30 Claims, 42 Drawing Sheets

(56) References Cited

OTHER PUBLICATIONS

[No Author Listed], Road vehicles—Safety glazing materials—Test methods for optical properties. International Standard ISO 3538 Second Edition. Jun. 1, 1997. 5 pages.
[No Author Listed], Zumtobel. The Lighting Handbook. 6th Edition. Apr. 2018. 244 pages. ISBN 978-3-902940-72-8.
Berman et al., The Influence of Spectral Composition on Discomfort Glare for Large Size Sources. Journal of the Illuminating Engineering Society. 1996;25(1). 27 pages.
Borzendowski et al., Drivers' judgments of the effect of headlight glare on their ability to see pedestrians at night. Journal of Safety Research. 2015;53:31-37.
Bullough, Spectral sensitivity for extrafoveal discomfort glare. Journal of Modern Optics. 2009;56(13):1518-22.
Fekete et al., Spectral discomfort glare sensitivity investigations. Ophthal Physiol. Opt. 2010;30(2):182-7. doi: 10.1111/j.1475-1313.2009.00696.x.
Fekete et al., Spectral discomfort glare sensitivity under low photopic conditions. Ophthal. Physiol. Opt. 2006;26(3):313-7.
Friedland et al., The effectiveness of glare-reducing glasses on simulated nighttime driving performance in younger and older adults. Cogn Tech Work. 2017;19:571-86. https://doi.org/10.1007/s10111-017-0442-2.
Hoefflinger, The Eye and High-Dynamic-Range Vision. Microelectronics, Images Processing, Computer Graphics. Springer-Verlag Berlin Heidelberg. 2007. 13 pages. ISBN: 978-3-540-44432-9.
Huang et al., Discomfort glare caused by white LEDs having different spectral power distributions. Lighting Res. Technol. 2017;0:1-16. doi: 10.1177/1477153517704996.
Huang et al., Verification of the CAM15u colour appearance model and the QUGR glare model. Lighting Res. Technol. 2017;0:1-13. doi: 10.1177/1477153517734402.
Hwang et al., Development of a headlight glare simulator for a driving simulator. Transportation Research Part C. 2013;32:129-43. http://dx.doi.org/10.1016/j.trc.2012.09.003.
Kent et al., Discomfort glare evaluation: The influence of anchor bias in luminance adjustments. Lighting Res. Technol. 2017;0:1-16. doi: 10.1177/1477153517734280.
Kraft et al., Visual Transduction in Human Rod Photoreceptors. Journal of Physiology 1993;464:747-65.
Mainster et al., Glare's Causes, Consequences, and Clinical Challenges After a Century of Ophthalmic Study. American Journal of Ophthalmology. 2012;153(4):587-593. doi:10.1016/j.ajo.2012.01.008.
Muftuoglu et al., Effect of a yellow intraocular lens on scotopic vision, glare disability, and blue color perception. J Cataract Refract Surg 2007;33:658-66. doi:10.1016/j.jcrs.2006.12.018.
Pierson et al., Discomfort glare perception in daylighting: influencing factors. Energy Procedia. 2017;122:331-6.
Radonjic et al., The Dynamic Range of Human Lightness Perception. Curr Biol. Nov. 22, 2011; 21(22):1931-6. doi:10.1016/j.cub.2011.10.013. [Author Manuscript].
Rubin et al., Window optics. Solar Energy. 1998;62(3):149-61.
Sawicki et al., Algorithm of HDR image preparation for discomfort glare assessment. 2013;89:87-90. [Author's Version].
Sewall et al., Observers' Judgments of the Effects of Glare on Their Visual Acuity for High and Low Contrast Stimuli. Perception. 2016;45(7):755-767.
Stockman et al., Spectral sensitivities of the human cones. J. Opt. Soc. Am. A. 1993;10(12):2491-2521. 32 pages.
Wyszecki and Stiles, Color Science: Concepts and Methods, Quantitative Data and Formulae. Book Reviews. 1983;8(4):262-3.

\* cited by examiner

METHODS AND DEVICES FOR REDUCING ACTUAL AND PERCEIVED GLARE

TECHNICAL FIELD

The present disclosure relates generally to reducing glare in absolute terms and as it is perceived by observers viewing through partially transparent devices.

BACKGROUND

Optical glare is familiar when objects are viewed through partially transparent media such as windows, spectacle lenses, windshields, goggles, video monitors, and the like. Glare reduces one's ability to resolve detail in the field of view and can be distracting or even disabling. Referring to FIG. 1, a primary image is formed from a series of light rays that propagate through a partially transparent device, the pupil of an observer, and then onto their retina. If the light rays strike the device at normal incidence there is no refraction, though a proportion of the incident light is reflected at each air-device interface according to Fresnel's equations. For example, if the device is a flat plate of glass ($n_{glass}$~1.5) and $n_{air}$~1.0 then 4% is reflected from the first interface and 3.84% (=0.04*0.96) is reflected at the second, leading to transmission of 92.16% of the incident ray. Although the intensity of the ray is reduced by almost 8%, there is no change in the trajectory of its propagation through the optical elements of the eye, so that the image strikes the retina with the same spatial distribution as though the partially transparent device wasn't present. There is no glare.

This situation changes dramatically if the light is incident at any angle other than ninety degrees. Referring to FIG. 1, an illuminant (101) emits light rays (102) that strike a device (103) whose refractive index differs from the surrounding medium. Some of these rays (104) propagate in the direction of the partially transparent medium (105). Other of these rays (106) are reflected in the direction of an observer (107) who perceives a reflection of the object. Some rays (108) are refracted and propagate to an observer (109) who sees a transmitted image.

An established method of reducing or eliminating the reflected and transmitted glare images treats the surfaces of the partially transparent medium to reduce or eliminate reflections. A problem with these anti-reflection coatings is that their efficacy varies with the incident angle, polarization, and wavelength of light. Another problem with anti-reflection coatings is that they are mechanically fragile or brittle; when they crack or delaminate their contribution to glare reduction is eliminated. Yet another problem with these coatings is that they require expensive capital equipment for precisely controlled deposition of very thin films. Another problem with anti-reflection coatings is that deposition over large substrates such as automotive windshields or architectural glass is impractical. For these and other reasons an improved method for reducing the intensity of glare images, whether transmitted or reflected, is desirable.

Another problem with prior art is that it fails to account for the psychophysics of human perception. While it is widely known that the perception of light intensity varies with wavelength and average field illuminance, described as photopic (bright light), scotopic (night vision) and intermediate (mesopic) sensitivities, the perception of glare is different, as set forth for example in Fekete et al., Ophthalmic and Physiological Optics, 2010, 30, 182-187.

Yet another problem with prior art is that the wide dynamic range and nonlinearity of the human visual system are not explicitly or adequately incorporated into the design of glare reducing methods and devices.

SUMMARY

The present disclosure provides methods, systems, and compositions that reduce the actual and perceived glare when objects are viewed through or from partially transparent media.

Some embodiments relate to a device through which or from which an object is viewed, the device comprising semi-transparent material, and an optical absorber disposed in the semi-transparent material having greater absorption for optical wavelengths between approximately 380 nm and approximately 450 nm than for optical wavelengths between approximately 500 nm and 700 nm, wherein a first ratio of actual and/or perceived glare intensity to primary image intensity, integrated over all visible wavelengths, for the object viewed in transmission through or reflection from the device is less than a second ratio of actual and/or perceived glare to primary image intensity for the object viewed in transmission through or reflection from the device when the optical absorber is not disposed in the semi-transparent material.

Some embodiments relate to a method of making a device through which or from which an object is viewed, the method comprising: forming semi-transparent material containing an optical absorber, wherein the optical absorber disposed in the semi-transparent material exhibits greater absorption for optical wavelengths between approximately 380 nm and approximately 450 nm than for optical wavelengths between approximately 500 nm and 700 nm, and wherein a first ratio of actual and/or perceived glare intensity to primary image intensity, integrated over all visible wavelengths, for the object viewed in transmission through or reflection from the device is less than a second ratio of actual and/or perceived glare to primary image intensity for the object viewed in transmission through or reflection from the device when the optical absorber is not disposed in the semi-transparent material.

The foregoing and other aspects, implementations, acts, functionalities, features and, embodiments of the present teachings can be more fully understood from the following description in conjunction with the accompanying drawings.

DETAILED DESCRIPTION

Example embodiments incorporate one or more materials that absorb light at one or more wavelengths into wholly or partially transparent media to reduce actual and/or perceived glare when objects are viewed through the wholly or partially transparent media. The selection of these materials and their wavelength-dependent transmission characteristics may be based on one or a combination of the following characteristics: the wavelengths and polarization of light with which a field of view is illuminated, the reflectance spectra of objects in the field of view, and the geometry and orientation of the transparent object through which at least one of the objects is viewed. The psychophysical or perceived glare may additionally incorporate the wavelength and angular sensitivities of the human visual system.

The term "glare," as used herein, describes light rays that undergo one or more reflections in a partially transparent device.

The term "actual glare," as used herein, describes glare characterized by a paths and intensities that are quantitatively independent of human visual psychophysical factors.

The term "perceived glare," as used herein, describes glare that propagates through a viewer's pupil and onto its retina at spatial coordinates that differ from those of the primary image and whose ability to disturb or disable viewing of the primary image as a function of wavelength and angular displacement are explicitly incorporated.

Figure 2:
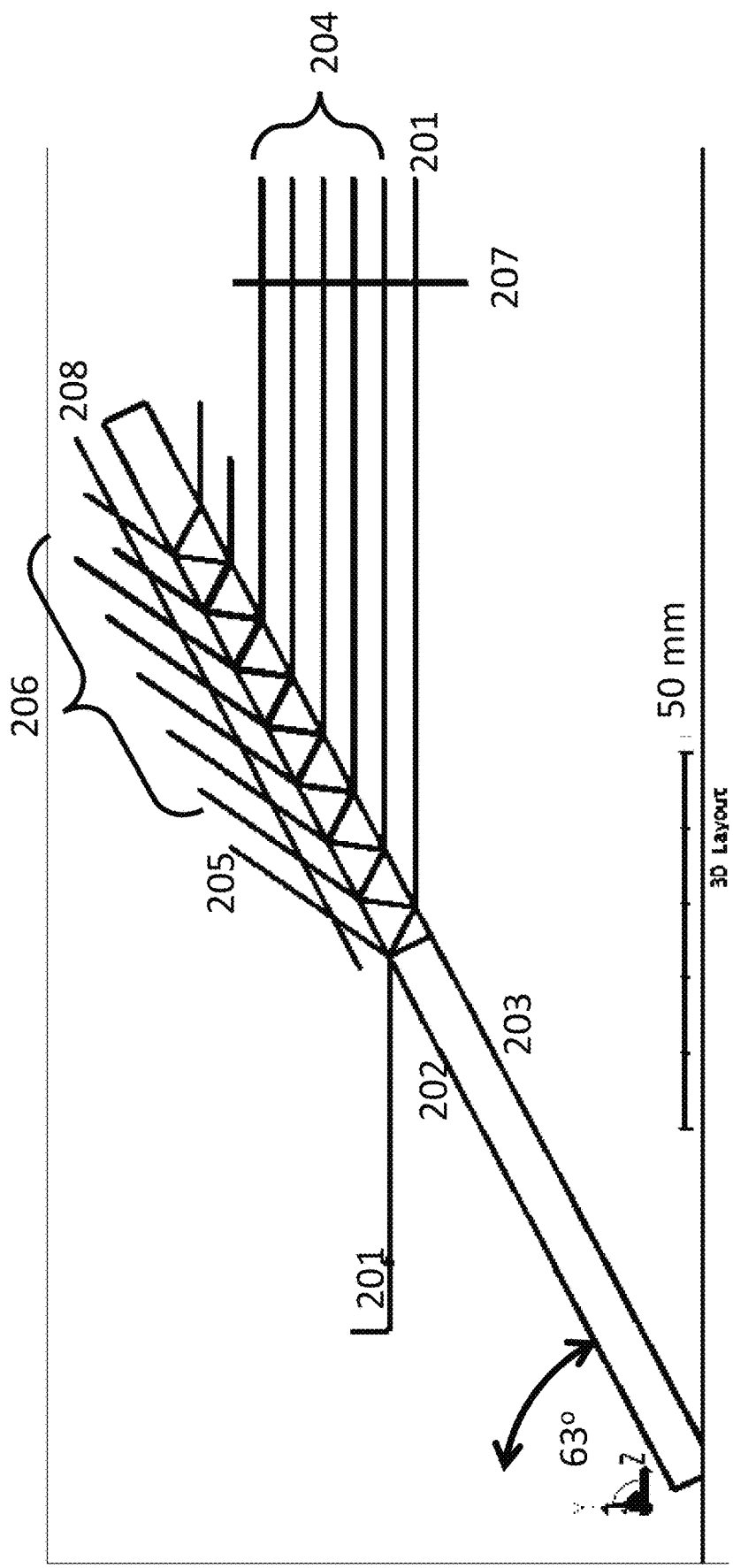
FIG. 2 illustrates the generation of reflected and transmitted glare images from a single incident ray striking a flat plate of transparent material oriented 63° from normal.

Referring now to FIG. 2 as an example system that produces glare, each primary ray (201) is refracted at the front (202) and rear (203) surfaces, leading to displacement of the primary image. However, a proportion of the primary ray is reflected at each interface, and the trajectories of these reflected rays differ substantially from that of the primary ray. One of these rays (205) is reflected from the front surface (202) and results in a primary reflected image. Other of these rays (206) undergo combinations of reflections and refractions that propagate in a direction not parallel to the primary ray; these contribute glare to the reflected image. Yet another set of these rays (204) undergo combinations of reflections and refractions that result in rays that are parallel to and displaced from the primary ray; these produced transmitted glare. In what follows the intensities and trajectories of transmitted rays (201, 204) are recorded at detector plane (207) and those of reflected rays (205, 206) are measured at detector plane (208). The magnitude of glare image displacement depends on the angle of incidence, the shapes, and geometric relationships of the front and back surfaces of the object as set forth in classical optics. When the front and rear surfaces are parallel the displacement of successive glare images increases monotonically with both incident angle and object thickness. These displacements differ when the surfaces are not parallel or when the object has internal refractive power, as in a lens, but generally the spatial extent of glare increases with thickness of the object and angles with which the primary image rays strike it.

Solving Maxwell's equations of electromagnetism is accomplished by computational methods that are established in the art of optical physics. In some embodiments, the software program OpticStudio (Zemax, Inc., www.zemax.com) may be used to evaluate the trajectories and intensities of primary and glare images. The solutions to Maxwell's equations depend on the shape and refractive index profile of the partially transparent device through which the object is viewed, the wavelength and polarization of incident light, and the geometric relationships among the illuminant, object, partially transparent medium, and viewer. Although an approach using Maxwell's equations may be used in some cases, simplified or approximate methods to solving the ray propagation may be used in other embodiments. For example, Fresnel's reflection and Snell's refraction equations may also be used along with equations that represent exponential decay of intensity for an optical beam passing through lossy material. The invention is not limited to explicitly solving Maxwell's equations in their full vector form.

Figure 3:
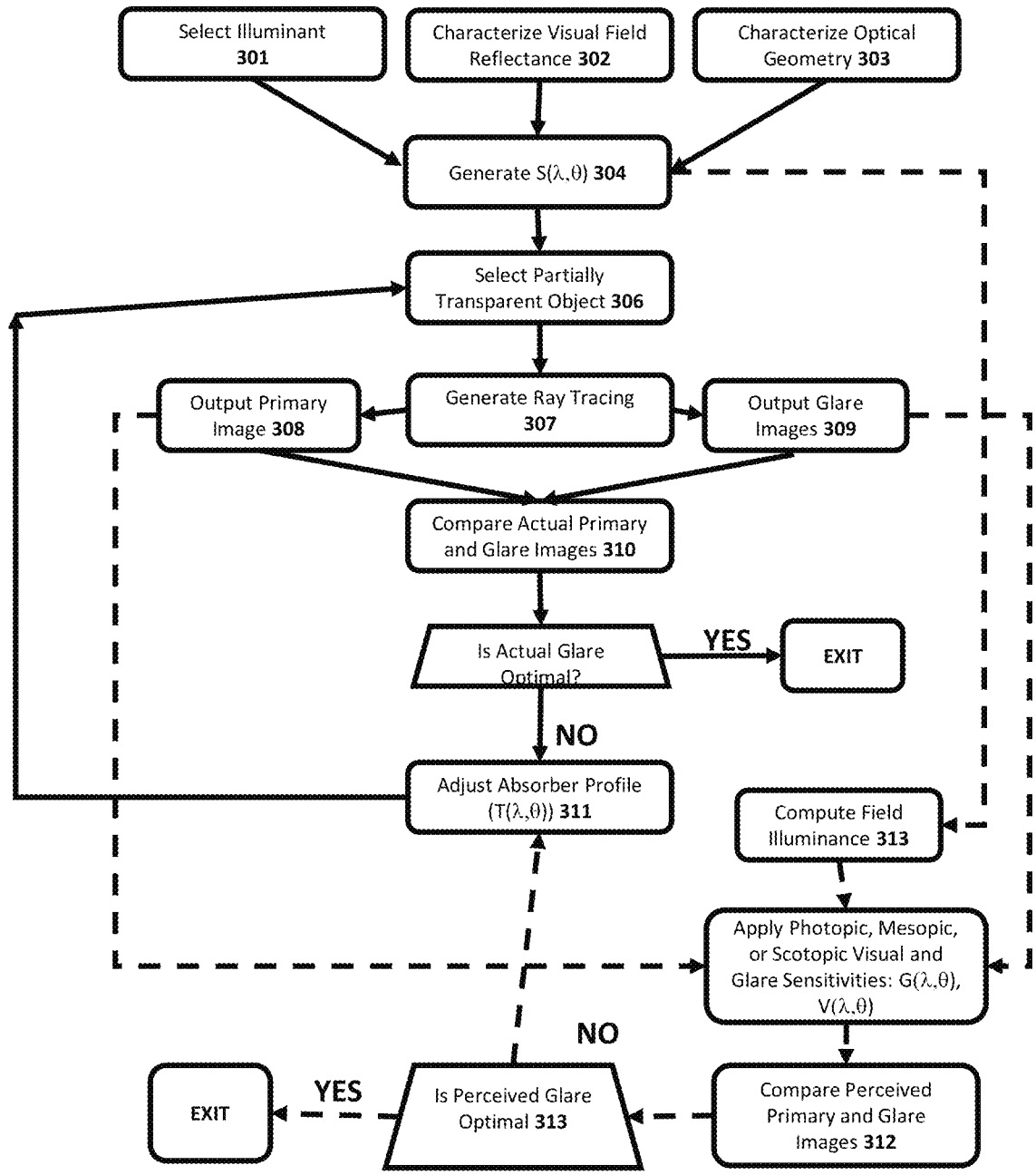
FIG. 3 is a logic diagram for the reduction of actual and perceived glare.

An example method for reducing actual and/or perceived glare can be understood with reference to FIG. 3. The first step in the design process is to characterize the illuminants (301), the reflectance functions of elements in the field of view (302), and their geometric relationship to the viewer (303). These factors generate an optical source whose variation with wavelength ($\lambda$) and angle ($\theta$) are specified as $S(\lambda,\theta)$ (304). The trajectories and intensities of these rays through the partially transparent object (306) are then calculated by solving Maxwell's equations, or approximations and/or simplified versions thereof, for propagation of electromagnetic radiation using standard ray tracing methods (307). These rays comprise a primary image (308) and a series of glare images (309) whose comparison (310) defines the relative spatial and intensity contributions of glare to the primary image. If the actual and/or perceived glare is greater than the desired targets, either in total intensity or spatial distribution characteristics, absorbing materials, coatings, or layers whose wavelength and polarization dependent absorptive and refractive properties are known are incorporated (311) into the partially transparent object (306). The logical loop indicated by solid lines is then repeated to produce new actual and glare images (310) that are compared to the glare targets. The loop is repeated while varying the wavelength dependent absorption properties of the absorber (311) in accordance with standard methods of numerical optimization so that the intensity may be minimized or the spatial distribution of the glare may be minimized or optimized with respect to variation of the absorber, in some implementations. In some cases, optimization may comprise reducing the actual and/or perceived glare intensity while reducing the intensity of a primary image (integrated over all visible wavelengths) by not more than a target value. In some implementations, a target value for the reduction of intensity of the primary image may be between 5% and 15%, inclusive of these end values. A reduction of intensity of the primary image by 5%, for example, means that 95% of the intensity of the primary image passes through the semitransparent object and can be received by a viewer. In some implementations, a target value for the reduction of intensity of the primary image may be between 10% and 20%, inclusive of these end values. In some implementations, a target value for the reduction of intensity of the primary image may be between 20% and 30%, inclusive of these end values. In some implementations, a target value for the reduction of intensity of the primary image may be between 30% and 50%, inclusive of these end values. According to some embodiments, a target value for the spatial distribution or smear of a glare image in no more than 5% of the image size. In some cases, a target value for the spatial distribution of a glare image in no more than 10% of the image size.

The optimization process described above may be repeated with varied scene illuminants (301), visual field reflectance values (302), and optical geometries (303), according to some embodiments. The optimization may also be performed subject to additional constraints as may be imposed by the intended application, such as a constraint on primary image intensity indicated in the example process. As additional examples of constraints, the rake angle of an automotive windshield may be constrained by the need to minimize aerodynamic drag, which indirectly constrains the available optical geometries (303), the selected illuminant (301) may be limited to indoor fluorescent light from a particular lamp, or the environment in an industrial facility may limit the values of field reflectance (302).

A second aspect of example embodiments explicitly incorporates the wavelength and angle dependent sensitivities of the human visual system to optimize the perceived image ratios (312). Referring still to FIG. 3 the image source $S(\lambda,\theta)$ (304) determines the field illuminance (313) that in turn indicates whether wavelength- and angle-dependent photopic, scotopic, or mesopic sensitivity functions for the primary and glare images are to be employed. These sensitivities are applied to the corresponding primary (308) and glare (309) images to generate perceived image intensity and contrast values (312). If the perceived glare is greater than the target values (313) absorber (311) is introduced as before, and the calculations shown by dashed lines are iterated as the absorber's characteristics are varied so that the perceived glare (313) is minimized or optimized.

In some implementations, a subtle constraint on the optimization process may optionally be added based on changes to the perceived colors of the primary image (308). The color distributions of the primary (308) and glare (309) images may be computed by standard methods such as the CIE L*a*b* uniform color space calculations. The color differences between the primary and glare images is quantified by the shifts in L*a*b* coordinates of each pixel in the primary image when compared to the glare images. This permits assessment of whether these shifts are visually perceptible by human observers and, if so, may provide useful contrast between the primary and glare images.

These and other aspects of the described embodiments can be understood by consideration of non-limiting examples included below. One example relates to glare mitigation in windshields of vehicles. Automotive windshields, for example, are generally inclined from vertical to reduce aerodynamic drag on the vehicle, and the angle subtended by an elevated vertical windshield on a tractor trailer, for example, implies that the angle subtended by the driver's field of view is also other than 90 degrees. An exemplar windshield geometry from a passenger vehicle is shown in FIG. 2, where an eye-level ray of light impinges on a windshield that is inclined at 63 degrees. Images perceived by the viewer are comprised of ensembles of these rays that propagate through the windshield at slightly differing angles and thence through their pupils onto their retinas. In the following we trace the fate of one such ray at two optical wavelengths, green (550 nm) and blue (410 nm).

Referring to FIG. 2, the randomly polarized incident rays (201) hit the windshield and are refracted (202) and reflected (205) to form primary transmitted and reflected images of the source, respectively. A portion of these rays are reflected and refracted at the interface between air and the windshield to produce a cascade of transmitted (204) and reflected (206) glare images. The relative intensities of the primary (201) and glare (204) transmitted images are displayed in FIG. 4A and summarized in Table 1.

TABLE 1

Figure 4A:
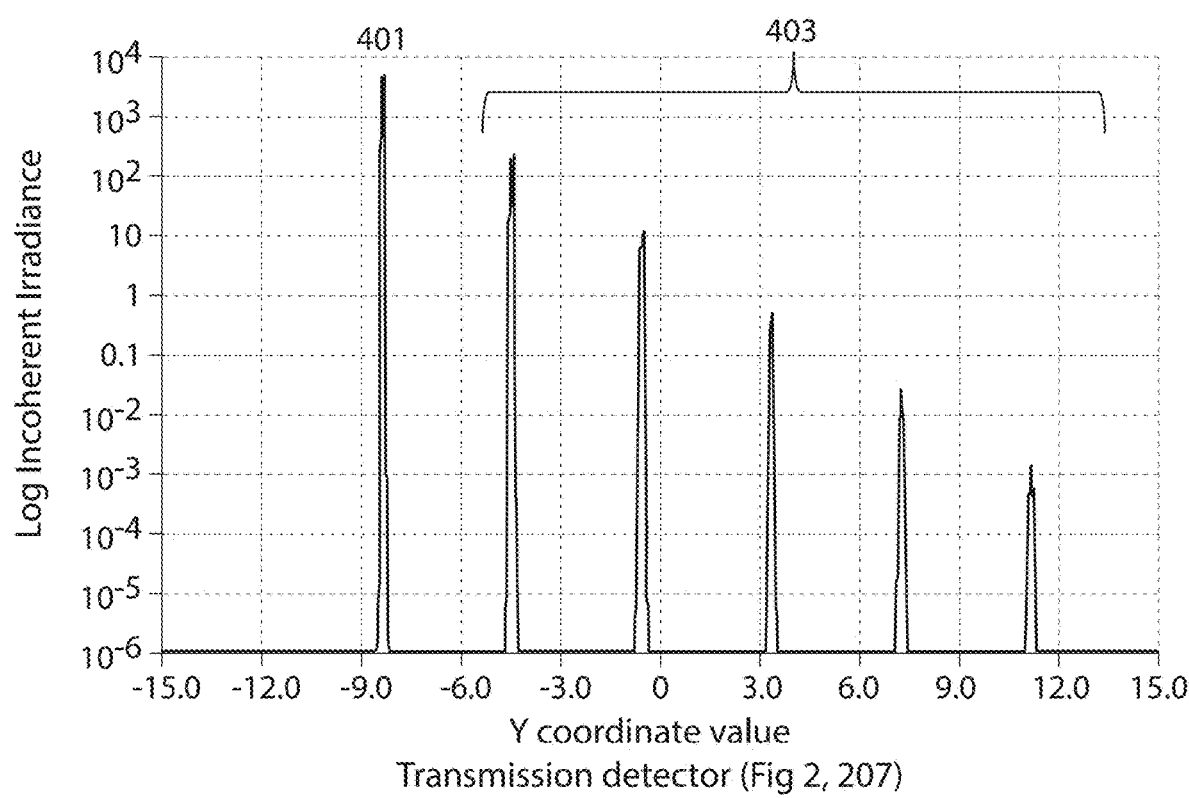
FIG. 4A plots the intensities of the primary (401) and successive glare rays (403) rays in transmission for the geometry shown in FIG. 2 (63 degree tilt, 410 and 510 nm).

Intensity of primary (401) and glare (403) rays corresponding to transmission in FIG. 4A.

| | Transmitted | | |
|---|---|---|---|
| | Green | Blue | Blue/Green |
| Primary | 5.00E+03 | 5.01E+03 | 1.00E+00 |
| Glare 1 | 8.81E+01 | 8.83E+01 | 1.00E+00 |
| Glare 2 | 3.96E+00 | 4.11E+00 | 1.04E+00 |
| Glare 3 | 1.78E−01 | 1.91E−01 | 1.07E+00 |
| Glare 4 | 7.99E−03 | 8.89E−03 | 1.11E+00 |
| Glare 5 | 3.59E−04 | 4.14E−04 | 1.15E+00 |

Transmission of the primary image is virtually identical at green and blue wavelengths, but the transmitted glare is slightly greater for blue, as indicated by the ratio of blue to green intensities, because the refractive index of the Schott BK7 glass modeled in the calculation (FIG. 7, 701) is slightly higher at 430 nm (1.528) than at 550 nm (1.518). A similar pattern is observed for the primary (205) and glare (206) reflected images, and is summarized in Table 2.

TABLE 2

Figure 4B:
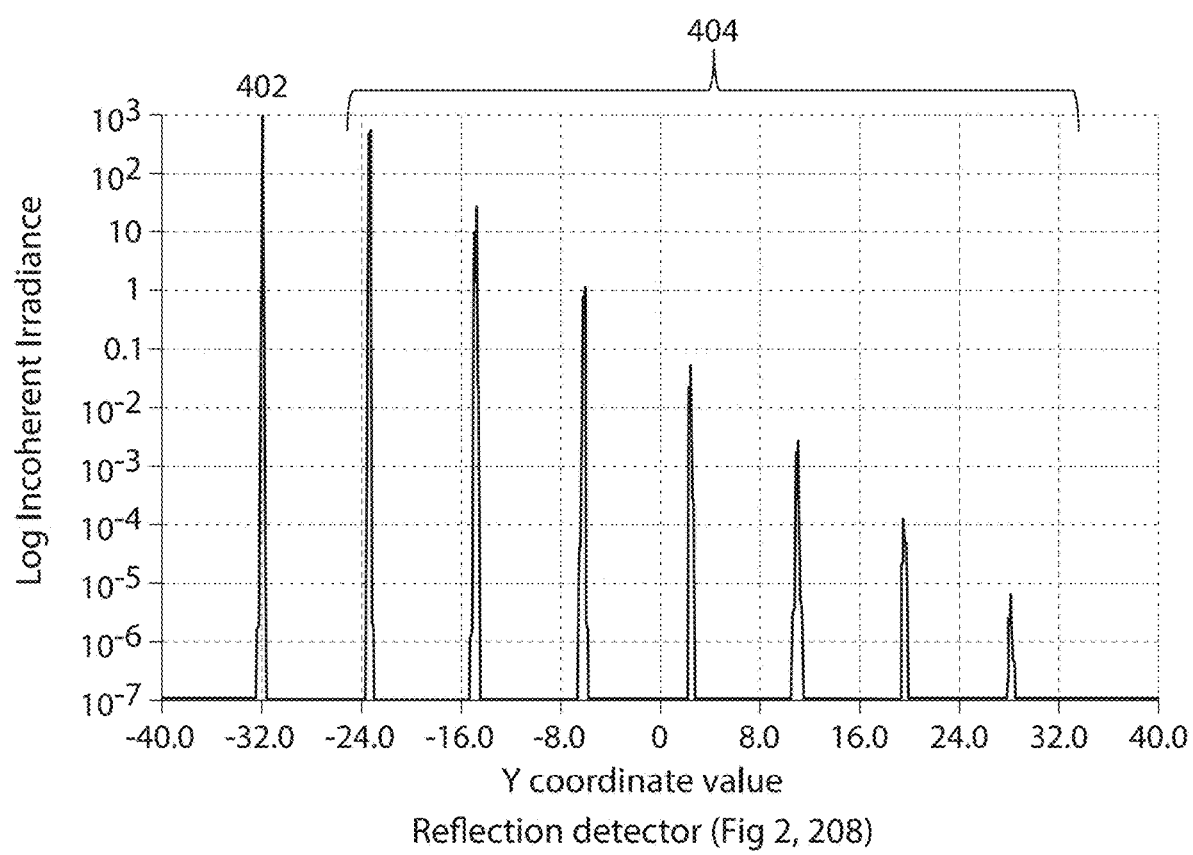
FIG. 4B plots the intensities of the primary (402) and successive glare rays (404) rays in reflection for the geometry shown in FIG. 2 (63 degree tilt, 410 and 510 nm).

Intensity of primary (402) and glare (404) corresponding to reflections in FIG. 4B.

| | Reflected | | |
|---|---|---|---|
| | Green | Blue | Blue/Green |
| Primary | 3.45E+02 | 3.44E+02 | 9.97E−01 |
| Glare 1 | 2.17E+02 | 2.14E+02 | 9.84E−01 |
| Glare 2 | 9.33E+00 | 9.51E+00 | 1.02E+00 |
| Glare 3 | 4.19E−01 | 4.43E−01 | 1.06E+00 |
| Glare 4 | 1.88E−02 | 2.06E−02 | 1.09E+00 |
| Glare 5 | 8.47E−04 | 9.59E−04 | 1.13E+00 |
| Glare 7 | 3.81E−05 | 4.46E−05 | 1.17E+00 |
| Glare 8 | 1.69E−06 | 2.06E−06 | 1.22E+00 |

As further elaborated below, glare is more acutely sensed at 410 nm than at 550 nm. A non-limiting example of the device, according to some embodiments, uniformly distributes an absorbing material with a transmission spectrum (505) shown in FIG. 5A in the windshield. The impact of this additive on the blue glare signals is highly nonlinear but has no influence on the green rays, as can be seen in FIG. 5B, FIG. 5C, FIG. 6A and FIG. 6B, and Table 3 below.

TABLE 3

Intensities in transmission and reflection with absorber at 430 nm (FIG. 5B, FIG. 5C, FIG. 6A, and FIG. 6B).

| | Transmitted | | |
|---|---|---|---|
| | Green | Blue | Blue/Green |
| Primary | 4.96E+03 | 1.08E+03 | 21.7639% |
| Glare 1 | 8.78E+01 | 8.88E−01 | 1.0108% |
| Glare 2 | 3.94E+00 | 1.90E−03 | 0.0481% |
| Glare 3 | 1.77E−01 | 4.02E−06 | 0.0023% |
| Glare 4 | 7.96E−03 | 0.00E+00 | 0.0000% |
| Glare 5 | 3.58E−04 | 0.00E+00 | 0.0000% |

| | Reflected | | |
|---|---|---|---|
| | Green | Blue | Blue/Green |
| Primary | 3.44E+02 | 3.51E+02 | 101.9756% |
| Glare 1 | 2.17E+02 | 1.00E+01 | 4.6288% |
| Glare 2 | 9.30E+00 | 2.05E−02 | 0.2206% |

TABLE 3-continued

Intensities in transmission and reflection with absorber at 430 nm (FIG. 5B, FIG. 5C, FIG. 6A, and FIG. 6B).

| | | | |
|---|---|---|---|
| Glare 3 | 4.18E−01 | 4.39E−05 | 0.0105% |
| Glare 4 | 1.88E−02 | 0.00E+00 | 0.0000% |
| Glare 5 | 8.44E−04 | 0.00E+00 | 0.0000% |
| Glare 7 | 3.79E−05 | 0.00E+00 | 0.0000% |
| Glare 8 | 1.68E−06 | 0.00E+00 | 0.0000% |

As expected, the insertion of an absorber reduces the amount of blue light by 78% in the blue primary image and has no effect on the primary reflected image since those rays never impinge on absorbing material. The intensities of the green glare signals are unchanged. However, blue glare is reduced in spatial extent from 21 to 12 mm in transmission (FIG. 5B and FIG. 5C, 503 & 504), and from 62 to 24 mm in reflection (FIG. 6A and FIG. 6B, 603 & 604). These displacements of the glare signals are well resolved by the eye's angular resolution of 0.02°; for example when the windshield is set 1 meter from the observer's pupil each millimeter of displacement corresponds to an angular offset of −0.06°, so the transmitted glare is reduced by 27 times the eye's resolution limit. The intensities of glare are also dramatically reduced, as seen in the blue/green ratios in Table 3. In this exemplary embodiment blue glare signals beyond the $4^{th}$ are less than $10^{-10}$ of the primary and are therefore not perceptible based on the dynamic range of the human visual system. The quality and resolution of an image is degraded by actual and/or perceived glare because, despite its lesser intensity, it reduces the intensity and color contrast that forms the basis of object recognition.

Figure 12A:
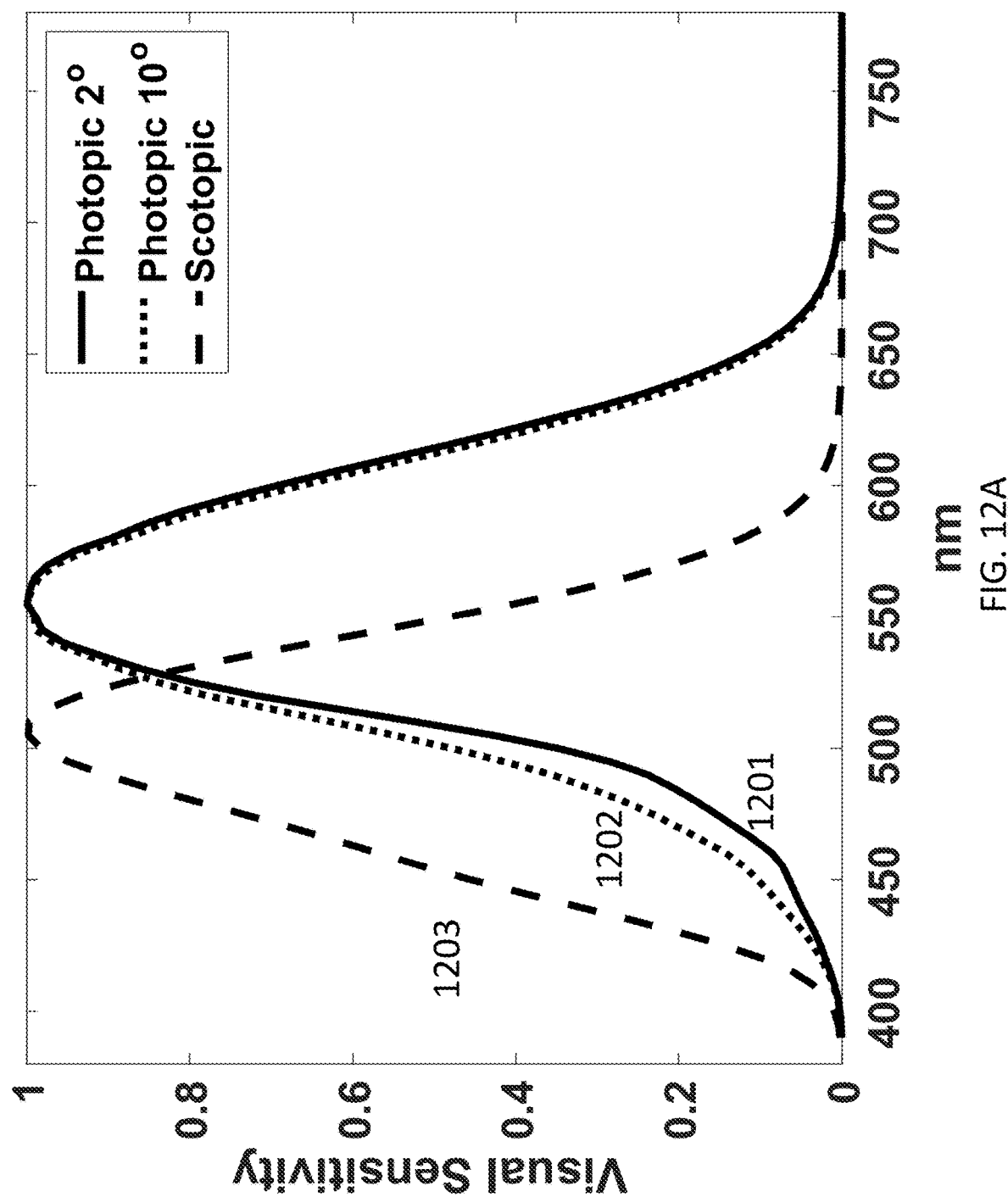
FIG. 12A displays the wavelength dependent sensitivity of the human eye under photopic illuminance conditions viewed at 2° (1201) and 10° (1202) image fields, under scotopic field illuminance (1203).
Figure 12B:
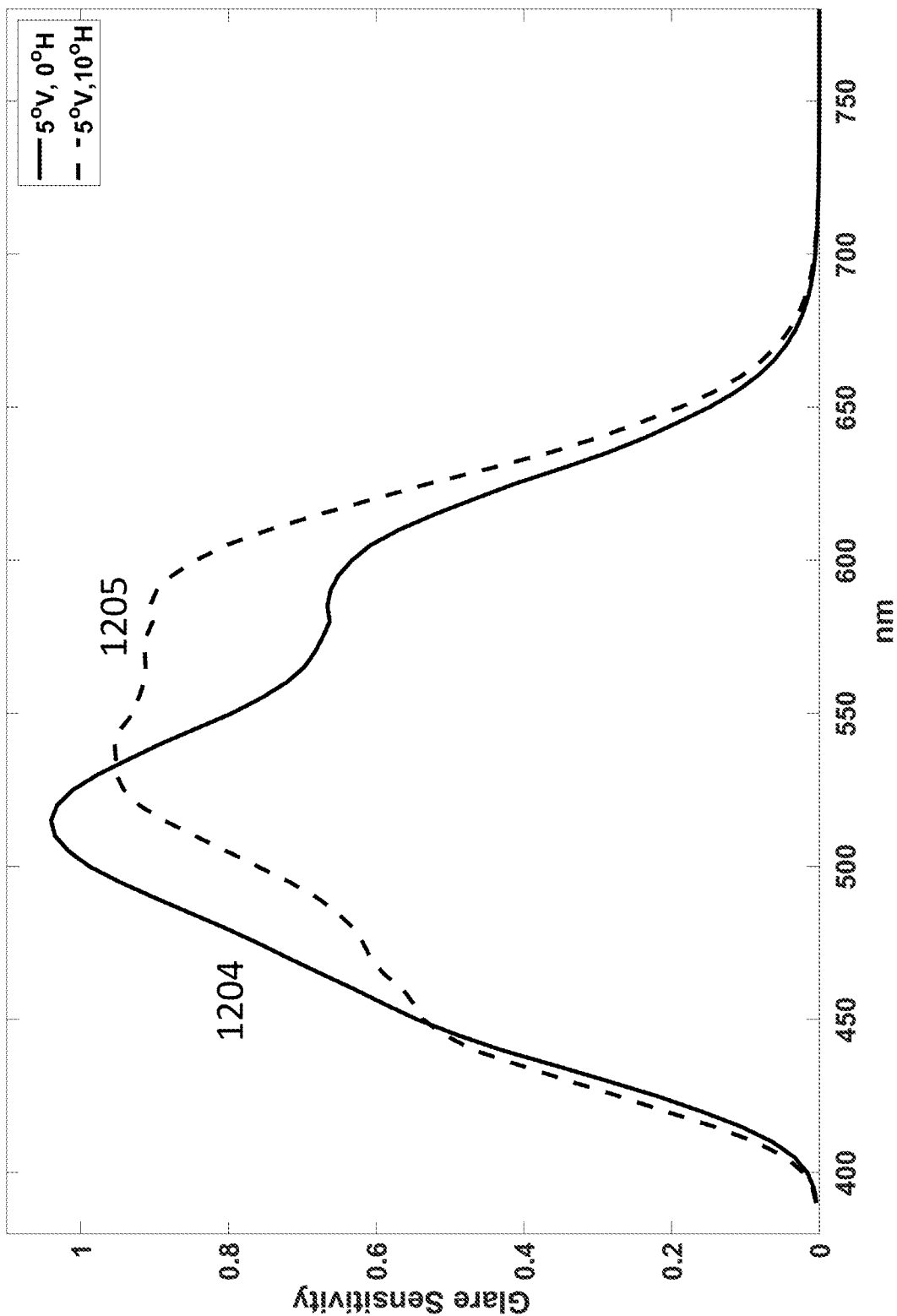
FIG. 12B displays human glare sensitivities offset by 5° vertical and 0° (1204) and 10° (1205) horizontal from central fixation from Fekete et al.

An important aspect of this embodiment is the selective absorption of light that contributes to the perception of glare while maintaining luminous transmission, which is defined in the art as the ratio of transmitted to incident light. The perception of glare depends in part on the product of the scene illumination, the reflectance of objects in the field of view, and a visual sensitivity function selected based on overall scene illumination from bright (photopic), intermediate (mesopic), or dim (scotopic) sources. These field brightness figures correspond roughly to daylight, twilight, and nighttime, respectively. In more quantitative terms, photopic sensitivity is appropriate above about 3 candelas per square meter ($cd/m^2$); mesopic sensitivity operates from ~3 $cd/m^2$ to ~0.01 $cd/m^2$; and scotopic sensitivity applies below ~0.01 $cd/m^2$. Referring to FIG. 12A, the photopic sensitivity for 2° (1201) and 10° (1202) fields of view and scotopic sensitivity (1203) are quite different from those for glare sensitivity (FIG. 12B) at 5° vertical and 0° (1204) or 10° (1205) horizontal displacements from central fixation. According to some embodiments, angular and wavelength dependence is quantified under photopic illumination by the formulae: $Vdgl(\lambda) = \{a*V'(\lambda) + b*[1.62L(\lambda) + M(\lambda)]\} + c*[L(\lambda) - M(\lambda)] + d*[(1.62L(\lambda) + M(\lambda) - e*S(\lambda)]$ where Vdg is the discomfort glare, V' is the contribution from rod photoreceptors, L, M, and S are contributions from the long, mid, and short wavelength cone photoreceptors, and the coefficients {a,b,c,d,e} are {0.963, 0.0613, 0.719, 0.082, and −1.395} respectively for 0° horizontal and 5° vertical and {0.606, 0.157, 0.751, 0.109, and −2.3452} respectively for 10° horizontal and 5° vertical orientation with respect to central fixation (Fekete et al., Ophthalmic and Physiological Optics, 2010, 30, 182-187).

Figure 13:
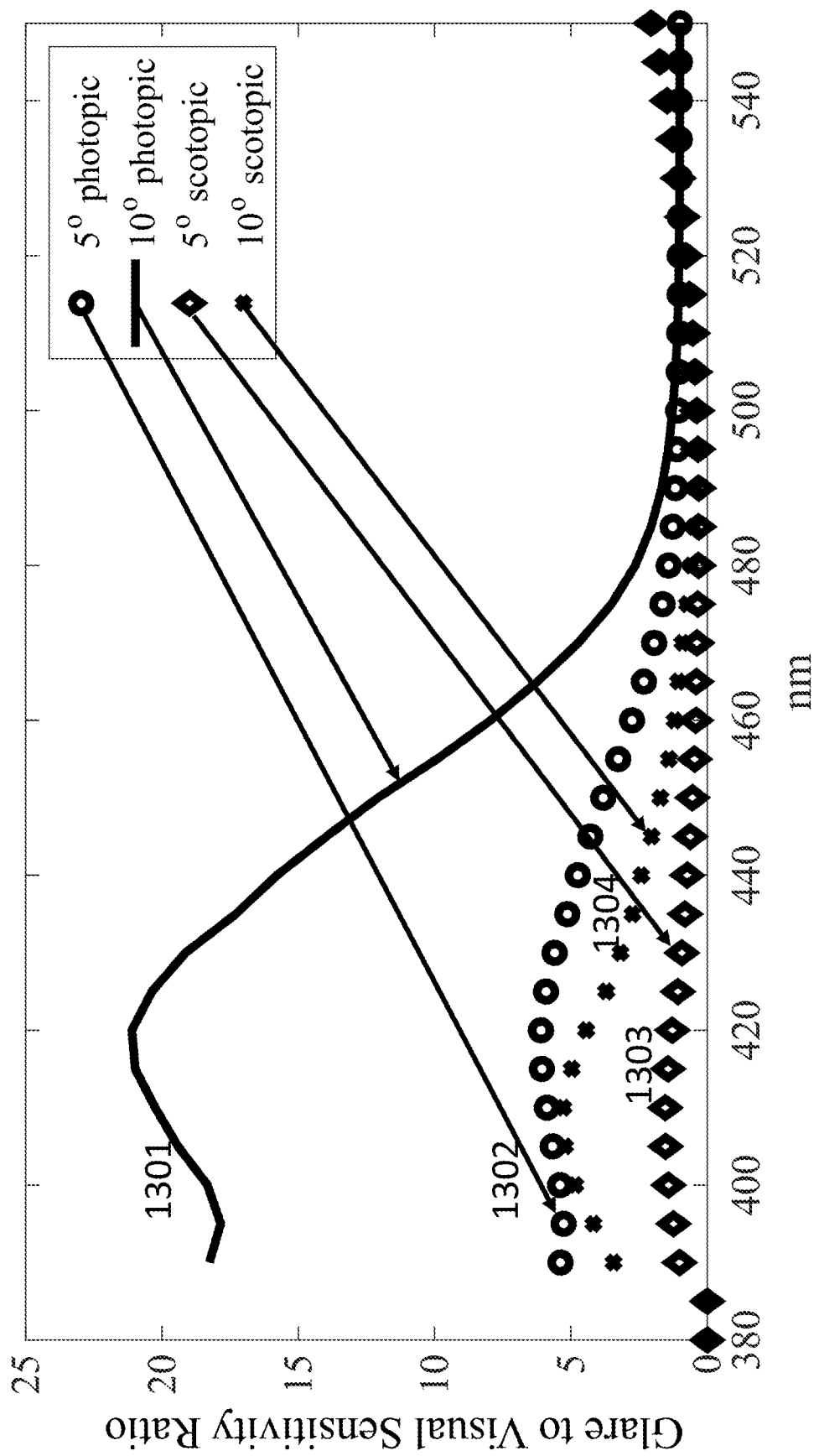
FIG. 13 displays the wavelength-dependent ratios of glare to visual sensitivities at two angles under photopic (1301, 1302) and scotopic (1303, 1304) field illuminance levels.

In other words, the perceived impact of the image and its glare counterparts varies dramatically with wavelength and angle of incidence. This variance is captured by comparing ratios of sensitivities to glare, $G(\lambda,\theta)$ to those for the field of view, $V(\lambda,\theta)$. FIG. 13 displays four exemplary sensitivity ratios. The ratio of glare images perceived within 5° of central fixation to that of a primary image perceived in the central 2° under photopic conditions (>3 $cd/m^2$) (1302) shows that wavelengths below about 530 nm contribute to glare more than to visual perception. This effect is even more pronounced for images at 10 degrees from central fixation (1301), while it is less when the viewing conditions are scotopic (1303, 1304). The dependence of perceived glare on wavelength and angle under mesopic field conditions follows the same logic and is complicated by the interplay of the three (or four) retinal cones, rods, and embedded photoreceptors whose properties and mosaic on the retina underlie the wavelength and angle dependencies of visual perception.

Absorbing media that capture all of the incident rays obviously produce no glare, but also produce no image—they are opaque. An aspect of the present embodiments is that absorbing materials such as dyes, dopants, and the like, are selected to disproportionately absorb light at wavelengths that are disproportionately perceived as glare.

The sensitivity functions for glare, $G(\lambda, \theta)$, and visual perception, $V(\lambda, \theta)$, vary with the angle of incidence at the eye because different regions of the retina have differing wavelength dependent sensitivities. This effect is summarized, for example, for glare perception in Bullough (Journal of Modern Optics, 56(13), 1518-22 (2009) and Fekete et al. (Ophthalmic and Physiological Optics, 26, 313-17 (2006) and 30, 182-87 (2010) and for visual perception, for example, in G. Wyszecki and W. S. Stiles, *Color Science: Concepts and Methods, Quantitative Data and Formulae* (Wiley:NY) 1982, each incorporated herein by reference.

An example design method of the present embodiments considers first the illumination and spectral reflectance or emission characteristics for a field of view, $S(\lambda, \theta)$. These generate the primary image that is subsequently viewed through the partially transparent device. An example field of view may be a dark street having no street lights and an oncoming vehicle with LED headlights. In some cases, a single field of view scenario may be used to According to some embodiments, a single scenario may be used for design purposes to optimize absorber composition, concentration, and spectral absorption characteristics. In other embodiments, a statistical representation of varying fields may be used to optimize the absorber composition, concentration, and spectral characteristics in order to improve visibility of the primary images over perceived glare. A statistical representation may consider additional, different conditions, such as other types of headlights (incandescent, halogen, etc.), the presence of streetlights, turning of the viewer's head to different angles in an effort to reduce glare, a following vehicle visible in one or more rear-view mirrors, etc.

In some cases, a ratio of visibility of the primary image to actual or perceived glare is maximized. For example, an automotive windshield according to some implementations would, for nighttime scenarios, evaluate perceived glare image profiles and intensities from scenes illuminated by headlamps and streetlamps and primary images perceived by scotopic or mesopic vision. The spectral contents of light-emitting diode, high intensity discharge, sodium vapor, and quartz halogen lamps that illuminate nocturnal scenes are multiplied by reflectance distributions for representative objects to get $S(\lambda, \theta)$, and then the relative contributions to vision and glare are calculated by integrating the product with the appropriate $G(\lambda, \theta)$ and $V(\lambda, \theta)$ to estimate the total energy contributing to perceived glare and image formation, respectively.

Another example of this embodiment compares the primary and glare images produced by daylight illumination with photopic sensitivity. In mathematical terms let $G(\lambda, \theta)$ and $V(\lambda, \theta)$ be the sensitivity functions for glare and normal vision, respectively, and let $S(\lambda, \theta)$ be the scene illumination as shaped by the entrance pupil and geometrically propagated to the retina. The ratio of perceived glare to perceived image intensities is given for each scene by $$\int\int \frac{G(\lambda, \theta)S(\lambda, \theta)}{V(\lambda, \theta)S(\lambda, \theta)} d\lambda d\theta \qquad \text{(Equation 1)}$$

Figure 5A:
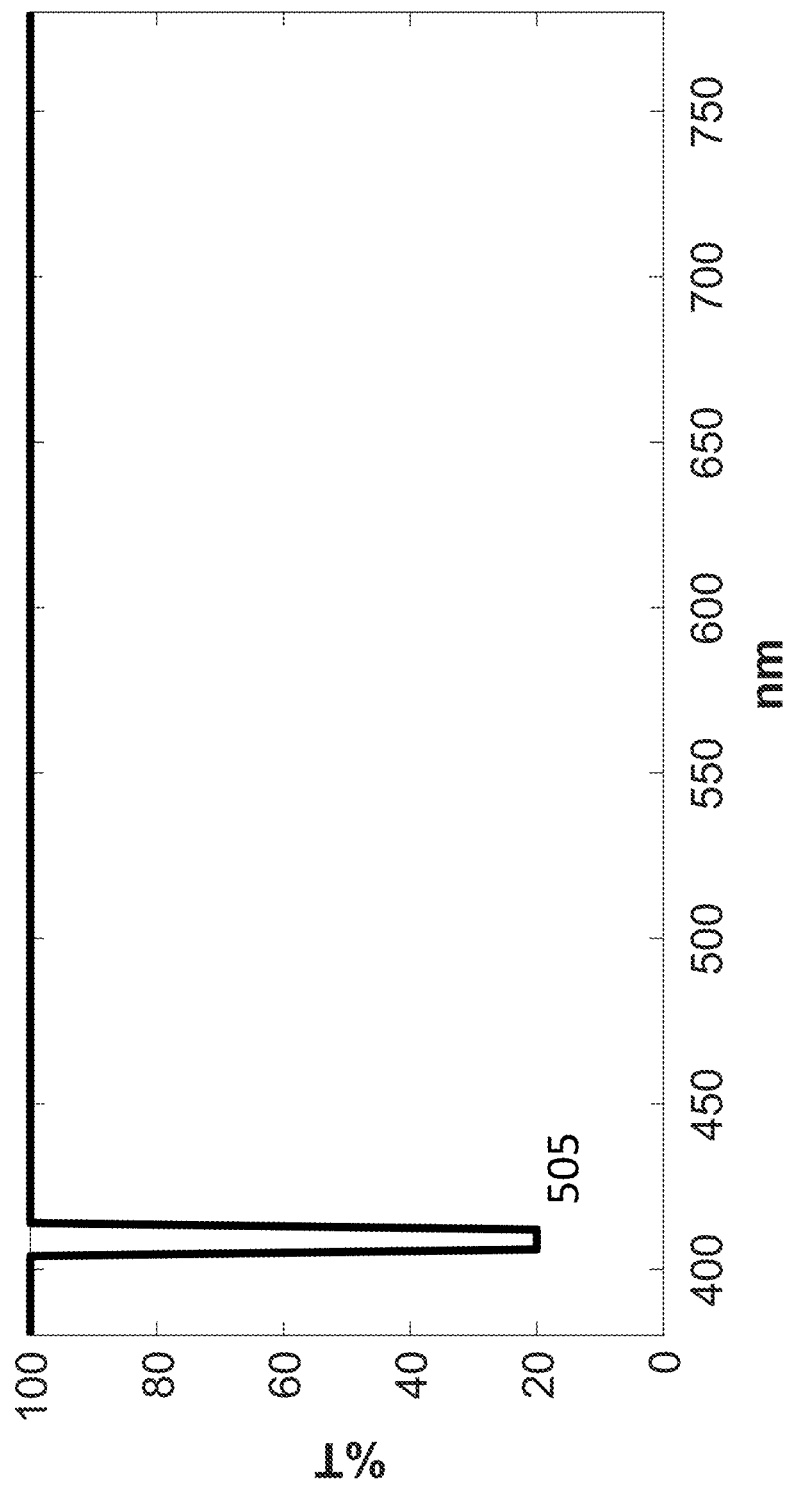
FIG. 5A shows the wavelength dependence of internal transmission for an example embodiment.
Figure 5B:
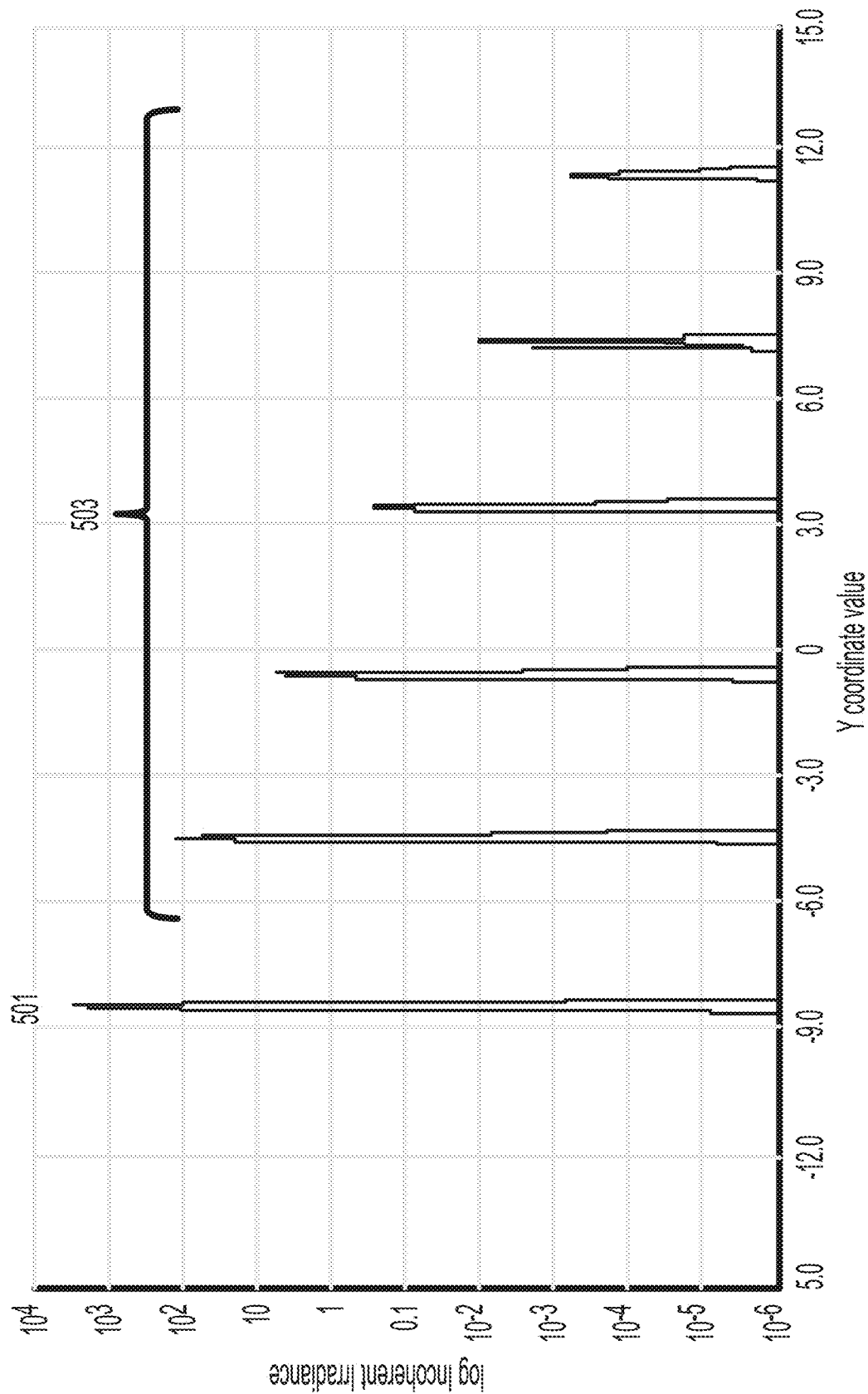
FIG. 5B shows the logarithm of the primary (501) and glare (503) ray intensities transmitted at 550 nm without internal absorption for the geometry shown in FIG. 2
Figure 5C:
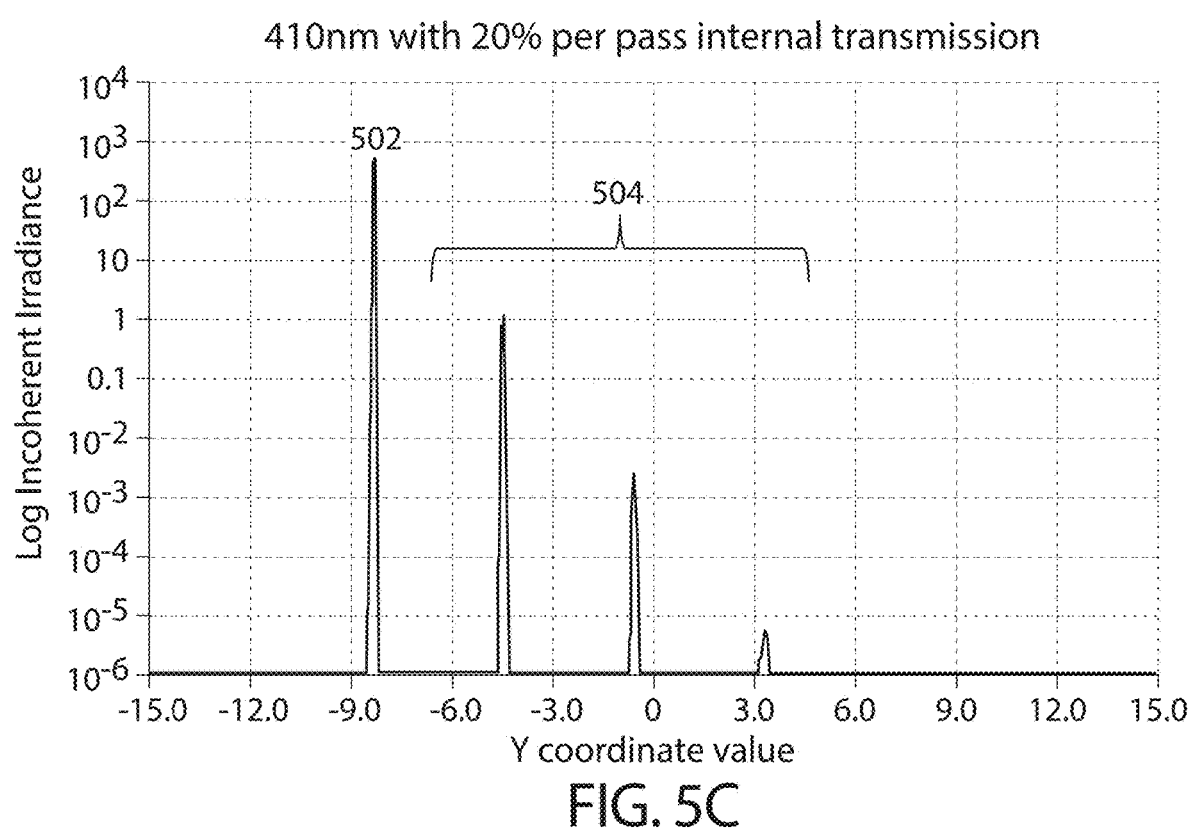
FIG. 5C shows the logarithm of the primary (502) and glare (504) ray intensities with 20% per pass internal transmission at 410 nm using the absorber with transmission spectrum shown in FIG. 5A.
Figure 6A:
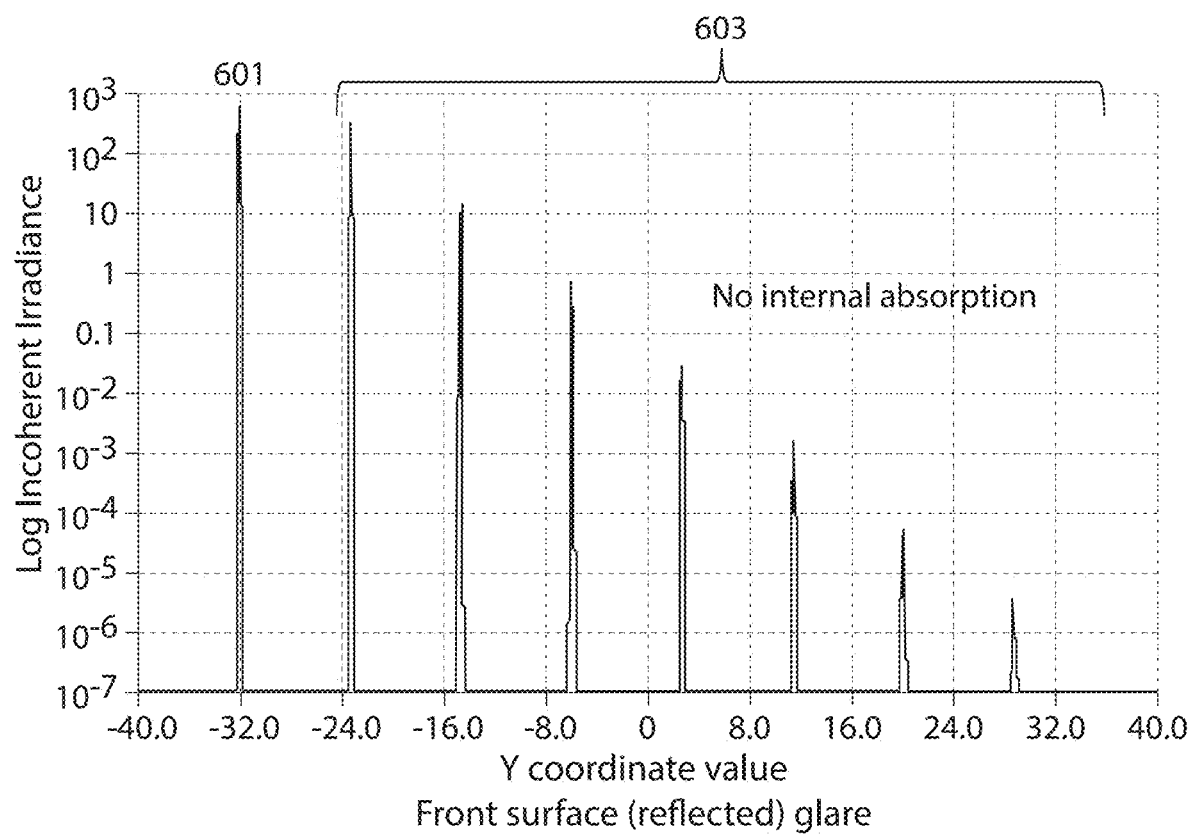
FIG. 6A plots the intensities of the primary (601) and glare (603) rays reflected off of the front surface with no internal absorption at 550 nm.
Figure 6B:
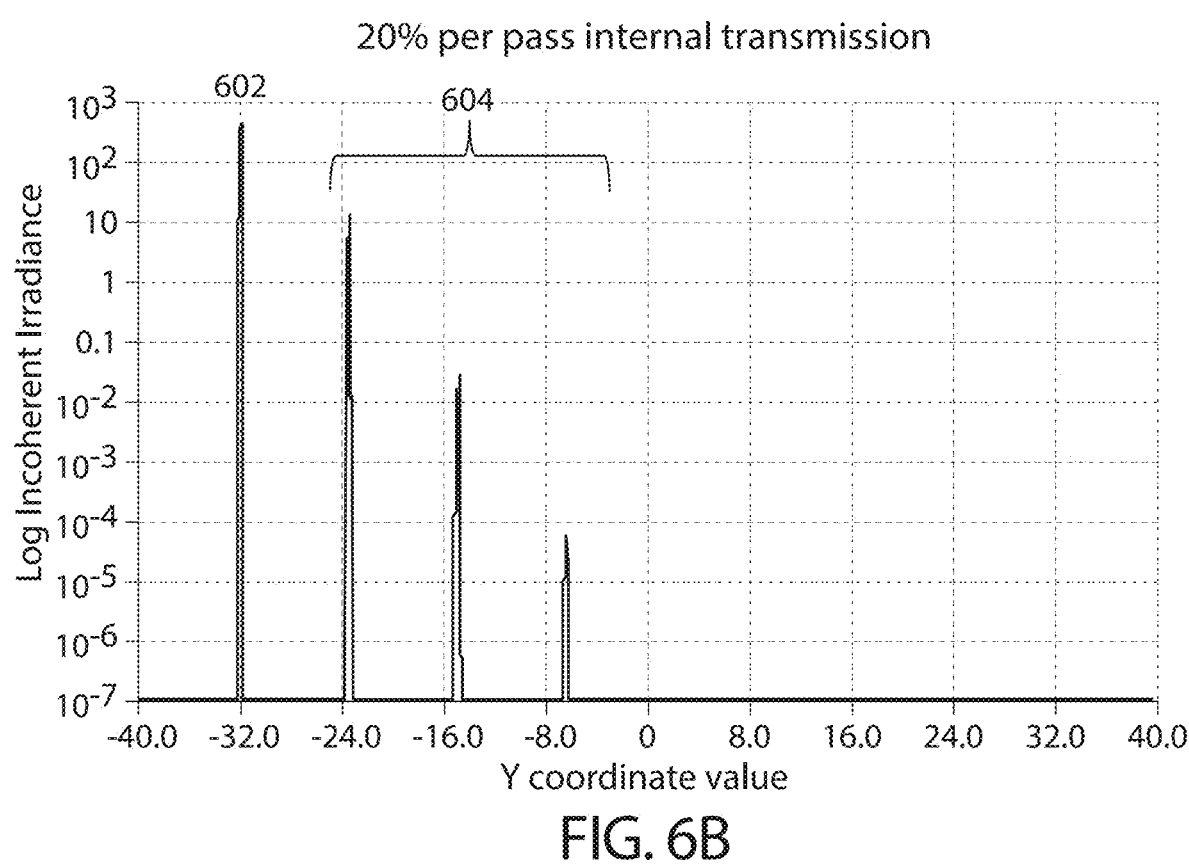
FIG. 6B plots the intensities of the primary (602) and glare (604) rays reflected off of the front surface with 20% per-pass transmission at 410 nm.

An aspect of the present embodiments is that introduction of an absorber modifies Equation 1 by introducing wavelength dependent transmission functions $T(\lambda, \theta)$ into the numerator and denominator of the integrand:

$$\sum_n \int\int \frac{G(\lambda, \theta)S(\lambda, \theta)T(\lambda, \theta)^n}{V(\lambda, \theta)S(\lambda, \theta)T(\lambda, \theta)} d\lambda d\theta \qquad \text{(Equation 2)}$$

wherein the $n^{th}$ glare image is reduced by the transmission to the $n^{th}$ power where n is the number of passes that the glare ray makes through the partially transparent device. The primary image is attenuated by only one pass through the absorbing medium. In other words, multi-pass absorption by a composition that attenuates transmission at one or more wavelengths reduces actual and/or perceived glare exponentially more than it attenuates the primary image, and this reduction is amplified by consideration of the ratio $G(\lambda, \theta)/V(\lambda, \theta)$. Referring to FIG. 5B, the primary transmitted glare ray (502) passes through the absorbing medium once, while the glare rays (504) transit the absorber 3, 5, and 7 times, respectively.

A direct consequence of example embodiments is that the internal absorber causes the amount of energy presented as actual and/or perceived glare to be reduced more rapidly than the amount of energy presented to the viewer as the primary image. In other words, addition of the absorber reduces the ratio of glare to image intensities because $T(\lambda, \theta)$ is always less than or equal to one in the ratio:

$$\sum_n \int\int \frac{S(\lambda, \theta)G(\lambda, \theta)T(\lambda, \theta)^n}{S(\lambda, \theta)V(\lambda, \theta)T(\lambda, \theta)} d\lambda d\theta = \qquad \text{Equation 3}$$

$$\sum_n \int\int \frac{G(\lambda, \theta)T(\lambda, \theta)^n}{V(\lambda, \theta)T(\lambda, \theta)} d\lambda d\theta$$

so its contribution to the ratio, $(T(\lambda, \theta)^n/T(\lambda, \theta))$, is therefore always also less than or equal to one. In an example design process, the range of integration over wavelength may be over a visible wavelength range, e.g., from 380 nm to 800 nm. The range of integration over angles may be from central fixation at a viewer's location (0 degrees) to 45 degrees from central fixation. In some implementations, the range of integration over angles may be from central fixation to 20 degrees from central fixation. In EQ. 2 and EQ. 3, the value of transmission T may be expressed in terms of the angle $\theta$ (angle from central fixation at a viewer location) by taking into account the geometric and optical arrangement of the viewer location and semitransparent object. For example, an optical ray passing through a semitransparent object and received at an angle $\theta$ at a view location will have a unique path to the viewer, so that an angle of incidence of an optical ray at a first surface of the semitransparent object can be determined from the angle $\theta$.

Actual Glare

Figure 16:
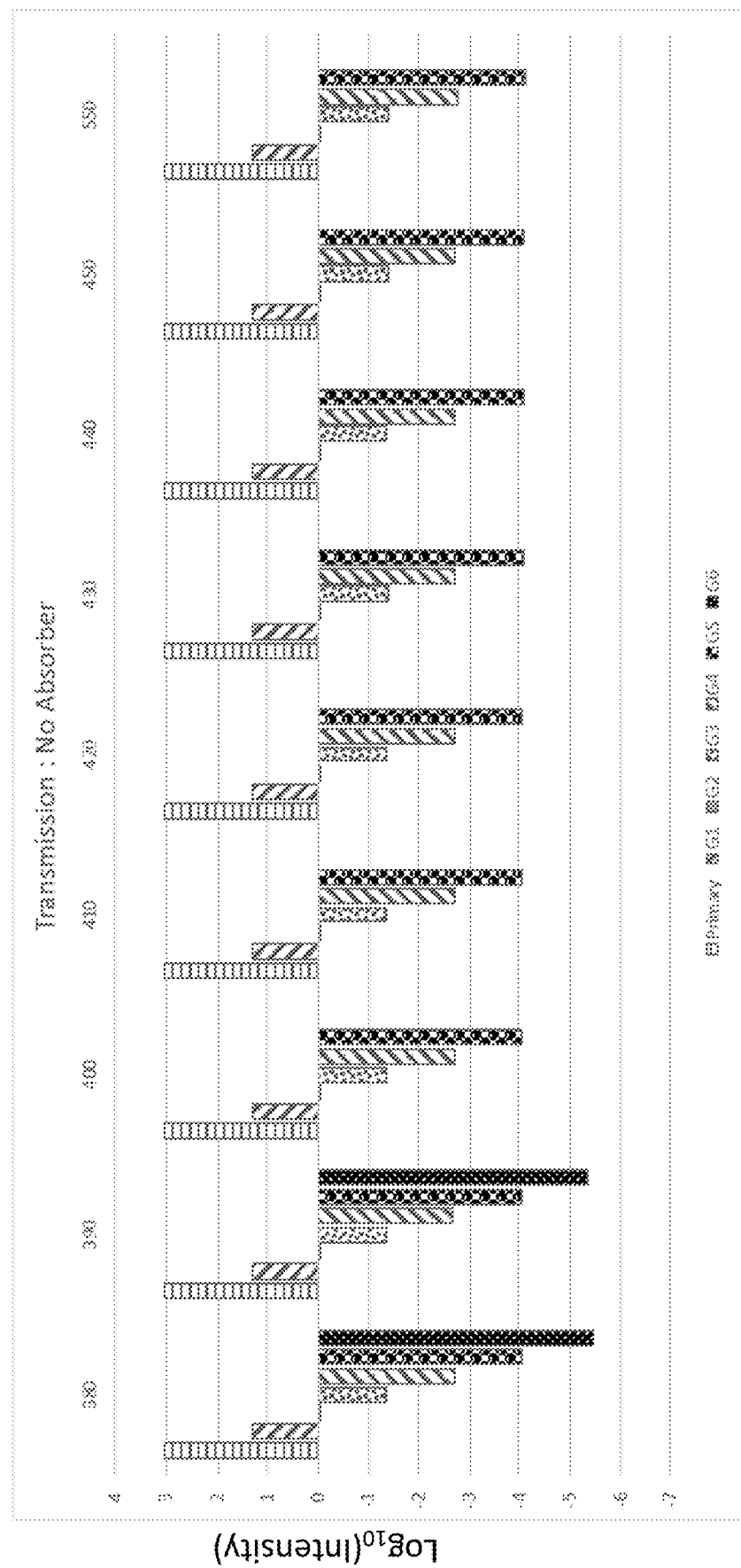
FIG. 16 plots the logarithm of beam intensities for the primary and first six glare beams through BK7 at 9 selected wavelengths (380, 390, 400, 410, 420, 430, 440, 450, and 550 nm).
Figure 17:
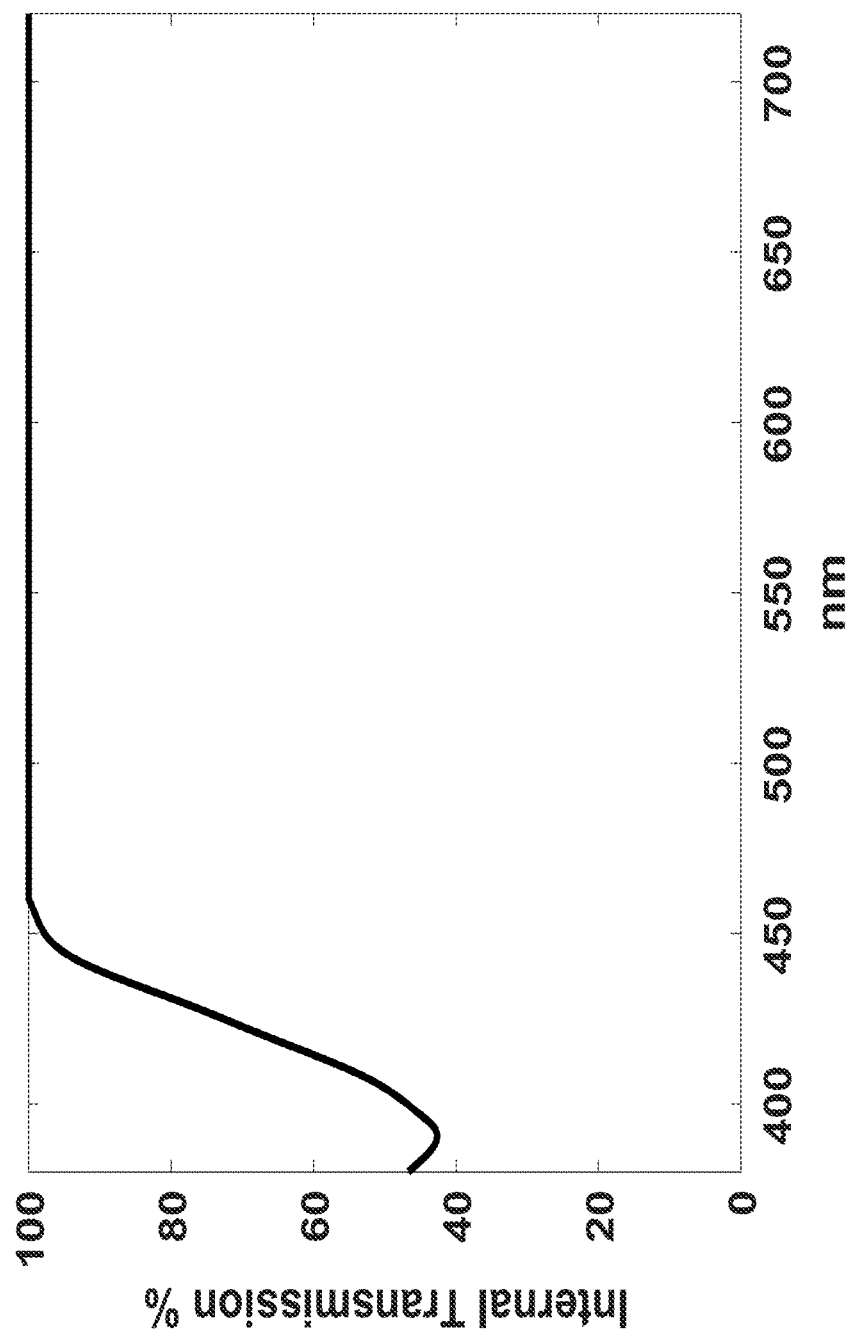
FIG. 17 plots the internal transmission spectrum of the glass with an exemplar organic dye added to the windshield.
Figure 18:
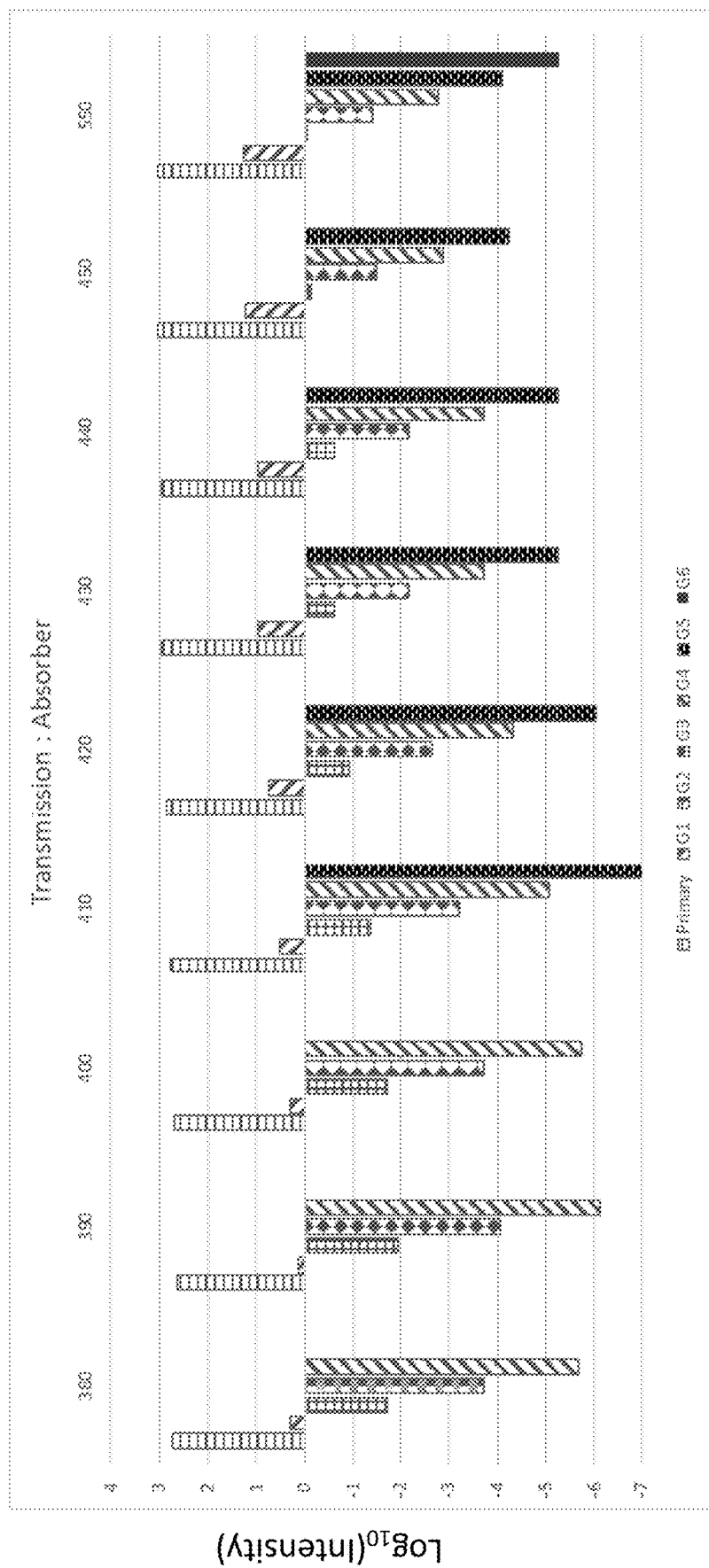
FIG. 18 displays the primary and glare intensities transmitted under the same conditions as FIG. 16 with glass whose internal absorption is shown in FIG. 17.
Figure 19:
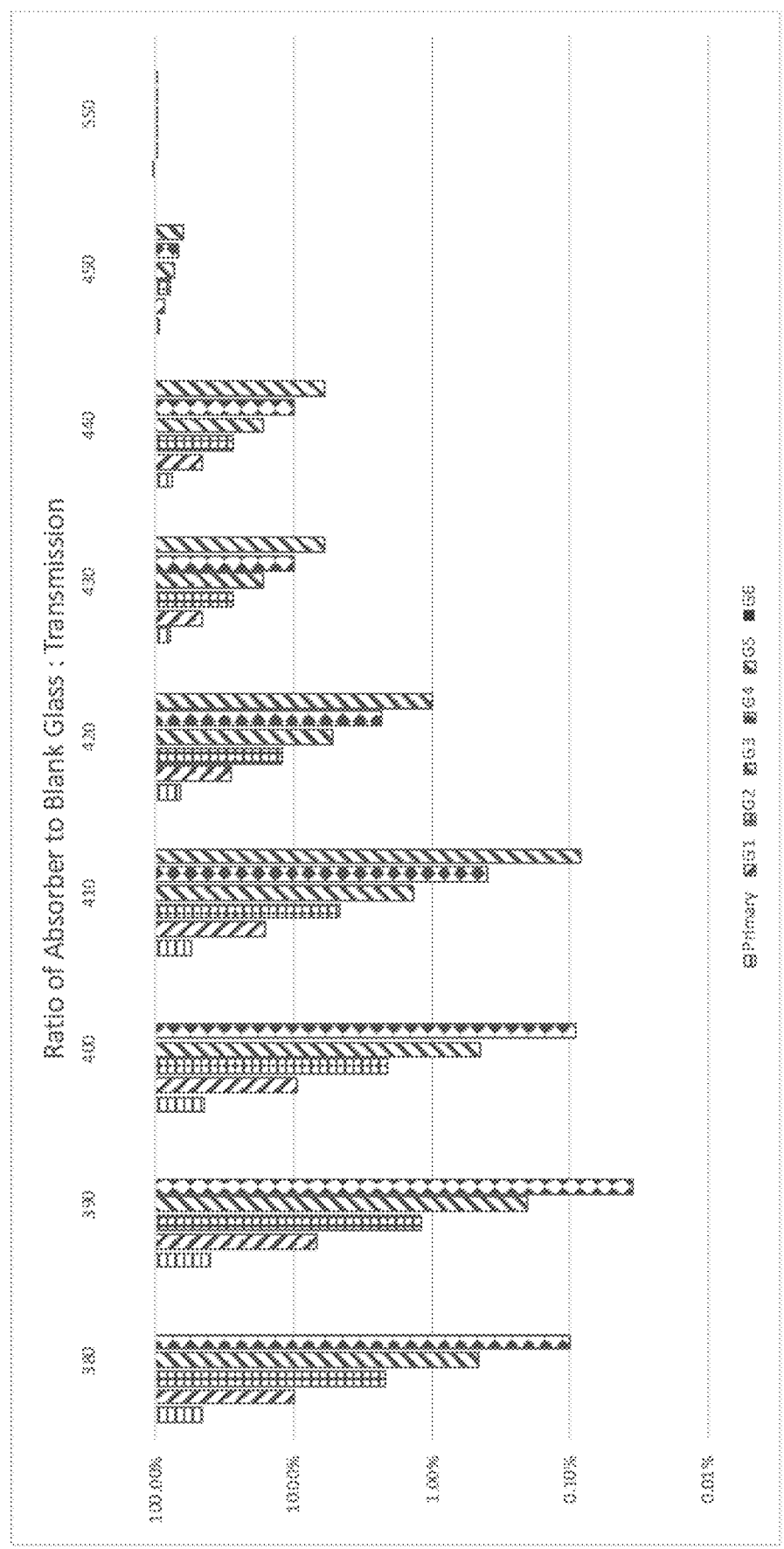
FIG. 19 plots the attenuation of the primary and glare beams transmitted with and without the added absorber.
Figure 20:
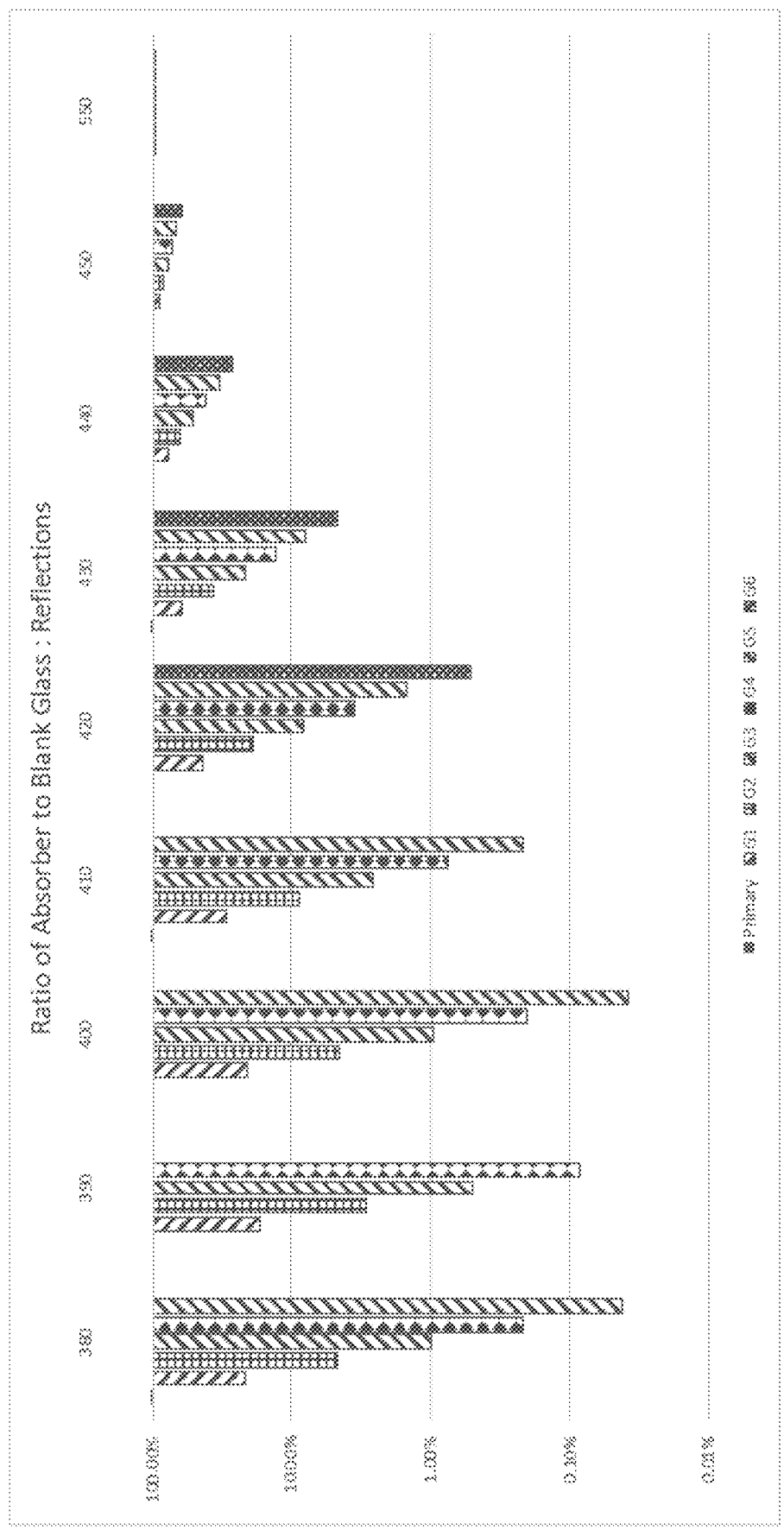
FIG. 20 displays the same ratio as FIG. 19 except the glare rays are viewed as reflections from the exterior of the windshield glass as shown in ray (106) and observer (107) of FIG. 1.
Figure 21:
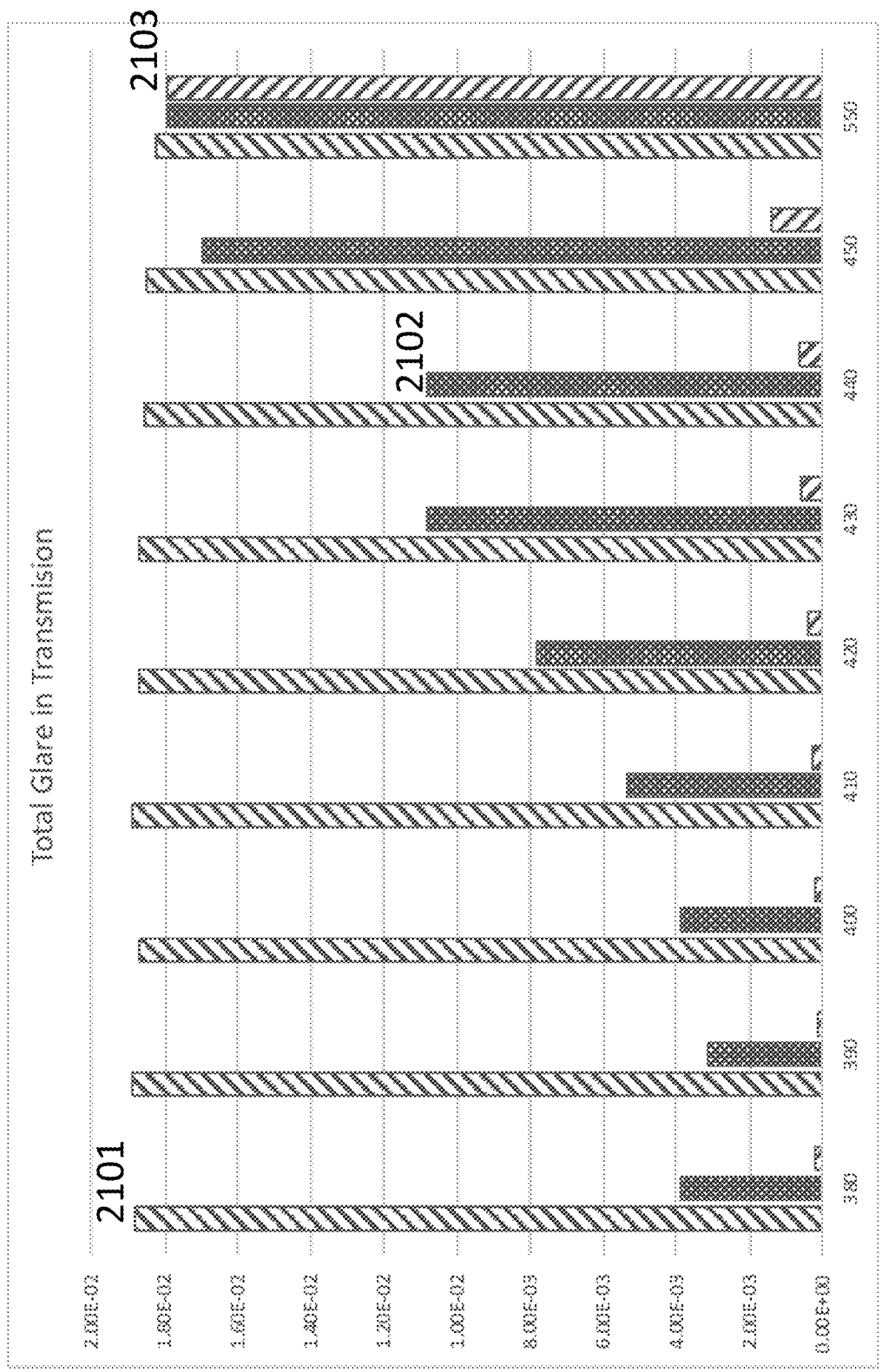
FIG. 21 shows the total actual glare at wavelengths with no absorber (2101) and absorber (2102) as well as the perceived glare (2103).

The reduction of actual and/or perceived glare by nonlinear absorption can be illustrated in a non-limiting example based on the windshield geometry shown in FIG. 2 and following the logic shown in FIG. 3. Horizontal light rays are refracted and reflected from a slab of glass oriented at 63 degrees from vertical. Optical modeling software such as Zemax Optic Studio® or CodeV® is used to solve Maxwell's equations for propagation of horizontal light rays at discrete wavelengths through this Schott BK7 glass slab. FIG. 16 displays the common logarithm of the primary and glare rays at nine wavelengths with no internal absorption. The intensities of the primary and glare rays show minimal variation with wavelength, as expected based on the optical dispersion of the glass (FIG. 7, 701) and the resulting shifts in interface reflectance. Introduction of an absorbing composition such as an organic dye or a metallic dopant absorbs light between 380 and 450 nm, but the glass remains transparent above this wavelength, as shown in FIG. 17. Solving Maxwell's equations for this new case results in logarithmic intensities for the primary and glare light rays shown in FIG. 18. As expected, the primary light ray that passes once through the glass is attenuated at the shorter wavelengths. This can also be seen referring to Table 4, where light with wavelengths shorter than 450 nm are attenuated with the same pattern as the internal transmission characteristics of the dye in FIG. 17. However, the pattern of glare intensities is substantially different, with attenuations that increase with the index of the glare beam from G1 to G6. This can also be viewed in FIG. 19, where the reductions in transmitted primary and glare intensities are summarized. For example, while the primary beam is attenuated to 41% by the absorber, the glare rays G1-G4 are reduced to 7%, 1.2%, 0.2%, 0.035%, and G5 and G6 have intensities of less than $10^{-10}$ times that of the primary beam. Referring to FIG. 20, a similar trend is seen in reflected glare, with the proportion of glare attenuated by the absorber increasing with its distance from the primary beam. Another way of viewing actual and/or perceived glare reduction recognizes that intensity contrast is central to resolving objects in the presence of glare. FIG. 21 shows that the sum of actual glare intensities divided by the primary beam intensity (2101) is substantially reduced by nonlinear absorption of the glare components, and that this ratio for perceived glare (2103) is reduced even further.

TABLE 4

Ratios of intensities observed with and without an absorber for light reflected from the windshield and transmitted through it.

| Wavelength | 380 | 390 | 400 | 410 | 420 | 430 | 440 | 450 | 550 |
|---|---|---|---|---|---|---|---|---|---|
| Reflection | | | | | | | | | |
| Primary | 1.007E+00 | 9.946E-01 | 9.945E-01 | 1.026E+00 | 9.992E-01 | 1.001E+00 | 9.860E-01 | 9.774E-01 | 9.855E-01 |
| G1 | 2.167E-01 | 1.703E-01 | 2.109E-01 | 3.002E-01 | 4.326E-01 | 6.008E-01 | 7.922E-01 | 9.057E-01 | 9.860E-01 |
| G2 | 4.662E-02 | 2.916E-02 | 4.479E-02 | 8.785E-02 | 1.872E-01 | 3.601E-01 | 6.364E-01 | 8.387E-01 | 9.847E-01 |
| G3 | 1.003E-02 | 4.993E-03 | 9.504E-03 | 2.570E-02 | 8.103E-02 | 2.161E-01 | 5.113E-01 | 7.770E-01 | 9.847E-01 |
| G4 | 2.159E-03 | 8.547E-04 | 2.016E-03 | 7.516E-03 | 3.508E-02 | 1.297E-01 | 4.108E-01 | 7.199E-01 | 9.847E-01 |
| G5 | 4.189E-04 | 0.000E+00 | 3.800E-04 | 2.180E-03 | 1.518E-02 | 7.783E-02 | 3.301E-01 | 6.669E-01 | 9.847E-01 |
| G6 | 0.000E+00 | 0.000E+00 | 0.000E+00 | 0.000E+00 | 5.190E-03 | 4.627E-02 | 2.650E-01 | 6.178E-01 | 9.847E-01 |
| Transmission | | | | | | | | | |
| Primary | 4.696E-01 | 4.129E-01 | 4.524E-01 | 5.519E-01 | 6.613E-01 | 7.882E-01 | 7.755E-01 | 9.454E-01 | 1.002E+00 |
| G1 | 1.005E-01 | 7.047E-02 | 9.725E-02 | 1.624E-01 | 2.845E-01 | 4.649E-01 | 4.601E-01 | 8.714E-01 | 9.847E-01 |
| G2 | 2.163E-02 | 1.207E-02 | 2.063E-02 | 4.751E-02 | 1.232E-01 | 2.790E-01 | 2.770E-01 | 8.073E-01 | 9.847E-01 |
| G3 | 4.655E-03 | 2.066E-03 | 4.378E-03 | 1.390E-02 | 5.331E-02 | 1.674E-01 | 1.668E-01 | 7.479E-01 | 9.847E-01 |
| G4 | 9.992E-04 | 3.492E-04 | 9.262E-04 | 4.064E-03 | 2.308E-02 | 1.005E-01 | 1.004E-01 | 6.929E-01 | 9.847E-01 |
| G5 | 0.000E+00 | 0.000E+00 | 0.000E+00 | 8.528E-04 | 9.899E-03 | 6.026E-02 | 6.043E-02 | 6.419E-01 | 9.847E-01 |
| G6 | 0.000E+00 | 0.000E+00 | 0.000E+00 | 0.000E+00 | 0.000E+00 | 0.000E+00 | 0.000E+00 | 0.000E+00 | 0.000E+00 |

Figure 1:
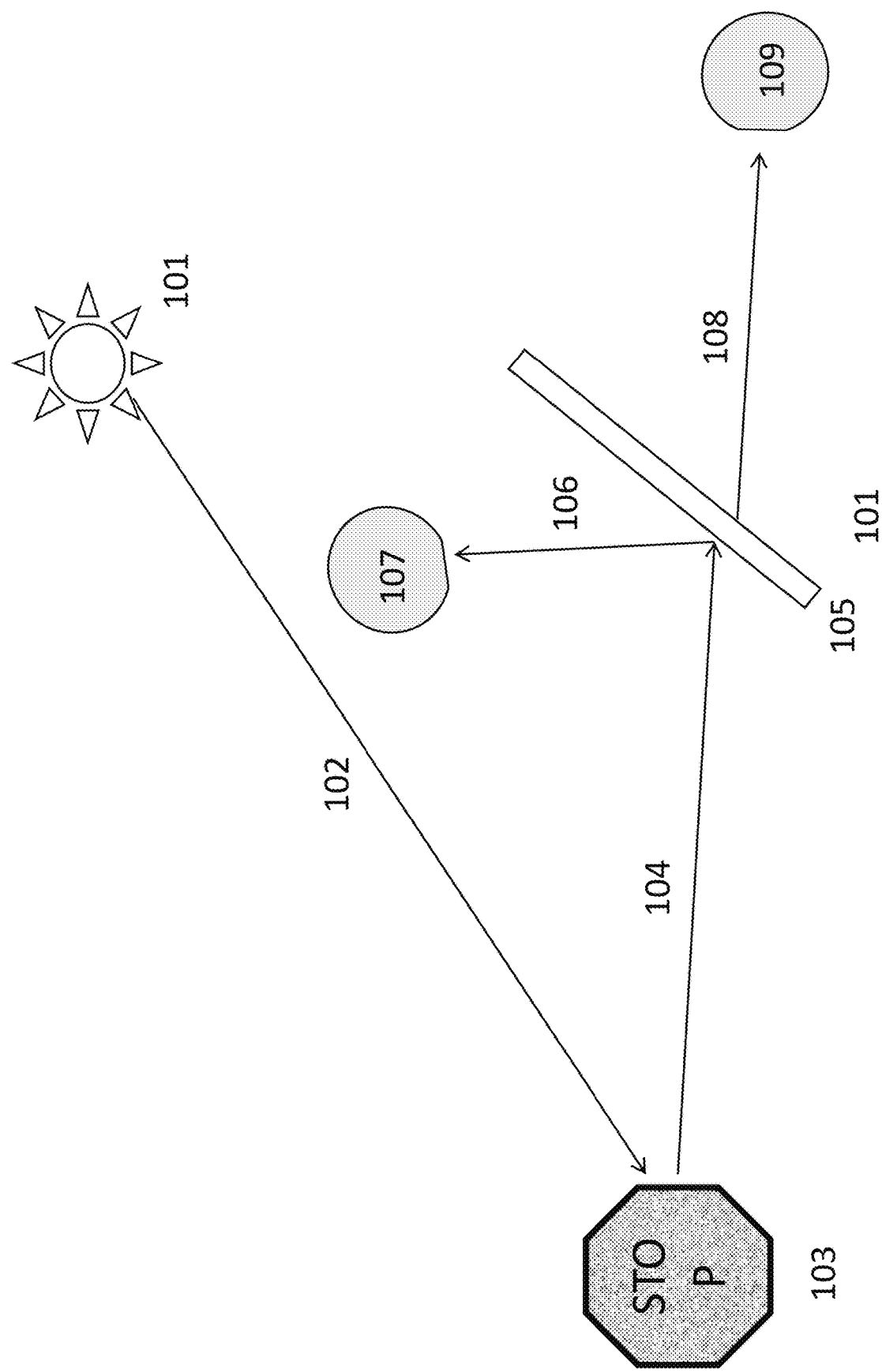
FIG. 1 is a schematic representation of an illuminant, object, partially transparent element, and observers of transmitted and reflected images.

Analogous calculations on light reflected from the windshield as shown geometrically in (FIG. 1: 106, 107) also show nonlinear attenuation of the glare beams by addition of the absorbing element in the windshield, as is summarized in FIG. 20 and Table 4. These actual and/or perceived glare computations may be repeated for the range of geometric, illumination, and field of view conditions that are relevant to the transparent object's uses, with the objective of minimizing actual and/or perceived glare with respect to these and auxiliary constraints such as threshold values for color shifts, luminous transmission, material properties, and the like.

In other words, the actual and/or perceived glare is nonlinearly attenuated by the incorporation of an absorbing medium in a partially transparent object. The quantitative reduction in intensity and spatial extent of actual and/or perceived glare varies with the geometric relationship of the illumination, field of view, orientation and shape of the transparent object.

Figure 28:
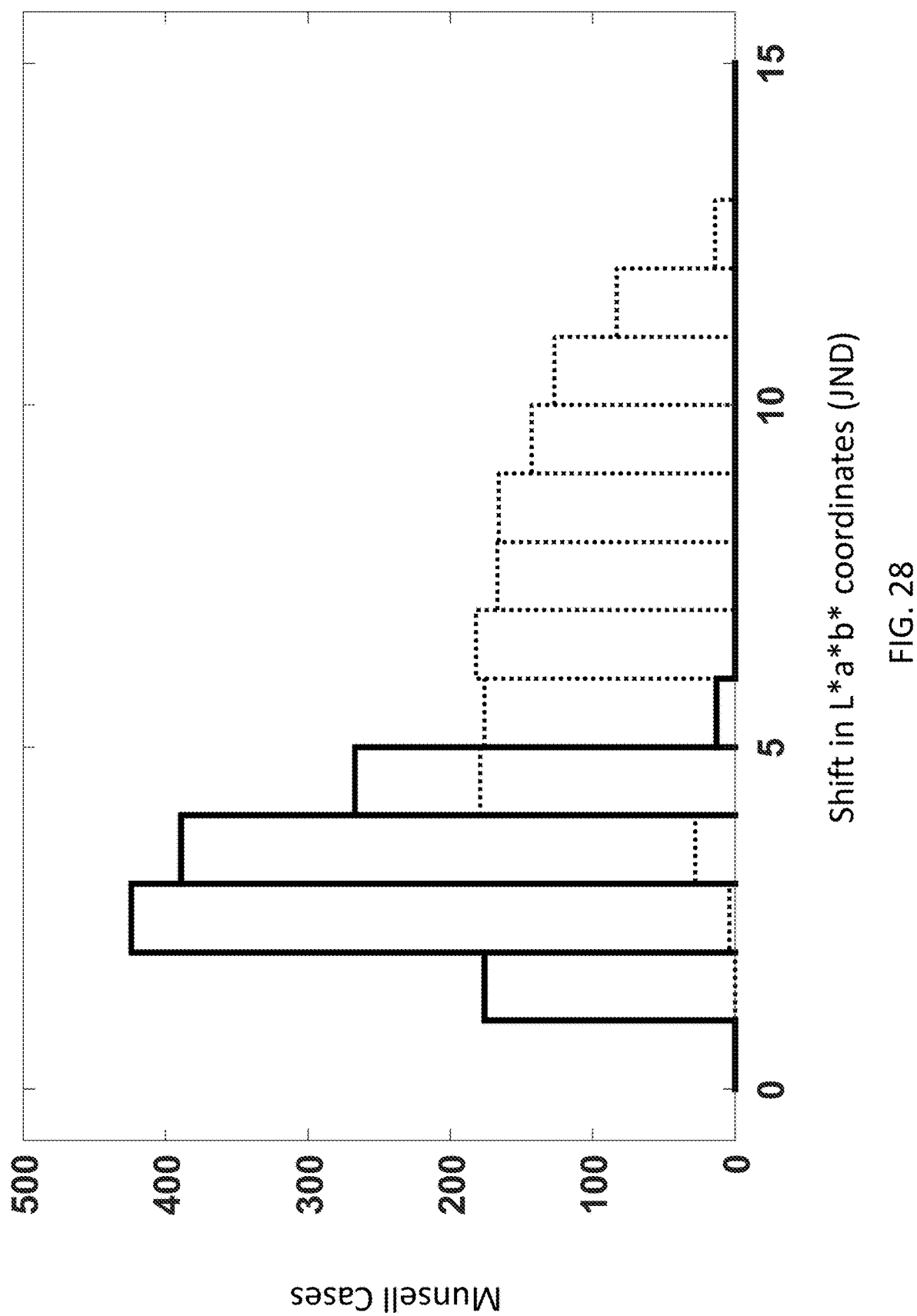
FIG. 28 displays histograms of the color shifts in L*a*b* space of the Munsell palette of 1269 color tiles for the primary image (solid black line) and first glare image (dotted line with gray fill) when viewed through the absorber whose transmission spectrum is displayed in FIG. 17.

As the primary image rays traverse the windshield the absorption of selected wavelengths leads to shifts in the colors of objects in the field of view. These color shifts are quantified by shifts in the L*a*b* uniform color space representation set forth by the Commission Internationale d'Eclairage (CIE, http://www.cie.co.at). The space of visible colors has been empirically characterized using, for example, a collection of 1269 color tiles in the Munsell© Color System (http://www.munsell.com) whose reflectance spectra are known. One computes the L*a*b* coordinates of these color tiles in daylight (D65) with and without the presence of the absorber of an exemplary embodiment. Referring to FIG. 28, histograms of these color shifts are shown for the primary image (solid black lines with white fill) and the first glare image (dotted lines with gray fill). The average color shift of the primary image is 3.1 just noticeable differences (JND) and the standard deviation is 0.94, while the first glare images shift by 7.5+/-2.3 JND. Reduction of glare subject to constraints on color distortion is an important aspect of the current embodiments. Exemplar devices and methods of the current embodiments seek to reduce glare while keeping average color distortion of the primary image to less than about 20, and preferably less than 10 JND. In some implementations, the average color distortion of the primary image is between 1 JND and 10 JND, while the average color distortion of the first glare image shifts by at least 3 JND more than the shift in average color distortion of the primary image. In some implementations, the average color distortion of the primary image is between 1 JND and 5 JND, while the average color distortion of the first glare image shifts by at least 3 JND more than the shift in average color distortion of the primary image. Although the Munsell color spectra provide a convenient broad reference, other references suited to specific applications such as the cockpit of an airplane, LED traffic lights, museum illumination of artwork, and the like may be used to characterize color distortion. A second aspect of example embodiments selects filter transmission profiles to enhance the color separation of the primary and glare images. In the example of FIG. 28 the color shift from primary to first glare image is 4.4+/-1.3 JND. Color shifts between the primary and glare images of more than about 4 and preferably more than about 10 JND as computed using the Munsell color system tiles may be preferred, according to some embodiments.

Another aspect of example embodiments is that differences between the eye's sensitivity to glare $G(\lambda, \theta)$, and normal imagery $V(\lambda, \theta)$, provide a disproportionately greater perceived reduction at wavelengths and angles when their ratio, $G(\lambda, \theta)/V(\lambda, \theta)$, is greater than one. This ratio, $G(\lambda, \theta)/V(\lambda, \theta)$, is a property of the human visual system and how it perceives light. The function $S(\lambda, \theta)$ is a property of the visual environment including illuminants and reflective objects in the field of view, and example embodiments prescribe absorbing materials to control $T(\lambda, \theta)$, thereby reducing the actual (Equation 3) and perceived (Equation 2) glare.

Figure 7:
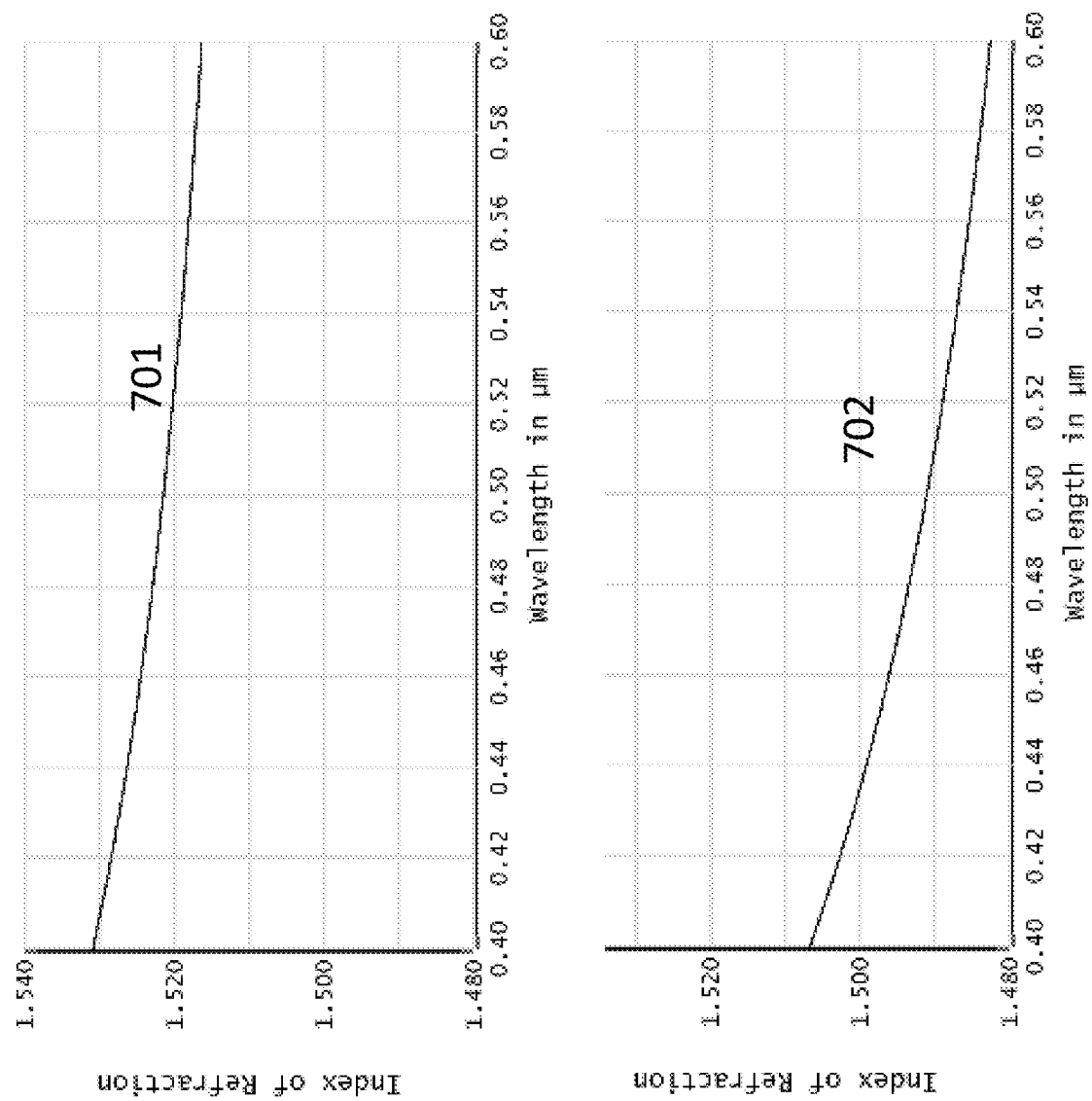
FIG. 7 displays the wavelength-dependent index of refraction for Schott BK7 glass (701) and polyvinylbutyral (702).

Another embodiment incorporates an absorber selectively into a dissimilar material that is embedded in the transparent device. Additional optical complexity results from changes to the refractive indices within a laminated structure. A non-limiting example of this is a shatter-resistant automotive windshield with a thin layer of polyvinylbutyral sandwiched between two panes of glass and shown schematically in FIG. 8. Referring to FIG. 7, the refractive indices and their dispersions (variations with wavelength) of the polymer and Schott BK7 glass layers are different, which implies that reflection and refraction will occur at their interfaces. There are single transmitted (802) and reflected (803) primary images, but glare rays are now more numerous than were obtained when the refractive index of the device was uniform. Referring to FIG. 9, internally reflected and refracted rays (901) trace many paths through the device, and the primary (P) and first eight of sixteen glare rays (G1-G8) in transmission are labeled. FIG. 10A, FIG. 10B, FIG. 11A, and FIG. 11B display the primary and glare intensity distributions for transmitted and reflected green light, where there is no absorption, and blue light, which is 80% absorbed in a single pass through the polymeric layer to which the absorber displayed in FIG. 5A is added. Referring also to Table 5, the spatial extent of transmitted glare is reduced from 21 mm (1003) to 9 mm (1004) and of reflected glare from 62 mm (1103) to 26 mm (1104). Referring also to Table 5, the intensities of the blue glare in both reflection and transmission are substantially, and nonlinearly, reduced.

TABLE 5

Figure 8:
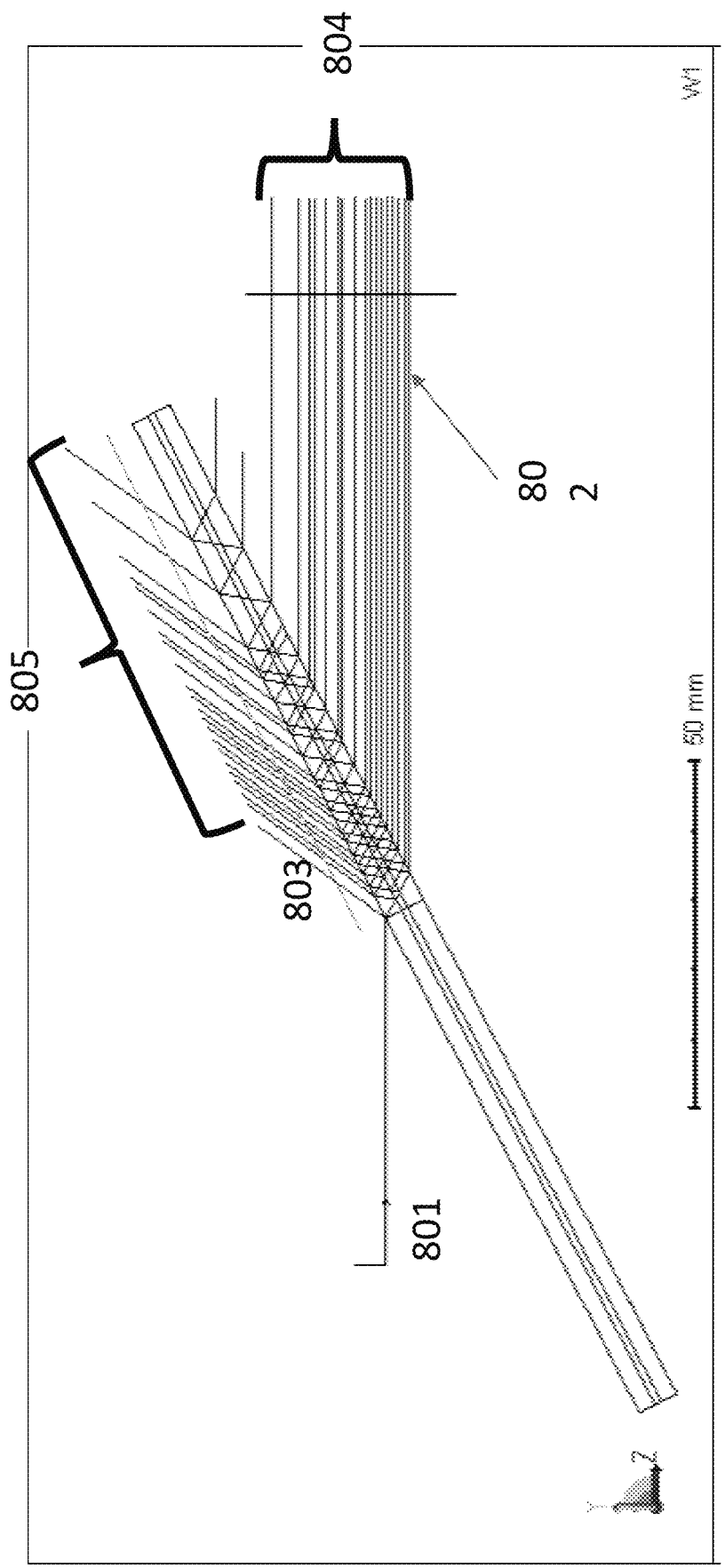
FIG. 8 displays the source (801), the primary transmitted (802) and reflected (803) rays and rays that generate transmitted (804) and reflected (805) glare in a laminated windshield.
Figure 9:
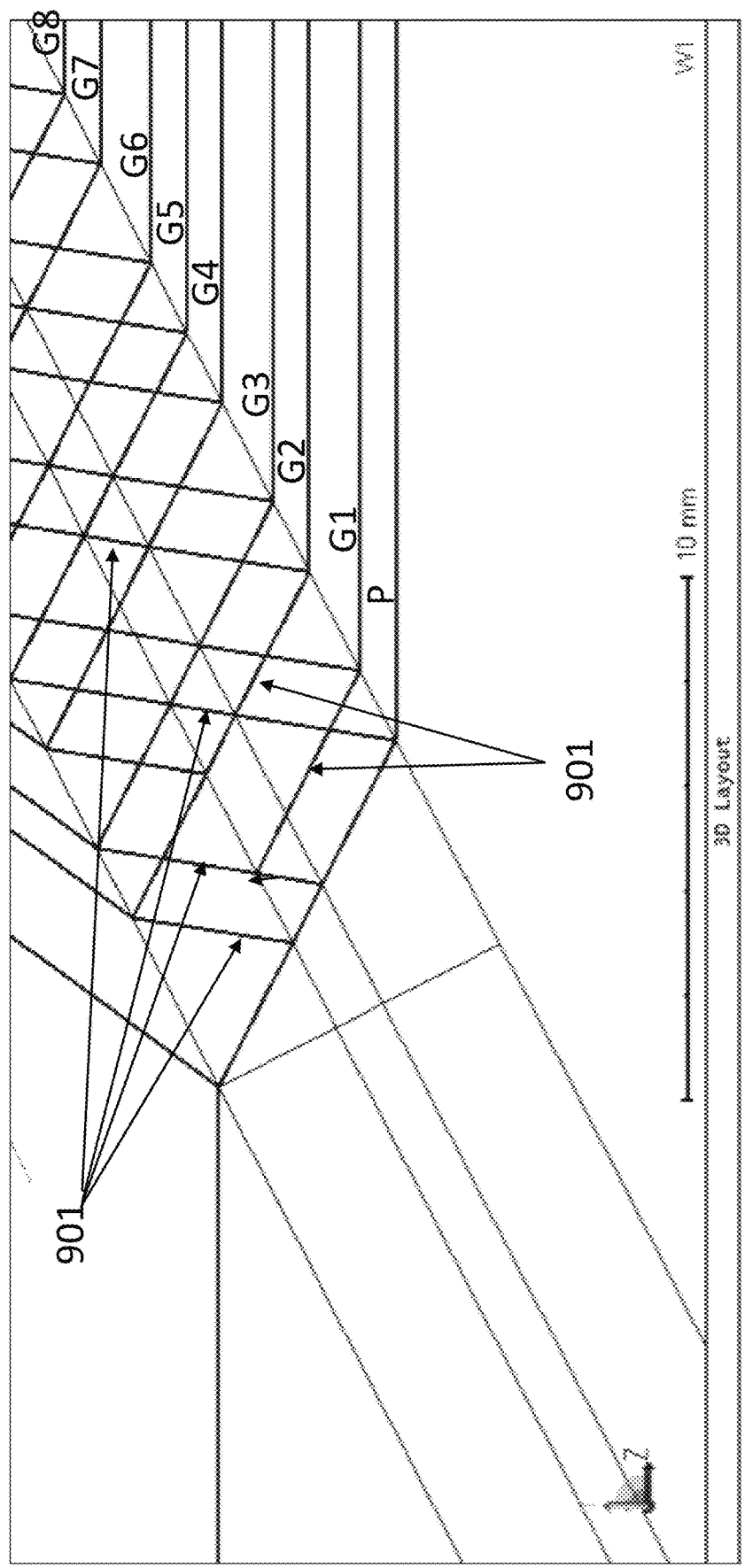
FIG. 9 is an expanded view of FIG. 8 showing glare rays (901) that are generated by Fresnel reflection at one or more boundaries between the glass and polyvinylbutyral layers and labeling the primary (P) and first eight glare (G1-G8) transmitted rays.
Figure 10A:
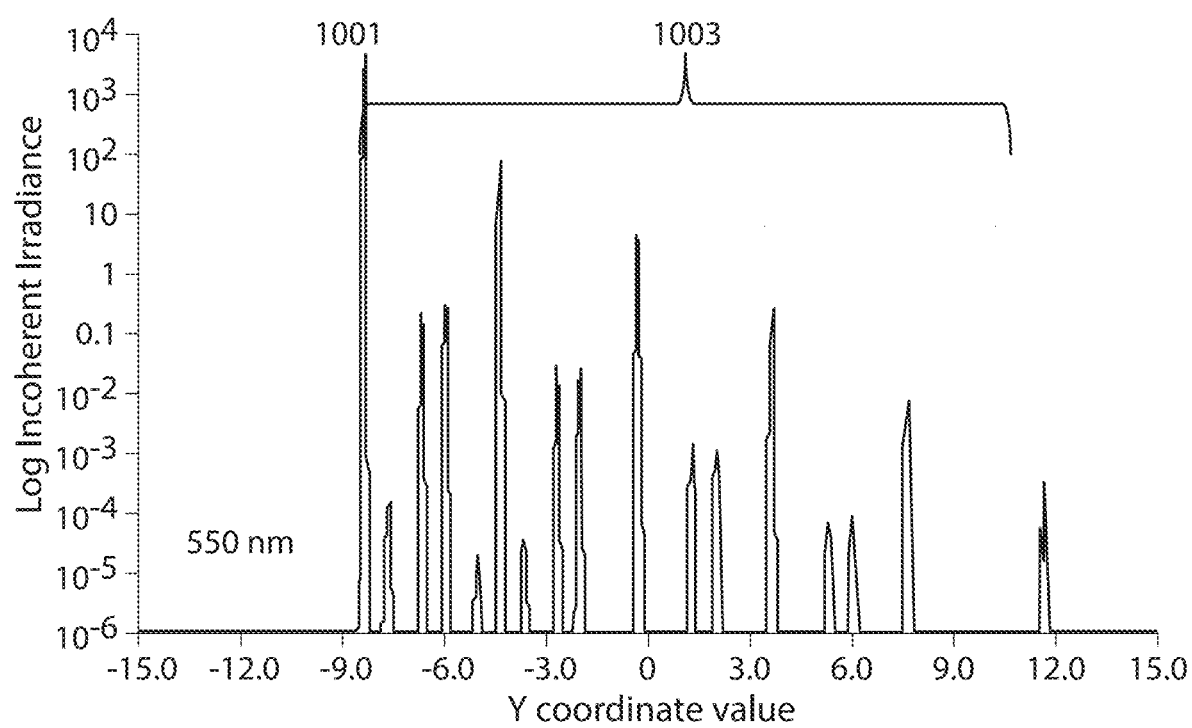
FIG. 10A displays the intensities of primary transmitted rays (1001) and the glare (1003) at 550 nm where the inner polyvinylbutyral layer has internal optical transmission of 100% at 550 nm.
Figure 10B:
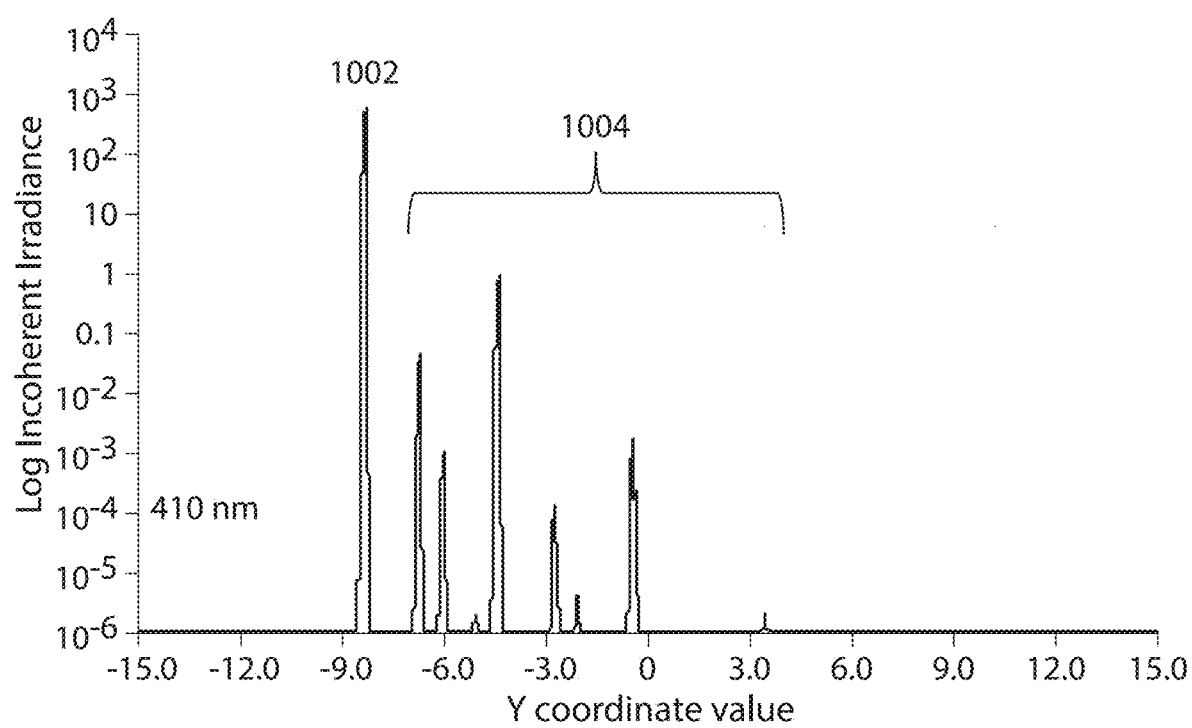
FIG. 10B displays the intensities of primary transmitted rays at (1002) and the glare at 410 nm (1004) where the inner polyvinylbutyral layer has internal optical transmission of 20% at 410 nm.
Figure 11A:
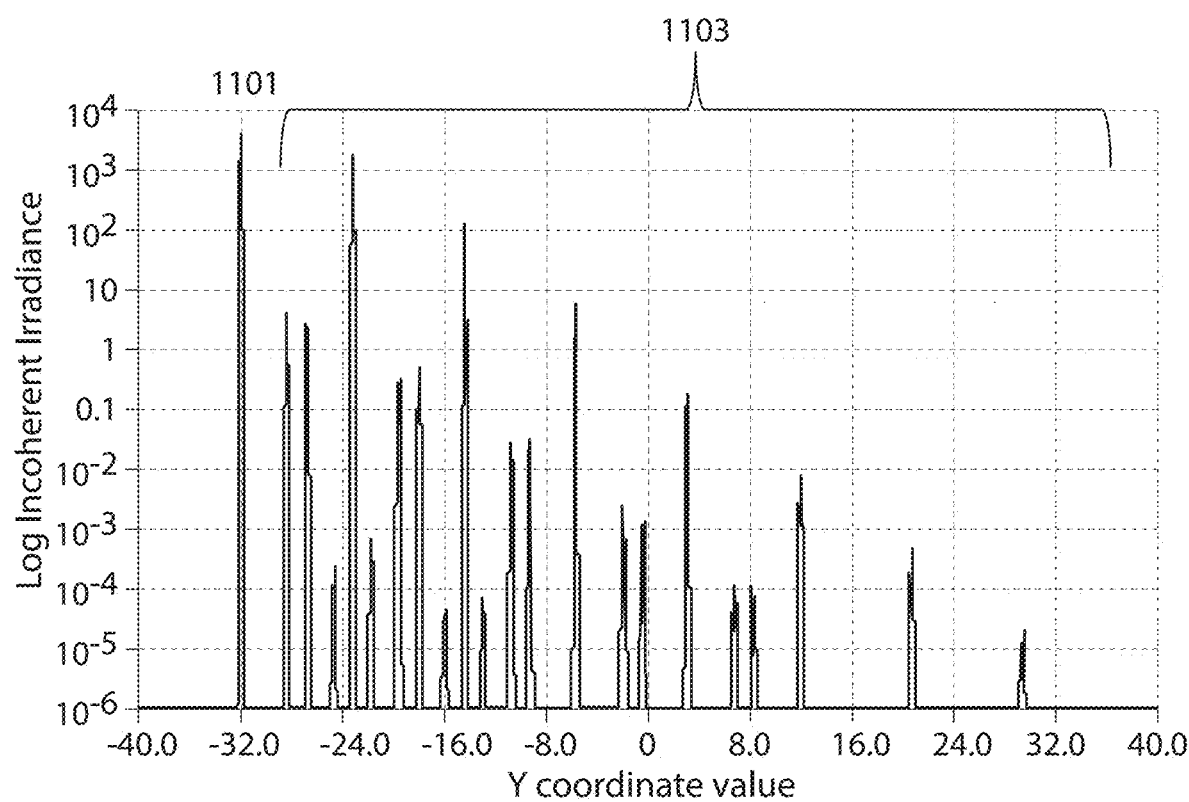
FIG. 11A displays intensities of primary reflected rays (1101) and the glare at 550 nm (1103) where the inner polyvinylbutyral later has internal optical transmission of 100% at 550 nm.
Figure 11B:
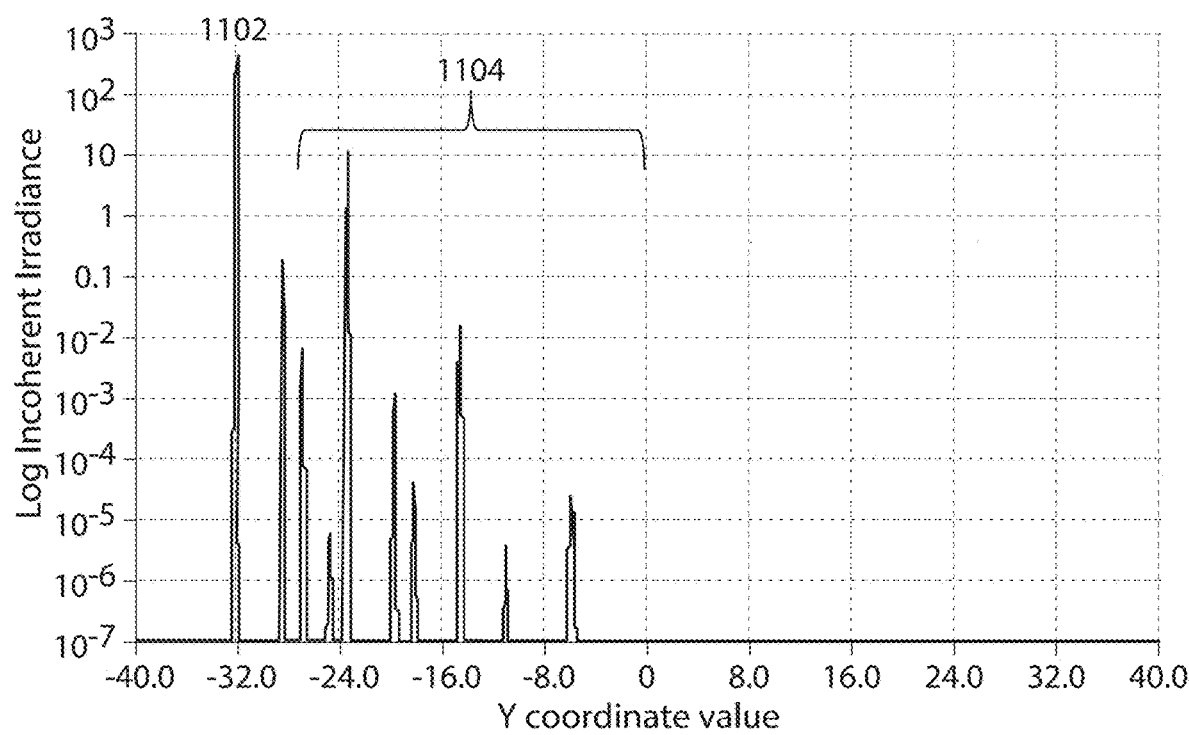
FIG. 11B displays intensities of primary reflected rays at (1102) and the glare at 410 nm (1104) where the inner polyvinylbutyral later has internal optical transmission of 20% at 410 nm.

Intensities in reflection and transmission for the laminated structure shown in FIG. 8 and FIG. 9

|  | Reflected | | | Transmitted | | |
| --- | --- | --- | --- | --- | --- | --- |
|  | Green | Blue | Blue/Green | Green | Blue | Blue/Green |
| Primary | 3.43E+02 | 3.55E+02 | 103.6306% | 4.96E+03 | 9.50E+02 | 19.1444% |
| Glare 1 | 3.05E−01 | 1.78E−01 | 58.5203% | 1.50E−04 | 8.63E−08 | 0.0576% |
| Glare 2 | 3.05E−01 | 6.39E−03 | 2.0974% | 2.28E−01 | 2.55E−02 | 11.1452% |
| Glare 3 | 1.57E−05 | 5.29E−06 | 33.7098% | 1.03E−04 | 2.74E−08 | 0.0265% |
| Glare 4 | 2.16E+02 | 7.91E+00 | 3.6678% | 2.28E−01 | 2.55E−02 | 11.1452% |
| Glare 5 | 4.71E−05 | 0.00E+00 | 0.0000% | 2.28E−01 | 9.12E−04 | 0.3994% |
| Glare 6 | 3.62E−02 | 7.77E−04 | 2.1476% | 1.99E−05 | 8.19E−07 | 4.1177% |
| Glare 7 | 3.62E−02 | 2.78E−05 | 0.0769% | 8.75E+01 | 6.20E−01 | 0.7085% |
| Glare 8 | 4.04E−06 | 0.00E+00 | 0.0000% | 3.97E−05 | 0.00E+00 | 0.0000% |
| Glare 9 | 6.72E−06 | 0.00E+00 | 0.0000% | 2.04E−02 | 8.45E−05 | 0.4135% |
| Glare 10 | 2.71E−03 | 1.93E−06 | 0.0714% | 2.04E−02 | 2.63E−06 | 0.0129% |
| Glare 11 | 2.71E−03 | 0.00E+00 | 0.0000% | 3.92E+00 | 1.03E−03 | 0.0263% |
| Glare 12 | 4.16E−01 | 2.11E−05 | 0.0051% | 1.38E−03 | 0.00E+00 | 0.0000% |
| Glare 13 | 1.70E−04 | 0.00E+00 | 0.0000% | 1.38E−03 | 0.00E+00 | 0.0000% |
| Glare 14 | 1.70E−04 | 0.00E+00 | 0.0000% | 1.76E−01 | 1.66E−06 | 0.0009% |
| Glare 15 | 1.87E−02 | 0.00E+00 | 0.0000% | 8.23E−05 | 0.00E+00 | 0.0000% |
| Glare 16 | 9.59E−06 | 0.00E+00 | 0.0000% | 8.22E−05 | 0.00E+00 | 0.0000% |
| Glare 17 | 9.59E−06 | 0.00E+00 | 0.0000% | 7.91E−03 | 0.00E+00 | 0.0000% |
| Glare 18 | 8.38E−04 | 0.00E+00 | 0.0000% | 3.16E−06 | 0.00E+00 | 0.0000% |
| Glare 19 | 3.76E−05 | 0.00E+00 | 0.0000% | 3.16E−06 | 0.00E+00 | 0.0000% |
| Glare 20 | 1.67E−06 | 0.00E+00 | 0.0000% | 3.55E−04 | 0.00E+00 | 0.0000% |

Perceived Glare

Starting with the actual glare reductions calculated in Example 1 above one can further quantify the impact of glare on visual perception by incorporating human sensitivities to the primary and glare rays as a function of wavelength and angle. FIG. 13 displays the ratio of glare to visual sensitivities under scotopic and photopic light levels in cones with 5° and 10° angular displacements based on measurements by Bullough (J. Modern Optics, 56(13), 1518 (2009)). Desiring the ratio of light in the primary image to stand out against the perceived glare means that this contrast is enhanced by a factor equal to the sensitivity ratio at each wavelength and angle. Illustrations of perceived glare reduction under photopic illumination and a 10° field of view are shown for each glare ray in Table 6, and for the ratios of glare to primary beam intensities in FIG. 21 (2103).

TABLE 6

Ratio of perceived intensities with and without an absorber in a 10 degree field of view and photopic light conditions

| | Perceived Reflection | | | | | | | | |
| --- | --- | --- | --- | --- | --- | --- | --- | --- | --- |
| Primary | 1.007E+00 | 9.946E−01 | 9.945E−01 | 1.026E+00 | 9.992E−01 | 1.001E+00 | 9.860E−01 | 9.774E−01 | 9.855E−01 |
| G1 | 1.187E−02 | 9.328E−03 | 1.151E−02 | 1.483E−02 | 2.050E−02 | 3.139E−02 | 5.021E−02 | 7.503E−02 | 9.860E−01 |
| G2 | 2.553E−03 | 1.597E−03 | 2.444E−03 | 4.339E−03 | 8.871E−03 | 1.881E−02 | 4.034E−02 | 6.948E−02 | 9.847E−01 |
| G3 | 5.495E−04 | 2.734E−04 | 5.185E−04 | 1.269E−03 | 3.840E−03 | 1.129E−02 | 3.241E−02 | 6.437E−02 | 9.847E−01 |
| G4 | 1.182E−04 | 4.681E−05 | 1.100E−04 | 3.712E−04 | 1.662E−03 | 6.776E−03 | 2.604E−02 | 5.964E−02 | 9.847E−01 |

TABLE 6-continued

Ratio of perceived intensities with and without an absorber in a 10 degree field
of view and photopic light conditions

| | | | | | | | | | |
|---|---|---|---|---|---|---|---|---|---|
| G5 | 2.294E−05 | 0.000E+00 | 2.073E−05 | 1.077E−04 | 7.193E−04 | 4.066E−03 | 2.092E−02 | 5.525E−02 | 9.847E−01 |
| G6 | 0.000E+00 | 0.000E+00 | 0.000E+00 | 0.000E+00 | 2.460E−04 | 2.417E−03 | 1.680E−02 | 5.118E−02 | 9.847E−01 |

Perceived Transmission

| | | | | | | | | | |
|---|---|---|---|---|---|---|---|---|---|
| Primary | 4.696E−01 | 4.129E−01 | 4.524E−01 | 5.519E−01 | 6.613E−01 | 7.882E−01 | 7.755E−01 | 9.454E−01 | 1.002E+00 |
| G1 | 5.503E−03 | 3.859E−03 | 5.306E−03 | 8.022E−03 | 1.348E−02 | 2.429E−02 | 2.916E−02 | 7.219E−02 | 9.847E−01 |
| G2 | 1.184E−03 | 6.608E−04 | 1.126E−03 | 2.346E−03 | 5.837E−03 | 1.457E−02 | 1.756E−02 | 6.688E−02 | 9.847E−01 |
| G3 | 2.549E−04 | 1.132E−04 | 2.388E−04 | 6.864E−04 | 2.527E−03 | 8.746E−03 | 1.057E−02 | 6.196E−02 | 9.847E−01 |
| G4 | 5.472E−05 | 1.912E−05 | 5.054E−05 | 2.007E−04 | 1.094E−03 | 5.249E−03 | 6.365E−03 | 5.740E−02 | 9.847E−01 |
| G5 | 0.000E+00 | 0.000E+00 | 0.000E+00 | 4.212E−05 | 4.691E−04 | 3.148E−03 | 3.830E−03 | 5.318E−02 | 9.847E−01 |
| G6 | 0.000E+00 | 0.000E+00 | 0.000E+00 | 0.000E+00 | 0.000E+00 | 0.000E+00 | 0.000E+00 | 0.000E+00 | 0.000E+00 |

In other words, the devices and method described herein select absorbing materials distributed within a partially transparent object that reduce the intensities of actual and perceived glare to a greater extent than they reduce the intensity of the primary image. The inventive embodiments can apply to situations where light is viewed through a wholly or partially transparent object, whether the absorbing material is uniformly or non-uniformly distributed within the object.

Laminate at 55 Degrees

Figure 22:
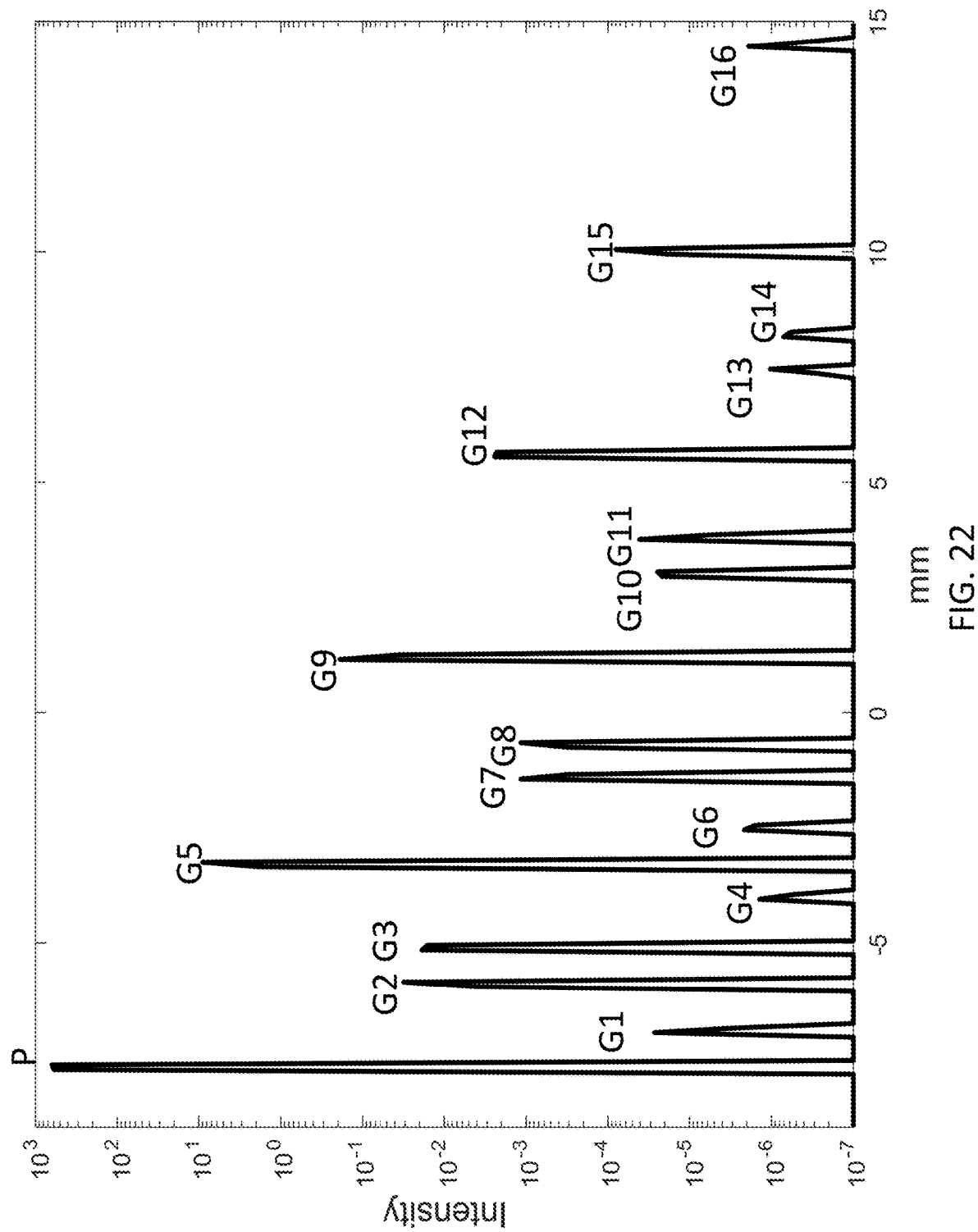
FIG. 22 plots the primary (P) and glare (G1-G16) ray intensities for a laminated windshield at 55° from vertical as a function of their y-displacement from the position of the primary beam with no windshield present (y=0).
Figure 23:
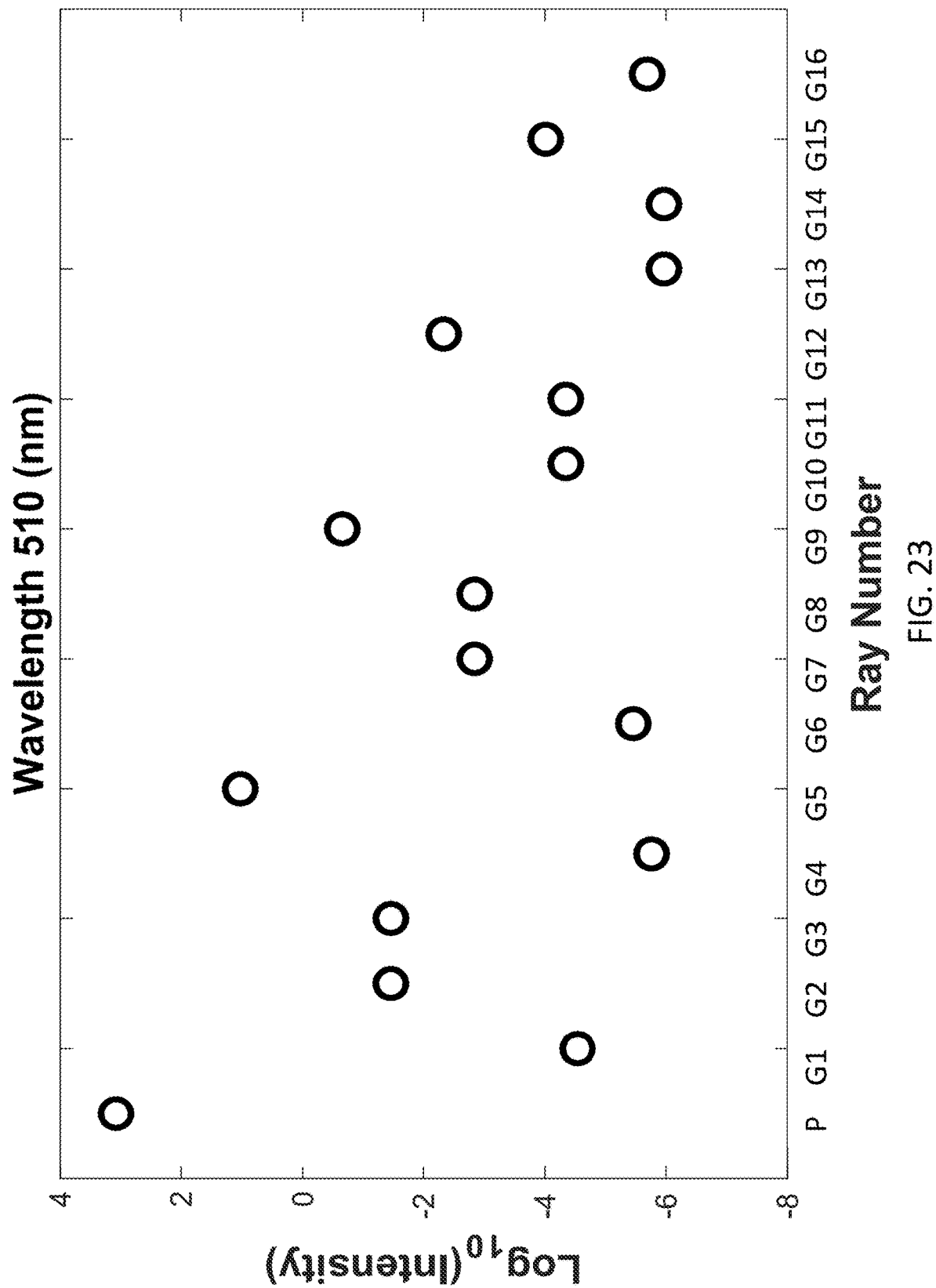
FIG. 23 overlays the intensity of the primary (Ray 0) and sixteen glare (Rays 1-17) intensities at each of nine wavelengths (390, 405, 420, 435, 450, 465, 480, 495, and 510 nm).

A further example of the method described herein follows the logic outlined in FIG. 3. Consider a scenario under daylight (D65) illumination (301) with a broad-band field reflectance (302) that averages to gray, in other words $dR/d\lambda \sim 0$. The optical geometry (303) is described by a laminated windshield as sketched in FIG. 8 but oriented at 55° from vertical rather than 63°. The field illuminance (313) is photopic, so $G(\lambda,\theta)$ and $V(\lambda,\theta)$ for the perceived calculations are selected accordingly. The baseline ray tracing calculation (307) generates results shown in FIG. 22. 510 nm unpolarized light yields seventeen rays within an intensity span of $10^{10}$. Referring to FIG. 22 the primary ray (P) traverses the source by an offset of −7.5 mm as a result of refraction, while sixteen glare beams appear above the primary beam over a total span of 22 mm. Five of these, G5, G9, G12, G15, and G16 (at approximately −4, +1, +5, +10, and +14 mm), are a result of reflections from the air:glass interfaces only; the remaining 11 glare rays also involve reflections from the interfaces between glass and the polyvinylbutyral laminating layer. FIG. 23 displays the intensity calculated for each of 9 wavelengths from 390 nm to 510 nm in 15 nm increments. These values overlie one another for all nine wavelengths at the primary (P) and glare (G1-G16) rays on the semilogarithmic scale of FIG. 23.

Figure 24A:
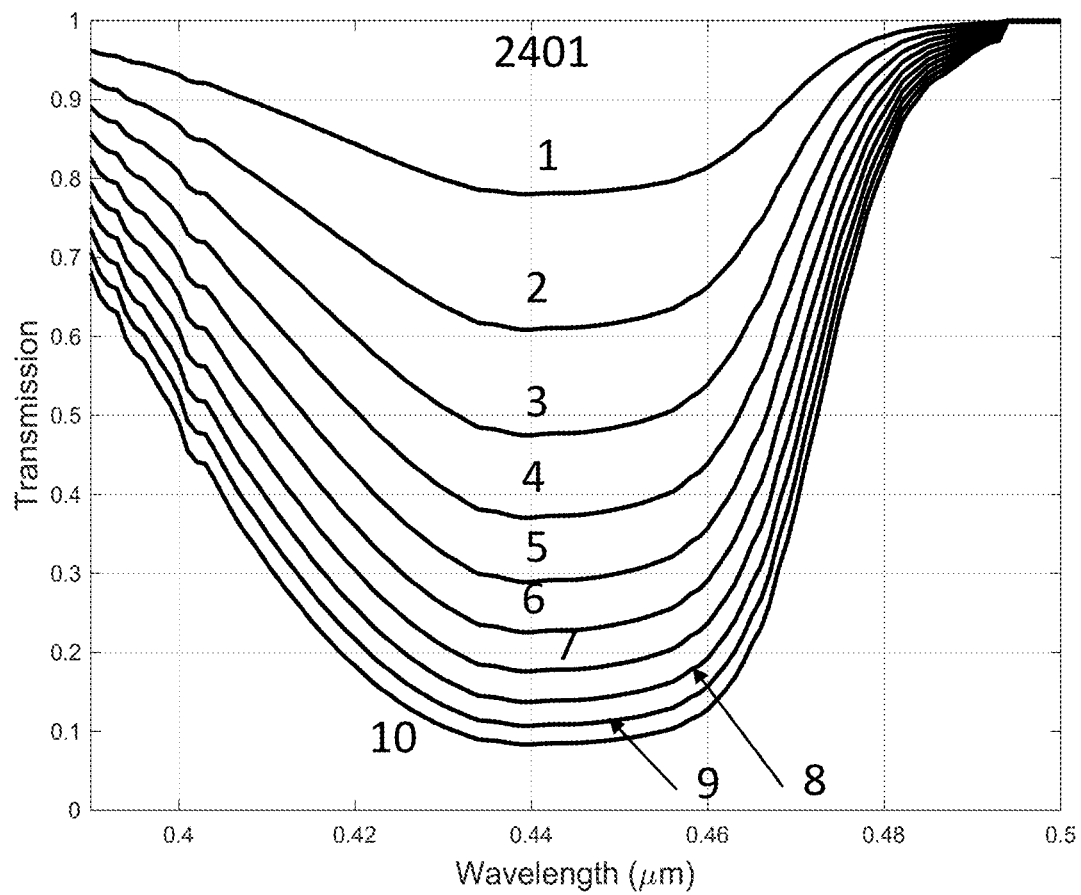
FIG. 24A plots a series of internal transmission functions (2401) at ten linearly increasing concentrations (1-10) of a dye absorber.
Figure 24B:
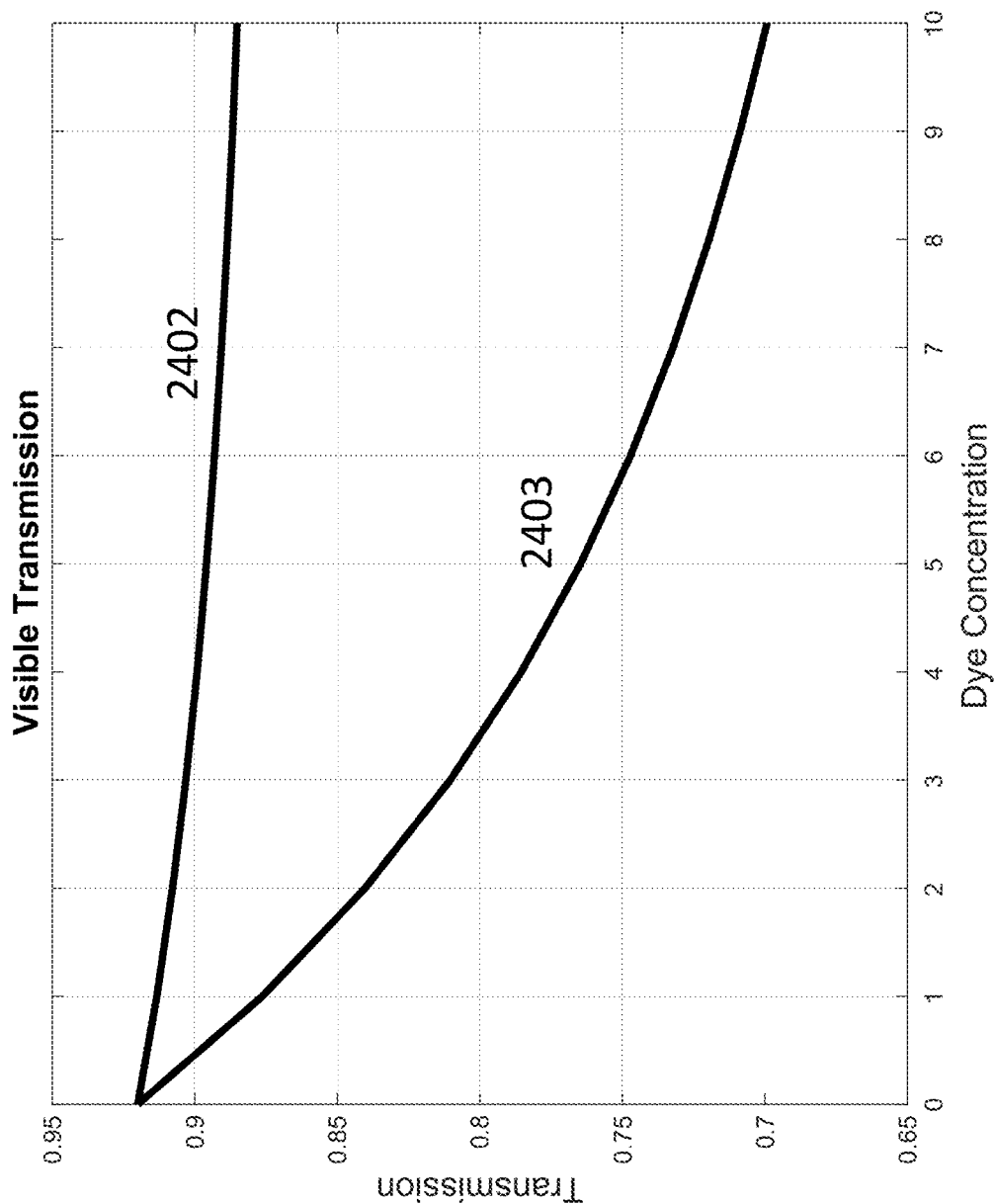
FIG. 24B displays the luminous transmission under photopic (2402) and scotopic (2403) field conditions.
Figure 25A:
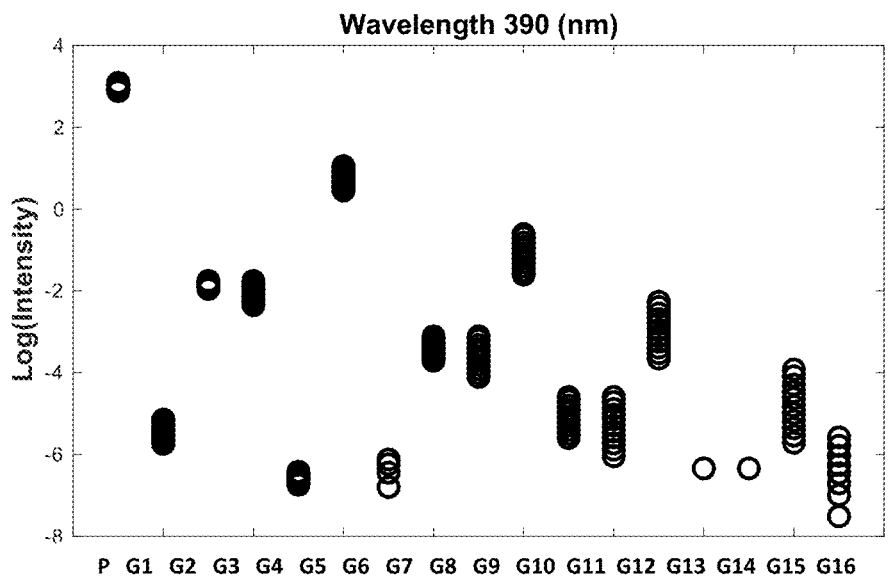
FIG. 25A overlays the primary (P) and glare (G1-G16) intensities with dye at zero concentration (highest circles) and each of the ten dye concentrations described by FIG. 24A for a wavelength of 390 nm.
Figure 25B:
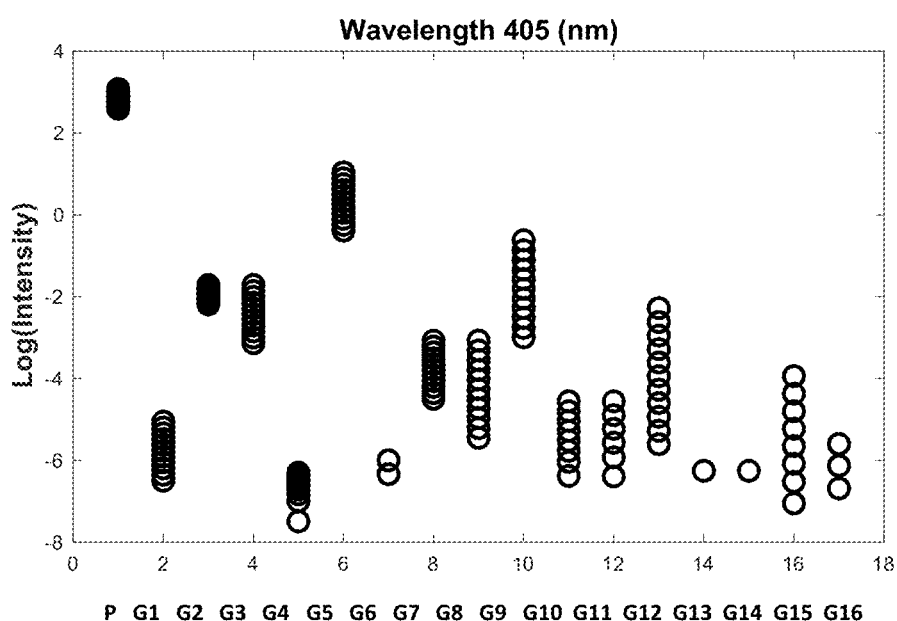
FIG. 25B overlays the primary (P) and glare (G1-G16) intensities with dye at zero concentration (highest circles) and each of the ten dye concentrations described by FIG. 24A for a wavelength of 405 nm.
Figure 25C:
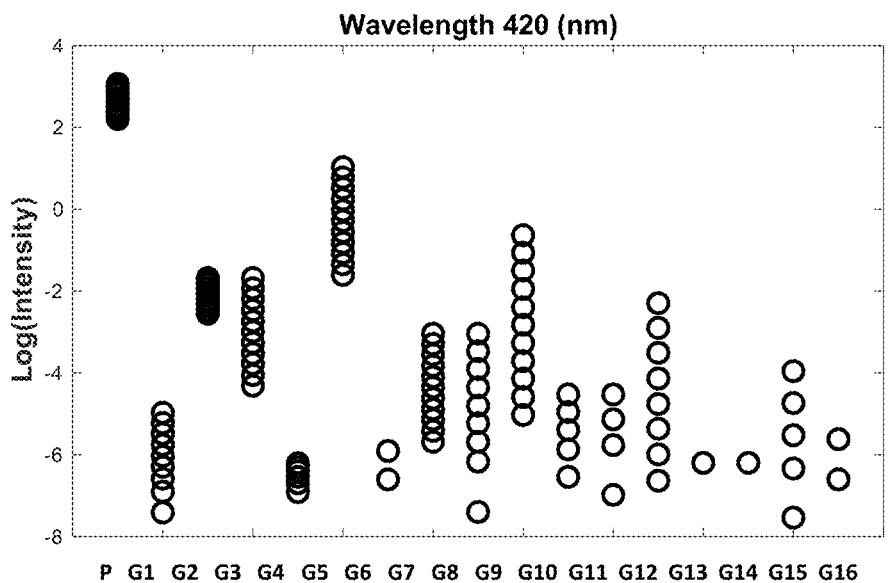
FIG. 25C overlays the primary (P) and glare (G1-G16) intensities with dye at zero concentration (highest circles) and each of the ten dye concentrations described by FIG. 24A for a wavelength of 420 nm.
Figure 25D:
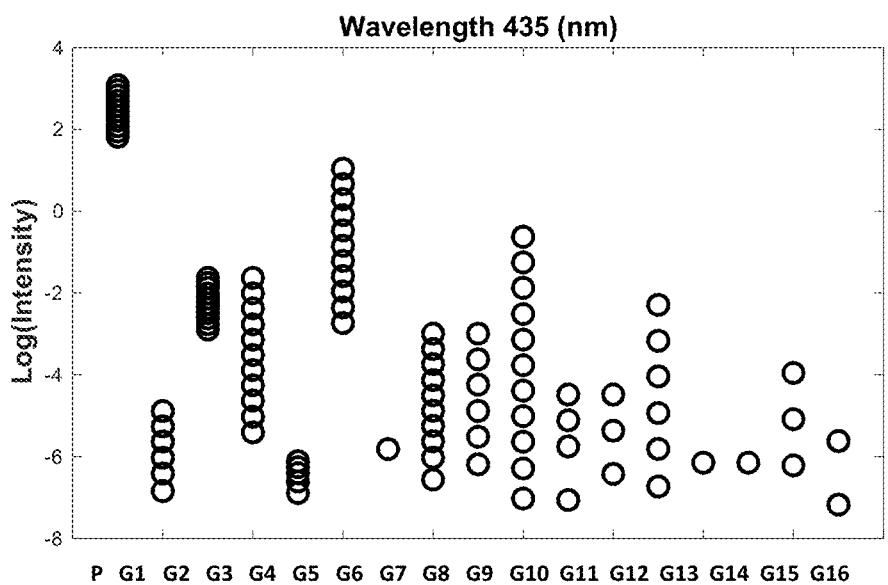
FIG. 25D overlays the primary (P) and glare (G1-G16) intensities with dye at zero concentration (highest circles) and each of the ten dye concentrations described by FIG. 24A for a wavelength of 435 nm.
Figure 26A:
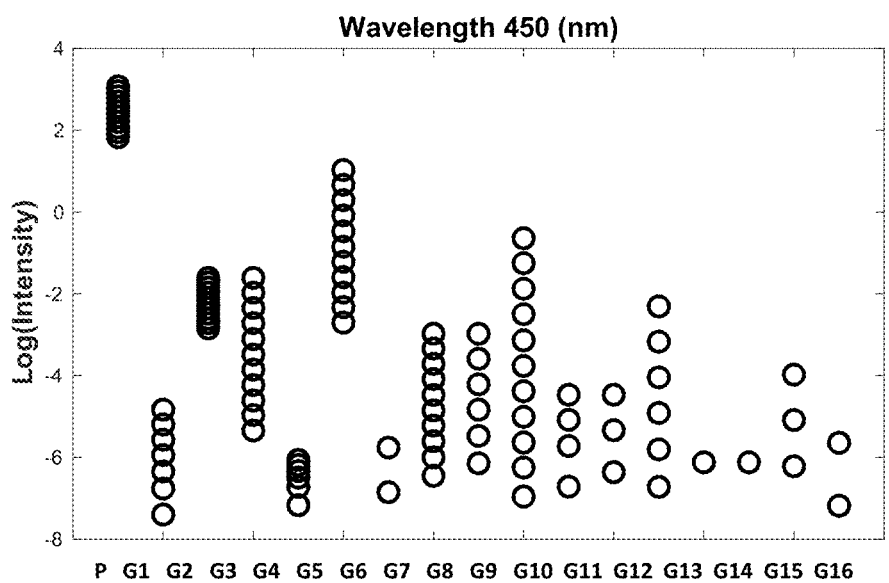
FIG. 26A overlays the primary (P) and glare (G1-G16) intensities with dye at zero concentration (highest circles) and each of the ten dye concentrations described by FIG. 24A for a wavelength of 450 nm.
Figure 26B:
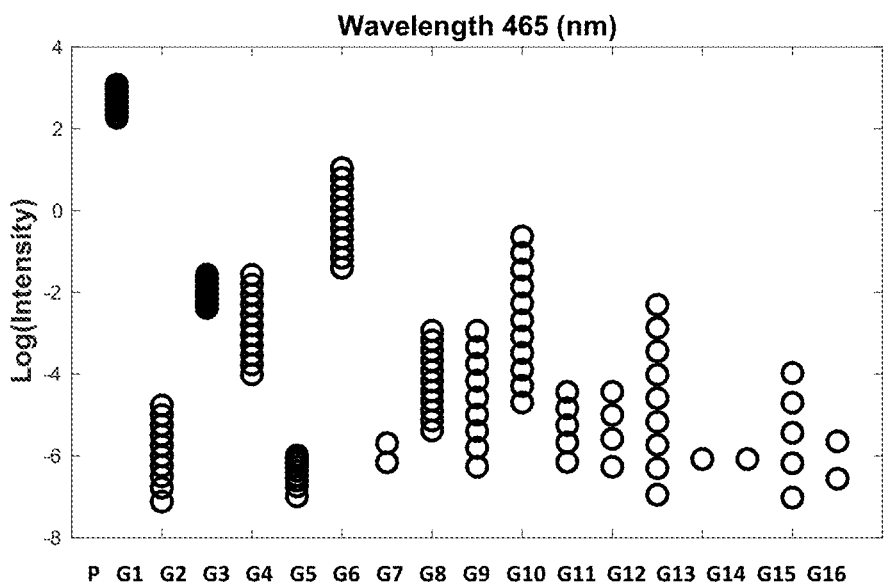
FIG. 26B overlays the primary (P) and glare (G1-G16) intensities with dye at zero concentration (highest circles) and each of the ten dye concentrations described by FIG. 24A for a wavelength of 465 nm.
Figure 26C:
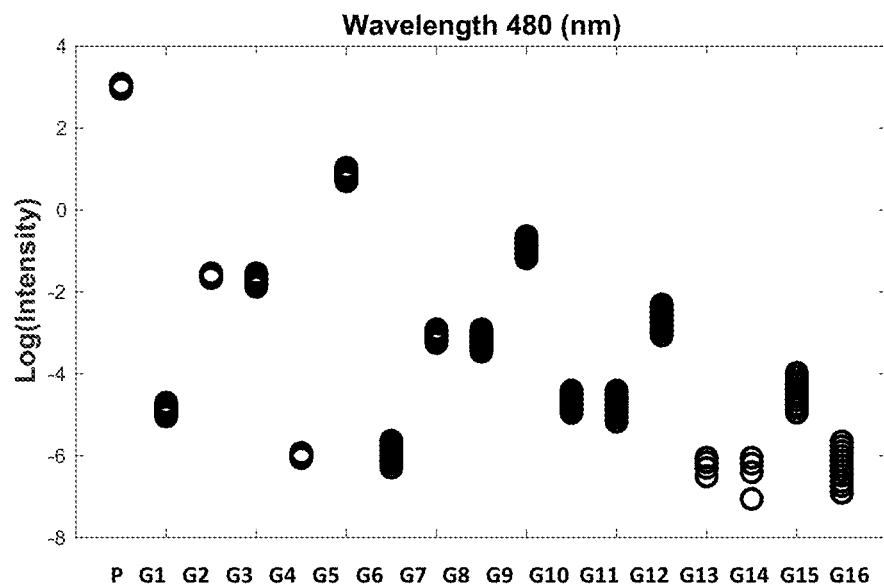
FIG. 26C overlays the primary (P) and glare (G1-G16) intensities with dye at zero concentration (highest circles) and each of the ten dye concentrations described by FIG. 24A for a wavelength of 480 nm.
Figure 26D:
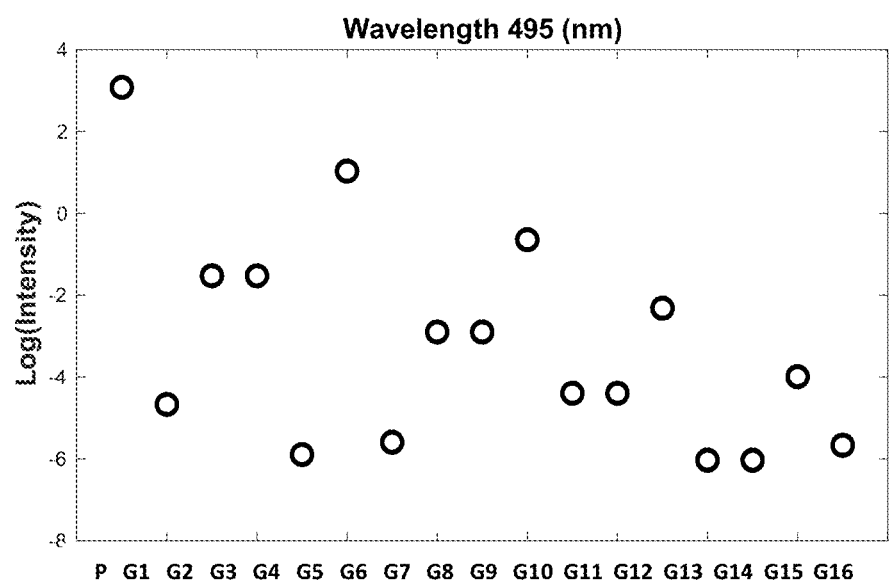
FIG. 26D overlays the primary (P) and glare (G1-G16) intensities with dye at zero concentration (highest circles) and each of the ten dye concentrations described by FIG. 24A for a wavelength of 495 nm.

Having established the baseline glare intensities and spatial profile one next calculates the actual glare as an absorbing dye is introduced into the polyvinylbutyral layer. The internal transmission of the layer at ten, linearly increasing concentrations of commercially available Crystalyn™ DLS440A dye (2401) are shown in FIG. 24A. The luminous transmission under photopic (2402) and scotopic (2403) conditions are plotted in FIG. 24B as a function of the dye concentrations.

Ray tracing calculations at each wavelength and dye concentration generates the intensity diagrams for the primary (ray 0) and sixteen glare rays (rays 2-17) summarized in FIG. 25A through FIG. 25D and FIG. 26A through FIG. 26D. The intensities of the primary rays are gradually reduced as the dye concentration is increased. However, the magnitude of the reduction is much greater for the glare than for the primary rays, as is evident from the larger span of overlaid intensity values on these logarithmic plots. For example, at 420 nm primary (P) and G3 and G5 are reduced by a factor of 8, while G1, G3, and G5 decrease by a factor of ~400 and the intensities of rays G9 and G12 drop by a factor of ~25,000.

The actual glare is also constricted spatially, with the rays further from the primary beam experiencing multiple passes through the absorbing layer. Where there is little or no absorption as at 495 nm in FIG. 26D the circles lay on top of another—in other words the ray intensities are independent of dye concentration. Between 390 and 465 nm, where absorption occurs, most glare ray intensities are attenuated much more rapidly with dye concentration than the primary beam.

The preceding discussion illustrates how glare is nonlinearly reduced by dye added to the interior of the partially transparent windshield, whether uniformly or in an internal layer. Additional constraints on the performance of a windshield, for example that the photopic luminous transmission measured at normal incidence be greater than 90%, may also be incorporated into the method. This transmission as a function of dye concentration is shown (2402) in FIG. 24A, where the present embodiment prescribes DLS440A dye at a concentration of 3 units for optimal glare reduction given this auxiliary constraint. A dye concentration of 1 unit yields the top trace in FIG. 24A. The trade-off between reducing glare and reducing luminous transmission is quantitatively revealed, according to exemplary embodiments. This procedure may be repeated using pure or mixed absorbers and concentrations, resulting in quantitative comparisons among options for reducing glare using absorbing materials.

Figure 27A:
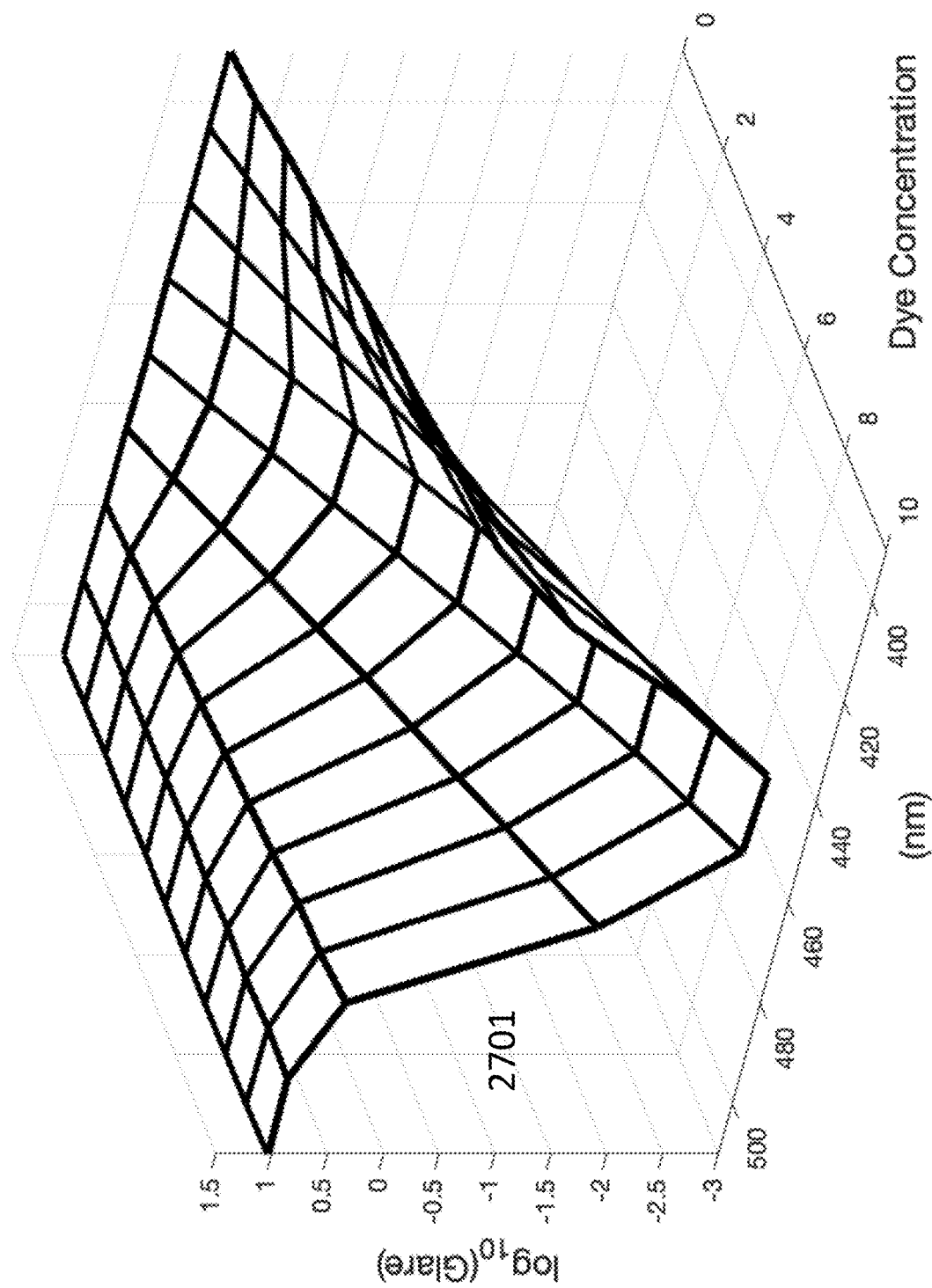
FIG. 27A plots the normalized contribution at each wavelength and dye concentration for actual (2701) glare.
Figure 27B:
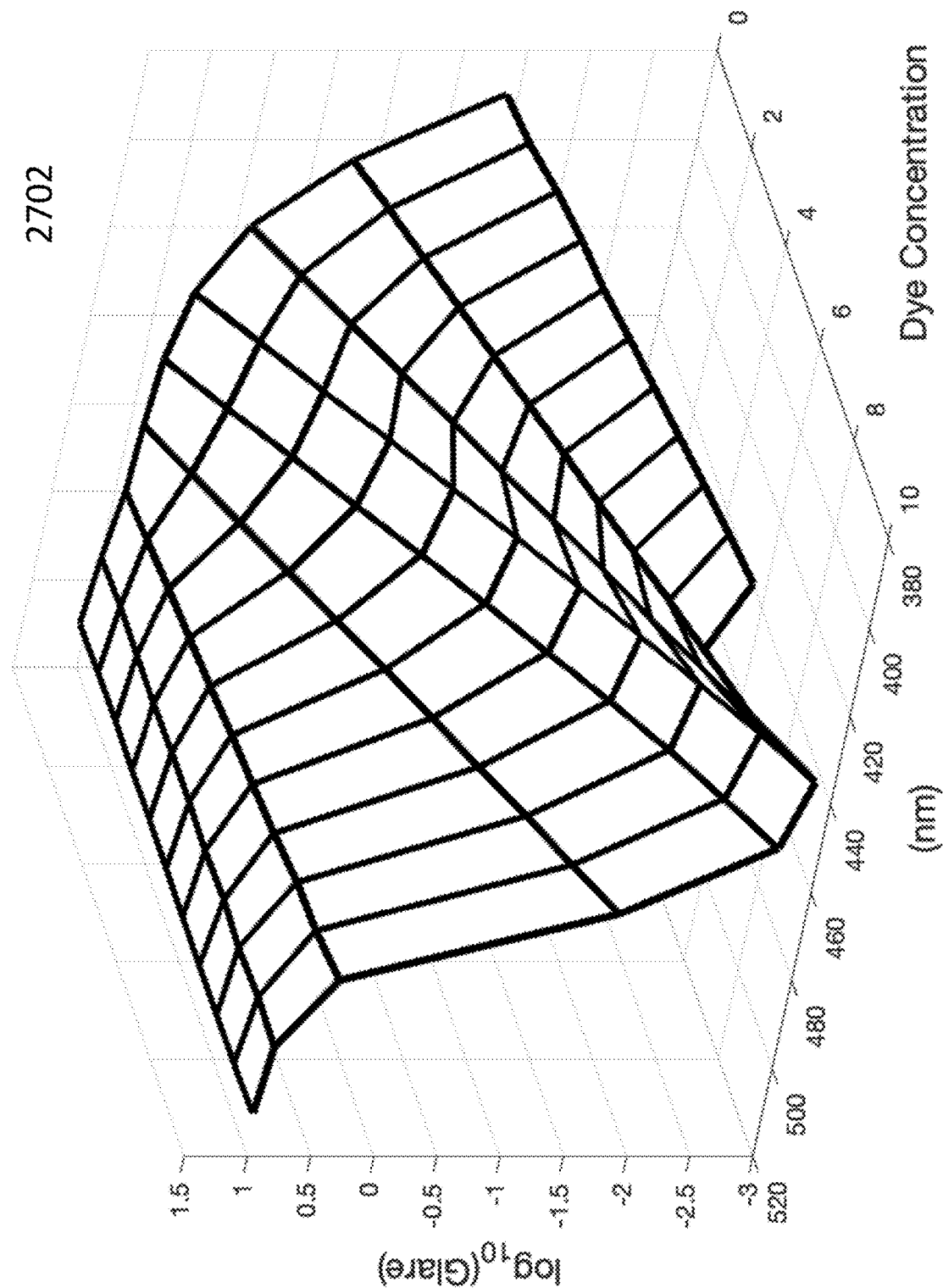
FIG. 27B plots the normalized contribution at each wavelength and dye concentration for perceived (2702) glare.
Figure 27C:
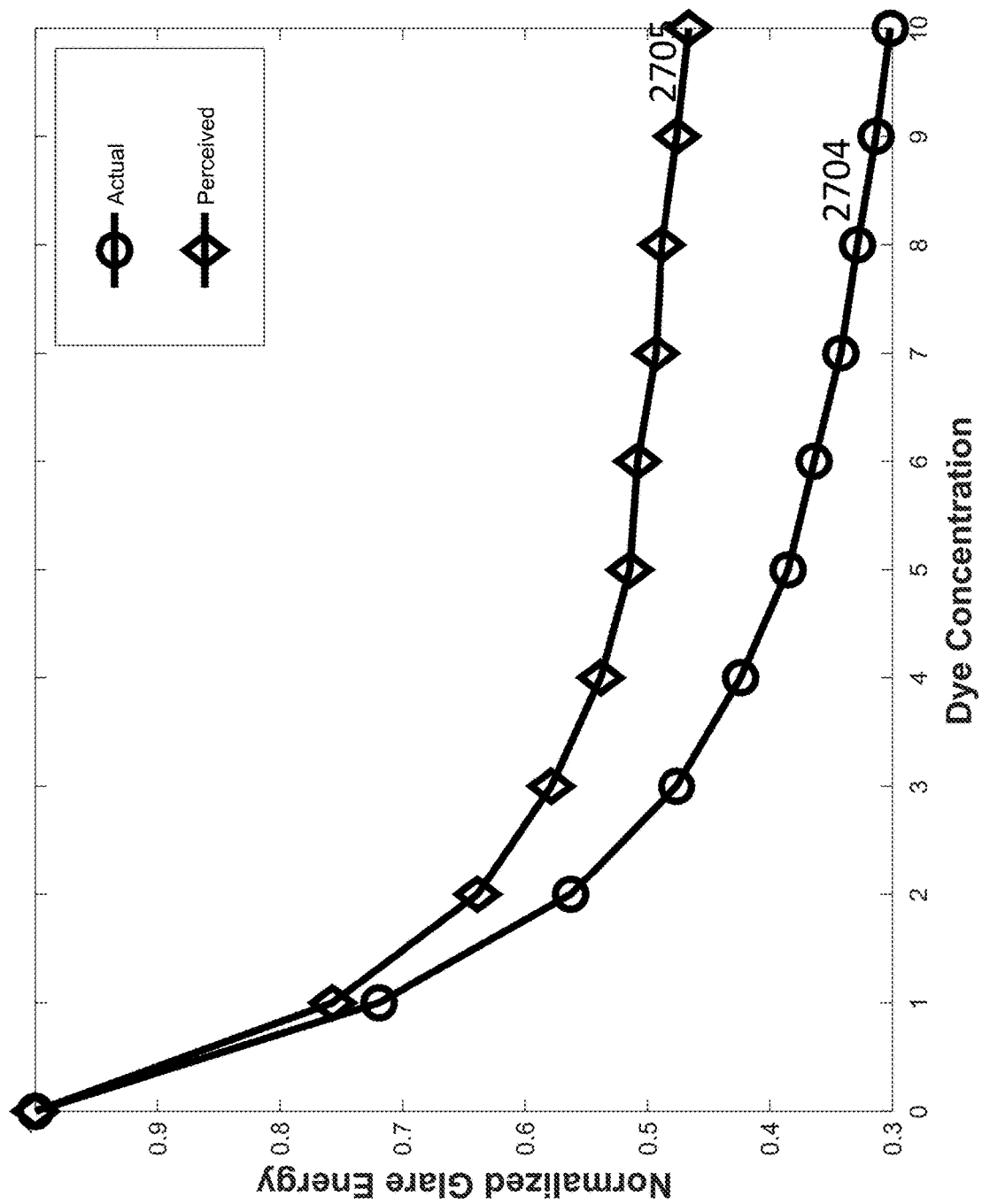
FIG. 27C Shows the reductions integrated over wavelength for actual (2704) and perceived (2705) glare.

Optimization based on perceived glare, rather than actual glare, proceeds by the same series of steps outlined above except that the angle and wavelength dependent visual and glare sensitivities are used to weight the relationship between primary and glare intensities. Referring to FIG. 3, in the present 55° windshield example we define the visual field illuminance as photopic (313) and use the corresponding visual and glare sensitivities shown in FIG. 12A and FIG. 12B for comparison (312). FIG. 27A and FIG. 27B show the wavelength-dependent reduction in glare intensity as a function of dye concentration for actual (2701) and perceived (2702) glare computed according to the method. Integrating the wavelength dependent intensities at each dye concentration and normalizing shows the reductions in actual (2704) and perceived (2705) glare with increasing dye concentration. The reduced sensitivity to glare at the shortest wavelengths leads to a smaller perceived glare value with no dye but a more gradual reduction with increasing dye concentration than for the actual glare. In other words, the marginal utility of tripling the dye concentration is about half as great from perceived (~10%) than for actual (~20%) glare.

Some embodiments relate to mitigating glare in architectural glass. The basic optical physics of multi-path absorption by dispersed or laminated dyes is the same as in the preceding embodiment, so that primary and glare images in transmission and reflection are each computed and compared with and without absorption at wavelengths where glare is more acutely perceived than are the corresponding images. An aspect of glare in architectural glass is that image contrast is degraded by glare from bright sources such as the sun in transmission or interior lamps in reflection. Nonlinear absorption by glare rays leads to color shifts that are different for primary and glare rays. Selection of the absorber can therefore be made so that the perceived colors of glare rays are shifted from those of the primary source. For example, a notch filter that blocs 35% of the primary light between 545 and 555 nanometers shifts normal daylight white by 4.5 'just noticeable differences' in standard L*a*b* color space. The first glare light rays pass three times through the same thickness, resulting in attenuation of 53% at these wavelengths, so that the white point is now shifted by 9.4 just noticeable differences. A summary of the color coordinates for this example is shown in Table 7. In architectural glass this affects both the color of objects perceived through the glass and to the color of the light that comes through the glass to illuminate an interior space. Applying standard colorimetric tools one can thereby select absorbers that systematically shift the hue, chroma, and intensity of glare rays from those of the primary image, providing a psychophysical visual cue that they are not part of the primary image.

TABLE 7

Color coordinate shifts for D65 light in glare viewed in transmission and reflection.

|     | L*   | a*   | b*   |      |
| --- | ---- | ---- | ---- | ---- |
| D65 | 100  | 0    | 0    | JND  |
| Transmission | | | | |
| P   | 98.6 | 3.5  | -2.4 | 4.5  |
| G1  | 97.1 | 7.4  | -5.0 | 9.4  |
| G2  | 96.4 | 9.1  | -6.1 | 11.5 |
| G3  | 96.1 | 9.8  | -6.6 | 12.4 |
| G4  | 96.0 | 10.1 | -6.8 | 12.8 |
| Reflection | | | | |
| G1  | 97.7 | 5.8  | -4.0 | 7.4  |
| G2  | 96.7 | 8.4  | -5.7 | 10.7 |
| G3  | 96.2 | 9.5  | -6.4 | 12.1 |
| G4  | 96.0 | 10.0 | -6.7 | 12.7 |

Figure 14:
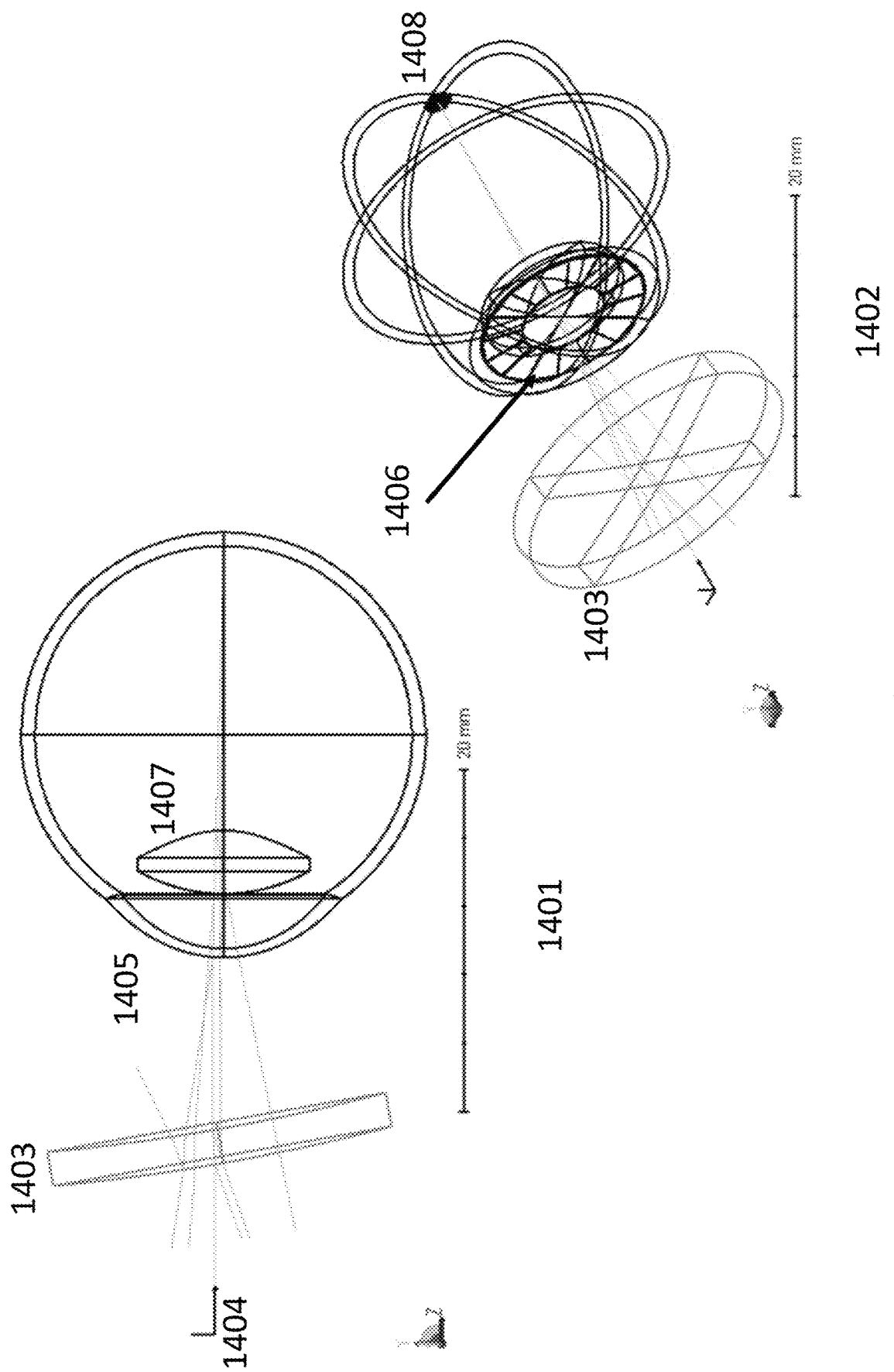
FIG. 14 displays cross-sectional and isometric views of an optical model of a spectacle lens and one orientation in front of a human eye.
Figure 15A:
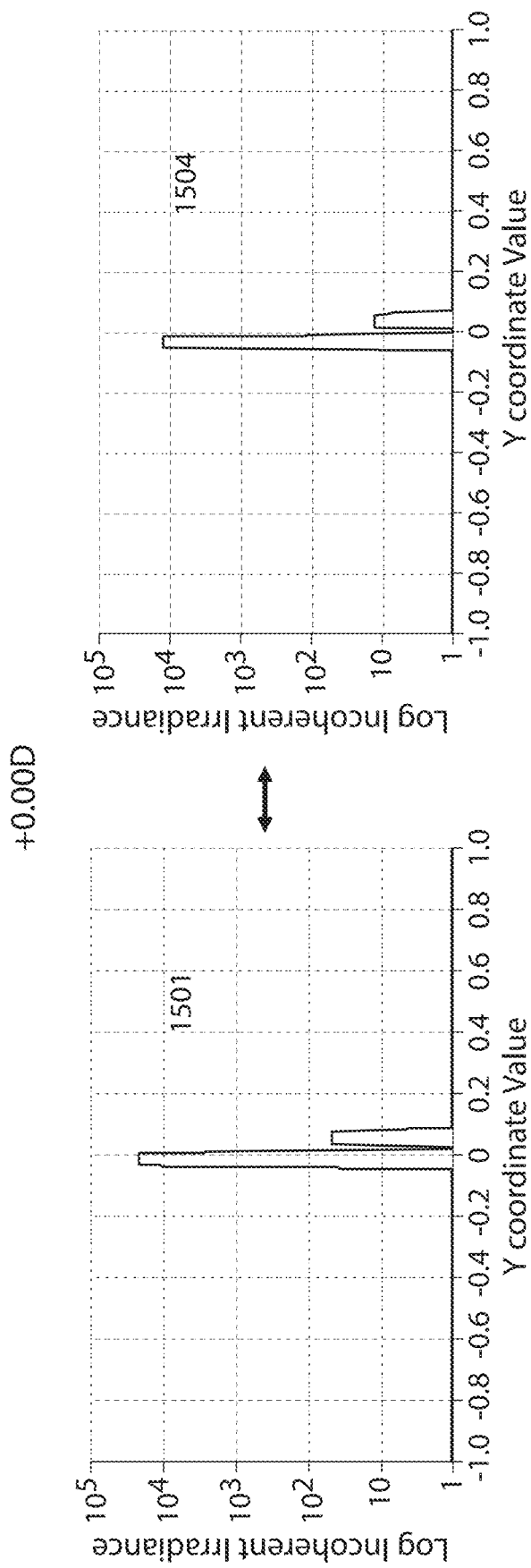
FIG. 15A graphs the intensity of retinal primary and glare intensities for green (1501) and blue (1504) light for ophthalmic lenses with +0.00D refractive power.
Figure 15B:
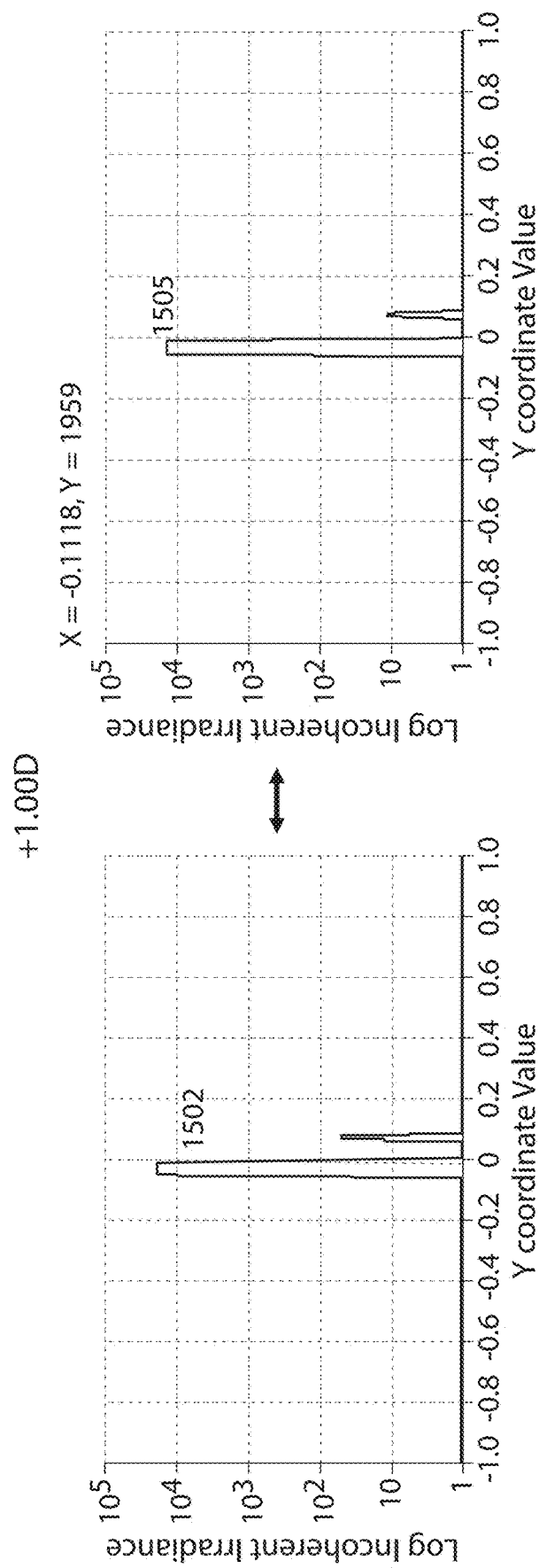
FIG. 15B graphs the intensity of retinal primary and glare intensities for green (1502) and blue (1505) light for ophthalmic lenses with +1.00D refractive power.
Figure 15C:
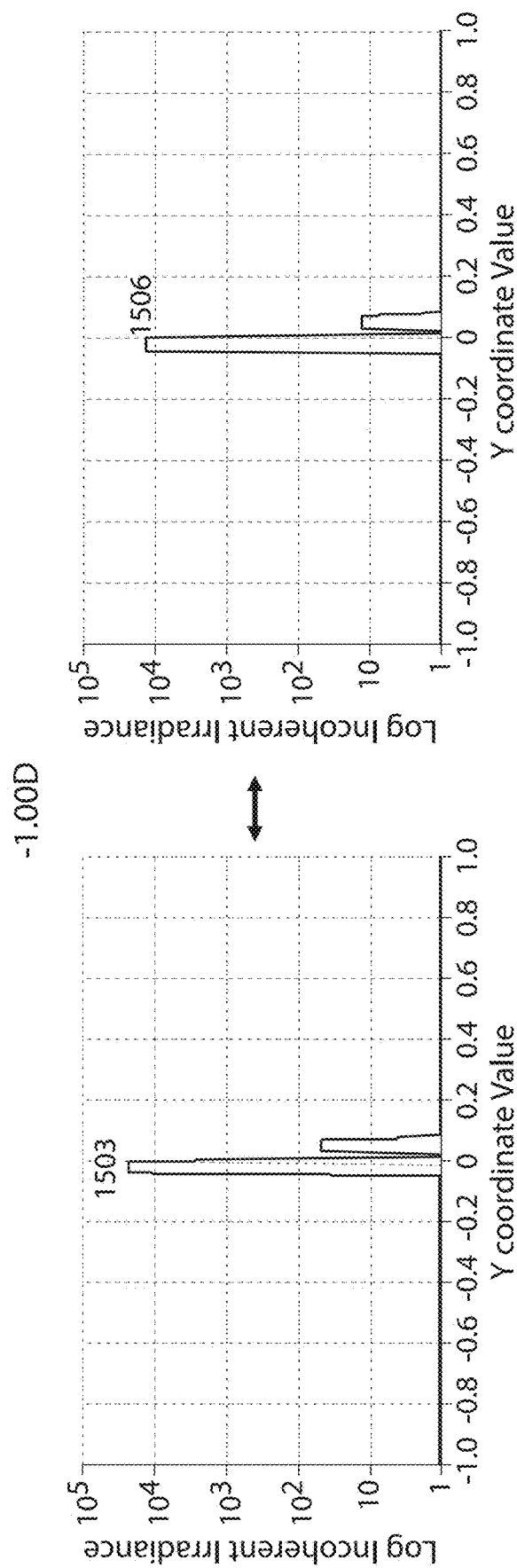
FIG. 15C graphs the intensity of retinal primary and glare intensities for green (1503) and blue (1506) light for ophthalmic lenses with −1.00D refractive power.

Some embodiments relate to reducing perceived glare in an ophthalmic lens, sun lens, or goggle. Referring to FIG. 14 the optical configuration of a human eye is displayed in cross-sectional (1401) and isometric (1402) perspectives. A spectacle lens with a base curve of 8 diopters (1403) is oriented with a vertex distance of 12 mm and pantoscopic tilt of 10°—typical values for an ophthalmic lens. A representative ray (1404) impinges on the lens (1403) parallel to the z-axis and offset 0.5 mm from the center of the lens through the cornea (1405), aqueous humor, pupil (1406), intraocular lens (1407), vitreous humor, and thence onto the retina (1408). The lens (1403) is comprised of a material that is transparent at 550 nm and has an absorber added, according to some embodiments, to produce 63% transmission (37% absorption) at 430 nm. FIG. 15A through FIG. 15C display the intensities of the primary and first glare images on the retina for green (1501, 1502, 1503) and blue (1504, 1505, 1506) light for lenses with 0.00D, +1.00D, and −1.00D of corrective power, respectively. Although the spatial location of the glare image shifts as a result of the corrective lens, the disproportionate reduction of glare light at 430 nm is clear from the figures, and is quantified in Table 8, where the ratio of actual glare to image photons is 44%, 45%, and 33% smaller for the 430 nm wavelength at which an absorbing material was incorporated. Referring to FIG. 13, the ratio of G(430 nm)/V(430 nm) is 9, so the absorbing material reduces the perceived glare at 430 nm by a factor of 20 for +0.00 D and +1.00 D spectacles and a factor of 27 for −1.00D lenses.

TABLE 8

Retinal intensities of primary and first glare images for three spectacle lenses with a base curve of 8D, vertex distance of 12 mm, and pantoscopic tilt of 10°.

| +0.00 D Ophthalmic Lens | | | |
| --- | --- | --- | --- |
|          | 430 nm   | 550 nm   | 430/550 ratio |
| Primary  | 2.86E-01 | 4.53E-01 | 63% |
| Glare    | 2.75E-04 | 9.93E-04 | 28% |
| G:P ratio| 9.63E-04 | 2.19E-03 | 44% |
| +1.00 D Ophthalmic Lens | | | |
|          | 430 nm   | 550 nm   | 430/550 ratio |
| Primary  | 2.85E-01 | 4.43E-01 | 64% |
| Glare    | 2.75E-04 | 9.53E-04 | 29% |
| G:P ratio| 9.66E-04 | 2.15E-03 | 45% |
| −1.00 D Ophthalmic Lens | | | |
|          | 430 nm   | 550 nm   | 430/550 ratio |
| Primary  | 2.83E-01 | 4.43E-01 | 64% |
| Glare    | 1.65E-04 | 7.95E-04 | 21% |
| G:P ratio| 5.84E-04 | 1.80E-03 | 33% |

The function $V(\lambda, \theta)$ in equations 1 and 2 accounts for the wavelength dependence of the human visual system by multiplying the scotopic, mesopic, or photopic sensitivity functions, as determined by the field illuminance, $\iint S(\lambda, \theta)d\lambda d\theta$, that is computed for the field of view vignetted by the pupil according to established methods of physical optics. The perceived glare images $G(\lambda, \theta)$ follow a similar protocol; one multiplies the glare intensities by appropriate glare sensitivity functions that depend on wavelength and angle away from central fixation, as illustrated by (1204 and 1205) in FIG. 12B.

Example devices incorporate absorbing materials or layers in partially transparent devices to reduce the ratio of intensities in perceived glare to those in perceived primary images. This is accomplished by selecting absorbing materials or layers that preferentially and nonlinearly extinguish light at wavelengths that are more potently perceived as glare than as primary images.

Any visual field presents a flux of light whose images are resolved by contrasts in angle, wavelength, and intensity that are constrained by the pupil and the geometric optics of the eye. Objects in the visual field are perceived based on this contrast, both statically and dynamically. Viewing objects through windows, lenses, and other transparent media produces glare images that are spatially shifted and generally, when the media are not optically flat, geometrically distorted. Glare thereby reduces image contrast and degrades visual acuity.

The present invention provides systems and methods to reduce the glare perceived by a person viewing a scene through a partially or wholly transparent device. The reduction of glare is accomplished in both the images transmitted through the device, and also to images formed by light reflected from the device to a person at an angular orientation consistent with the location of the source, the orientation of the transparent device, and Snell's law.

Various configurations of partially or wholly transparent devices that reduce actual and/or perceived glare can be implemented in accordance with the above-described aspects and features. Some example configurations are listed below.

(1) A device through which or from which an object is viewed, the device comprising semi-transparent material; and an optical absorber disposed in the semi-transparent material having greater absorption for optical wavelengths between approximately 380 nm and approximately 450 nm than for optical wavelengths between approximately 500 nm and 700 nm, wherein a first ratio of actual glare intensity to primary image intensity, integrated over all visible wavelengths, for the object viewed in transmission through or reflection from the device is less than a second ratio of actual glare to primary image intensity for the object viewed in transmission through or reflection from the device when the optical absorber is not disposed in the semi-transparent material.

(2) The device of configuration (1), wherein an angle of incidence measured from a normal to a front surface of the semi-transparent material for a ray travelling from the object to a point where the object is viewed is between 0 degrees and 75 degrees.

(3) The device of configuration (1) or (2), wherein the semi-transparent material comprises a glass.

(4) The device of any one of configurations (1) through (3), wherein the absorber comprises an organic dye.

(5) The device of any one of configurations (1) through (3), wherein the absorber comprises a metallic dopant.

(6) The device of any one of configurations (1) through (5), wherein the absorber is distributed non-uniformly in the semi-transparent material.

(7) The device of any one of configurations (1) through (6), wherein at least 85% of the primary image intensity is transmitted through the semi-transparent material and optical absorber at normal incidence.

(8) The device of any one of configurations (1) through (7), wherein a first hue or first chroma of a glare image viewed through or from the device is shifted compared to a corresponding second hue or second chroma of a primary image viewed through or from the device.

(9) The device of any one of configurations (1) through (8), wherein the average color distortion of the primary image as measured by the average shift in the L*a*b* uniform color space coordinates of the 1269 Munsell color tiles in daylight illumination is between 1 JND and 10 JND.

(10) The device of configuration (9), wherein the average color distortion of the first glare image as measured by the average shift in the L*a*b* uniform color space coordinates of the 1269 Munsell color tiles in daylight illumination shifts by at least 3 JND more than the shift in average color distortion of the primary image.

(11) The device of any one of configurations (1) through (10), wherein the semi-transparent material comprises a polymer.

(12) The device of any one of configurations (1) through (10), wherein the semi-transparent material comprises a polymer laminated between layers of a glass.

(13) The device of configuration (11) or (12), wherein the polymer is polyvinylbutyral.

(14) The device of any one of configurations (1) through (13), wherein the semi-transparent material is formed as a windshield or windscreen for a vehicle.

(15) The device of any one of configurations (1) through (13), wherein the semi-transparent material is formed as a window for a motorized vehicle or a dwelling.

(16) The device of any one of configurations (1) through (13), wherein the semi-transparent material is formed as a lens for an eyeglass or goggle.

(17) The device of any one of configurations (1) through (13), wherein the semi-transparent material is formed as a lens for a camera.

(18) The device of any one of configurations (1) through (13), wherein the semi-transparent material is formed as a lens for a microscope or telescope.

Various processes for making a semitransparent device that reduces actual and/or perceived glare can be practiced. Example processes are listed below.

(19) A method of making a device through which or from which an object is viewed, the method comprising: forming semi-transparent material containing an optical absorber, wherein the optical absorber disposed in the semi-transparent material exhibits greater absorption for optical wavelengths between approximately 380 nm and approximately 450 nm than for optical wavelengths between approximately 500 nm and 700 nm, and wherein a first ratio of actual glare intensity to primary image intensity, integrated over all visible wavelengths, for the object viewed in transmission through or reflection from the device is less than a second ratio of actual glare to primary image intensity for the object viewed in transmission through or reflection from the device when the optical absorber is not disposed in the semi-transparent material.

(20) The method of (19), wherein forming the semi-transparent material comprises dispersing a dye in the semi-transparent material during formation of the semi-transparent material.

(21) The method of (19), wherein forming the semi-transparent material comprises dispersing a metallic dopant in the semi-transparent material during formation of the semi-transparent material.

(22) The method of any one of (19) through (21), further comprising forming the semi-transparent material as a windshield or windscreen for a vehicle.

(23) The method of any one of (19) through (21), further comprising forming the semi-transparent material as a window for a dwelling.

(24) The method of any one of (19) through (23), further comprising laminating a polymer layer to a glass layer.

(25) The method of any one of (19) through (21), further comprising forming the semi-transparent material as a lens for an eyeglass or goggle.

(26) The method of any one of (19) through (21), further comprising forming the semi-transparent material as a lens for a camera.

(27) The method of any one of (19) through (21), further comprising forming the semi-transparent material as a lens for a microscope or telescope.

(28) The method of any one of (19) through (23) or (25) through (27), wherein the semi-transparent material comprises a glass.

(29) The method of any one of (19) through (23) or (25) through (27), wherein the semi-transparent material comprises a polymer.

(30) The method of any one of (19) through (23) or (25) through (27), further comprising dispersing the absorber non-uniformly in the semi-transparent material.

While some exemplary embodiments have been described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations may be made without departing from the novel aspects of the invention as defined in the claims. The appended claims should be construed broadly, and in a manner consistent with the spirit and scope of the invention herein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of embodiments of the present disclosure. The materials, methods, and examples disclosed herein are illustrative only and not intended to be limiting.

The terms "minimize" or "minimized" mean that one or more parameters are or have been changed to reduce a dependent variable to within 15% of a target value. In some cases, the target value may be an absolute minimum value that can be obtained by the dependent variable.

The terms "maximize" or "maximized" means that one or more parameters are or have been changed to increase a dependent variable to within 15% of a target value. In some cases, the target value may be an absolute maximum value that can be obtained by the dependent variable.

The terms "optimize" or "optimized" means that one or more parameters are or have been changed to alter a dependent variable to a value that is within 15% of a target value.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an," and "the" include plural references unless the context clearly dictates otherwise. The present disclosure also contemplates other embodiments "comprising," "consisting of," and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . , and N, that is to say, any combination of one or more of the elements A, B, . . . , or N including any one element alone or in combination with one or more of the other elements which may also include, in combination, additional elements not listed.

The terms "first," "second," "third," and the like, as used herein, do not denote any order, quantity, or importance, but rather are used to distinguish one element from another.

The term "substantially," as used herein, represents the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

What is claimed is:

1. A device through which or from which an object is viewed, the device comprising:
    semi-transparent material; and
    an optical absorber disposed in the semi-transparent material having greater absorption for optical wavelengths between approximately 380 nm and approximately 450 nm than for optical wavelengths between approximately 500 nm and 700 nm, wherein a first ratio of actual glare intensity to primary image intensity, integrated over all visible wavelengths, for the object viewed in transmission through or reflection from the device is less than a second ratio of actual glare to primary image intensity for the object viewed in transmission through or reflection from the device when the optical absorber is not disposed in the semi-transparent material.

2. The device of claim 1, wherein an angle of incidence measured from a normal to a front surface of the semi-transparent material for a ray travelling from the object to a point where the object is viewed is between 0 degrees and 75 degrees.

3. The device of claim 1, wherein the semi-transparent material comprises a glass.

4. The device of claim 1, wherein the absorber comprises an organic dye.

5. The device of claim 1, wherein the absorber comprises a metallic dopant.

6. The device of claim 1, wherein the absorber is distributed non-uniformly in the semi-transparent material.

7. The device of claim 1, wherein at least 85% of the primary image intensity is transmitted through the semi-transparent material and optical absorber at normal incidence.

8. The device of claim 1, wherein a first hue or first chroma of a glare image viewed through or from the device is shifted compared to a corresponding second hue or second chroma of a primary image viewed through or from the device.

9. The device of claim 1, wherein an average color distortion of a primary image as measured by an average shift in the L*a*b* uniform color space coordinates of the 1269 Munsell color tiles in daylight illumination is between 1 JND and 10 JND.

10. The device of claim 9, wherein the average color distortion of a first glare image as measured by the average shift in the L*a*b* uniform color space coordinates of the 1269 Munsell color tiles in daylight illumination shifts by at least 3 JND more than the shift in average color distortion of the primary image.

11. The device of claim 1, wherein the semi-transparent material comprises a polymer.

12. The device of claim 1, wherein the semi-transparent material comprises a polymer laminated between layers of a glass.

13. The device of claim 12, wherein the polymer is polyvinylbutyral.

14. The device of claim 1, wherein the semi-transparent material is formed as a windshield or windscreen for a vehicle.

15. The device of claim 1, wherein the semi-transparent material is formed as a window for a motorized vehicle or a dwelling.

16. The device of claim 1, wherein the semi-transparent material is formed as a lens for an eyeglass or goggle.

17. The device of claim 1, wherein the semi-transparent material is formed as a lens for a camera.

18. The device of claim 1, wherein the semi-transparent material is formed as a lens for a microscope or telescope.

19. A method of making a device through which or from which an object is viewed, the method comprising:

forming semi-transparent material containing an optical absorber, wherein the optical absorber disposed in the semi-transparent material exhibits greater absorption for optical wavelengths between approximately 380 nm and approximately 450 nm than for optical wavelengths between approximately 500 nm and 700 nm, and wherein a first ratio of actual glare intensity to primary image intensity, integrated over all visible wavelengths, for the object viewed in transmission through or reflection from the device is less than a second ratio of actual glare to primary image intensity for the object viewed in transmission through or reflection from the device when the optical absorber is not disposed in the semi-transparent material.

20. The method of claim 19, wherein forming the semi-transparent material comprises dispersing a dye in the semi-transparent material during formation of the semi-transparent material.

21. The method of claim 19, wherein forming the semi-transparent material comprises dispersing a metallic dopant in the semi-transparent material during formation of the semi-transparent material.

22. The method of claim 19, further comprising forming the semi-transparent material as a windshield or windscreen for a vehicle.

23. The method of claim 22, further comprising laminating a polymer layer to a glass layer.

24. The method of claim 19, further comprising forming the semi-transparent material as a window for a dwelling.

25. The method of claim 19, further comprising forming the semi-transparent material as a lens for an eyeglass or goggle.

26. The method of claim 19, further comprising forming the semi-transparent material as a lens for a camera.

27. The method of claim 19, further comprising forming the semi-transparent material as a lens for a microscope or telescope.

28. The method of claim 19, wherein the semi-transparent material comprises a glass.

29. The method of claim 19, wherein the semi-transparent material comprises a polymer.

30. The method of claim 19, further comprising dispersing the absorber non-uniformly in the semi-transparent material.

* * * * *